US009928755B2

(12) United States Patent
Wallace et al.

(10) Patent No.: US 9,928,755 B2
(45) Date of Patent: *Mar. 27, 2018

(54) VIRTUAL REALITY GTAW AND PIPE WELDING SIMULATOR AND SETUP

(71) Applicant: Lincoln Global, Inc., City of Industry, CA (US)

(72) Inventors: Matthew Wayne Wallace, South Windsor, CT (US); David Anthony Zboray, Trumbull, CT (US); Antonius Aditjandra, Chardon, OH (US); Adam Lee Webb, Perry, OH (US); Deanna Postlethwaite, Chagrin Falls, OH (US); Zachary Steven Lenker, Vernon, CT (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 595 days.

This patent is subject to a terminal disclaimer.

(21) Appl. No.: 14/326,567

(22) Filed: Jul. 9, 2014

(65) Prior Publication Data

US 2014/0322684 A1 Oct. 30, 2014

Related U.S. Application Data

(63) Continuation of application No. 13/792,294, filed on Mar. 11, 2013, now Pat. No. 8,851,896, which is a
(Continued)

(51) Int. Cl.
*G09B 19/00* (2006.01)
*G09B 19/24* (2006.01)
(Continued)

(52) U.S. Cl.
CPC ............... *G09B 19/24* (2013.01); *G09B 5/00* (2013.01); *G09B 25/02* (2013.01); *B23K 9/09* (2013.01);
(Continued)

(58) Field of Classification Search
CPC .......... G09B 19/24; B23K 9/09; B23K 9/095; B23K 9/0953; B23K 9/0956
(Continued)

(56) References Cited

U.S. PATENT DOCUMENTS

| 317,063 A | 5/1885 | Wittenstrom |
| 428,459 A | 5/1890 | Coffin |

(Continued)

FOREIGN PATENT DOCUMENTS

| CA | 2698078 | 9/2011 |
| CN | 101209512 A | 7/2008 |

(Continued)

OTHER PUBLICATIONS

Choquet, Claude. "ARC+: Today's Virtual Reality Solution for Welders." Internet Page, Jan. 1, 2008: 6.*
(Continued)

*Primary Examiner* — Robert J Utama
(74) *Attorney, Agent, or Firm* — Perkins Coie, LLP

(57) ABSTRACT

A simulator facilitating virtual welding activity. The simulator may include a logic processor based subsystem operable to generate an interactive welding environment in virtual reality space that emulates welding activity by simulating a virtual weld puddle having dynamic, real time molten metal fluidity and heat dissipation characteristics, responsive to performing a simulated welding activity in real time. The simulator may include a foot pedal device in operative communication with the logic processor based subsystem and configured to affect a characteristic of the virtual weld puddle in real time, responsive to user control of the foot pedal device. The simulator may be configured to track the movements of a mock welding tool and a mock filler wire and determine interaction between the virtual weld puddle, a corresponding virtual welding tool, and a
(Continued)

corresponding filler wire in virtual reality space that would result in the welding tool becoming contaminated.

24 Claims, 31 Drawing Sheets

Related U.S. Application Data continuation-in-part of application No. 13/545,058, filed on Jul. 10, 2012, now Pat. No. 8,911,237, which is a continuation-in-part of application No. 12/501,263, filed on Jul. 10, 2009, now Pat. No. 8,915,740.

(60) Provisional application No. 61/090,794, filed on Aug. 21, 2008.

(51) Int. Cl.
    G09B 5/00      (2006.01)
    G09B 25/02    (2006.01)
    B23K 9/095    (2006.01)
    B23K 9/09     (2006.01)

(52) U.S. Cl.
    CPC ............ B23K 9/095 (2013.01); B23K 9/0953 (2013.01); B23K 9/0956 (2013.01)

(58) Field of Classification Search
    USPC .................................................. 434/219, 234
    See application file for complete search history.

(56) References Cited

U.S. PATENT DOCUMENTS

| | | | |
|---|---|---|---|
| 483,428 A | 9/1892 | Coffin | |
| 1,159,119 A | 11/1915 | Springer | |
| D140,630 S | 3/1945 | Garibay | |
| D142,377 S | 9/1945 | Dunn | |
| D152,049 S | 12/1948 | Welch | |
| 2,681,969 A | 6/1954 | Burke | |
| D174,208 S | 3/1955 | Abidgaard | |
| 2,728,838 A | 12/1955 | Barnes | |
| D176,942 S | 2/1956 | Cross | |
| 2,894,086 A | 7/1959 | Rizer | |
| 3,035,155 A | 5/1962 | Hawk | |
| 3,059,519 A | 10/1962 | Stanton | |
| 3,356,823 A | 12/1967 | Waters et al. | |
| 3,555,239 A | 1/1971 | Kerth | |
| 3,621,177 A | 11/1971 | McPherson et al. | |
| 3,654,421 A | 4/1972 | Streetman et al. | |
| 3,739,140 A | 6/1973 | Rotilio | |
| 3,866,011 A | 2/1975 | Cole | |
| 3,867,769 A * | 2/1975 | Schow ................... | G09B 19/24 219/124.34 |
| 3,904,845 A | 9/1975 | Minkiewicz | |
| 3,988,913 A | 11/1976 | Metcalfe et al. | |
| D243,459 S | 2/1977 | Bliss | |
| 4,024,371 A | 5/1977 | Drake | |
| 4,041,615 A | 8/1977 | Whitehill | |
| D247,421 S | 3/1978 | Driscoll | |
| 4,124,944 A | 11/1978 | Blair | |
| 4,132,014 A * | 1/1979 | Schow ................... | G09B 19/24 434/234 |
| 4,237,365 A | 12/1980 | Lambros et al. | |
| 4,280,041 A | 7/1981 | Kiesslilng et al. | |
| 4,280,042 A | 7/1981 | Berger et al. | |
| 4,280,137 A | 7/1981 | Ashida et al. | |
| 4,314,125 A | 2/1982 | Nakamura | |
| 4,359,622 A | 11/1982 | Dostoomian et al. | |
| 4,375,026 A | 2/1983 | Kearney | |
| 4,410,787 A | 10/1983 | Kremers et al. | |
| 4,429,266 A | 1/1984 | Traadt | |
| 4,452,589 A * | 6/1984 | Denison ................. | G09B 19/24 219/136 |
| D275,292 S | 8/1984 | Bouman | |
| D277,761 S | 2/1985 | Korovin et al. | |
| 4,525,619 A | 6/1985 | Ide et al. | |
| D280,329 S | 8/1985 | Bouman | |
| 4,611,111 A | 9/1986 | Baheti et al. | |
| 4,616,326 A | 10/1986 | Meier et al. | |
| 4,629,860 A | 12/1986 | Lindbom | |
| 4,677,277 A | 6/1987 | Cook et al. | |
| 4,680,014 A | 7/1987 | Paton et al. | |
| 4,689,021 A | 8/1987 | Vasiliev et al. | |
| 4,707,582 A | 11/1987 | Beyer | |
| 4,716,273 A | 12/1987 | Paton et al. | |
| D297,704 S | 9/1988 | Bulow | |
| 4,867,685 A | 9/1989 | Brush et al. | |
| 4,877,940 A | 10/1989 | Bangs et al. | |
| 4,897,521 A | 1/1990 | Burr | |
| 4,907,973 A | 3/1990 | Hon | |
| 4,931,018 A * | 6/1990 | Herbst ................... | G09B 19/24 345/10 |
| 4,973,814 A | 11/1990 | Kojima et al. | |
| 4,998,050 A | 3/1991 | Nishiyama et al. | |
| 5,034,593 A | 7/1991 | Rice et al. | |
| 5,061,841 A | 10/1991 | Richardson | |
| 5,089,914 A | 2/1992 | Prescott | |
| 5,192,845 A | 3/1993 | Kirmsse et al. | |
| 5,206,472 A | 4/1993 | Myking et al. | |
| 5,266,930 A | 11/1993 | Ichikawa et al. | |
| 5,285,916 A | 2/1994 | Ross | |
| 5,305,183 A | 4/1994 | Teynor | |
| 5,320,538 A | 6/1994 | Baum | |
| 5,337,611 A | 8/1994 | Fleming et al. | |
| 5,360,156 A | 11/1994 | Ishizaka et al. | |
| 5,360,960 A | 11/1994 | Shirk | |
| 5,370,071 A | 12/1994 | Ackermann | |
| D359,296 S | 6/1995 | Witherspoon | |
| 5,424,634 A | 6/1995 | Goldfarb et al. | |
| 5,436,638 A | 7/1995 | Bolas et al. | |
| 5,464,957 A | 11/1995 | Kidwell et al. | |
| D365,583 S | 12/1995 | Viken | |
| 5,562,843 A | 10/1996 | Yasumoto | |
| 5,670,071 A | 9/1997 | Ueyama et al. | |
| 5,676,503 A | 10/1997 | Lang | |
| 5,676,867 A | 10/1997 | Allen | |
| 5,708,253 A | 1/1998 | Bloch et al. | |
| 5,710,405 A | 1/1998 | Solomon et al. | |
| 5,719,369 A | 2/1998 | White et al. | |
| D392,534 S | 3/1998 | Degen et al. | |
| 5,728,991 A | 3/1998 | Takada et al. | |
| 5,751,258 A | 5/1998 | Fergason et al. | |
| D395,296 S | 6/1998 | Kaya et al. | |
| D396,238 S | 7/1998 | Schmitt | |
| 5,781,258 A | 7/1998 | Debral et al. | |
| 5,823,785 A | 10/1998 | Matherne, Jr. | |
| 5,835,077 A | 11/1998 | Dao et al. | |
| 5,835,277 A | 11/1998 | Hegg | |
| 5,845,053 A | 12/1998 | Watanabe et al. | |
| 5,877,777 A | 3/1999 | Colwell | |
| 5,963,891 A | 10/1999 | Walker et al. | |
| 6,008,470 A | 12/1999 | Zhang et al. | |
| 6,037,948 A | 3/2000 | Liepa | |
| 6,049,059 A | 4/2000 | Kim | |
| 6,051,805 A | 4/2000 | Vaidya et al. | |
| 6,114,645 A | 9/2000 | Burgess | |
| 6,155,475 A | 12/2000 | Ekelof et al. | |
| 6,155,928 A | 12/2000 | Burdick | |
| 6,230,327 B1 | 5/2001 | Briand et al. | |
| 6,236,013 B1 | 5/2001 | Delzenne | |
| 6,236,017 B1 | 5/2001 | Smartt et al. | |
| 6,242,711 B1 | 6/2001 | Cooper | |
| 6,271,500 B1 | 8/2001 | Hirayama et al. | |
| 6,330,938 B1 | 12/2001 | Herve et al. | |
| 6,330,966 B1 | 12/2001 | Eissfeller | |
| 6,331,848 B1 | 12/2001 | Stove et al. | |
| D456,428 S | 4/2002 | Aronson et al. | |
| 6,373,465 B2 | 4/2002 | Jolly et al. | |
| D456,828 S | 5/2002 | Aronson et al. | |
| D461,383 S | 8/2002 | Balckburn | |
| 6,441,342 B1 | 8/2002 | Hsu | |
| 6,445,964 B1 | 9/2002 | White et al. | |
| 6,492,618 B1 | 12/2002 | Flood et al. | |

(56) References Cited

U.S. PATENT DOCUMENTS

| | | |
|---|---|---|
| 6,506,997 B2 | 1/2003 | Matsuyama |
| 6,552,303 B1 | 4/2003 | Blankenship et al. |
| 6,560,029 B1 | 5/2003 | Dobbie et al. |
| 6,563,489 B1 | 5/2003 | Latypov et al. |
| 6,568,846 B1 | 5/2003 | Cote et al. |
| D475,726 S | 6/2003 | Suga et al. |
| 6,572,379 B1 | 6/2003 | Sears et al. |
| 6,583,386 B1 | 6/2003 | Ivkovich |
| 6,621,049 B2 | 9/2003 | Suzuki |
| 6,624,388 B1 | 9/2003 | Blankenship et al. |
| D482,171 S | 11/2003 | Vui et al. |
| 6,647,288 B2 | 11/2003 | Madill et al. |
| 6,649,858 B2 | 11/2003 | Wakeman |
| 6,655,645 B1 | 12/2003 | Lu et al. |
| 6,660,965 B2 | 12/2003 | Simpson |
| 6,697,701 B2 | 2/2004 | Hillen et al. |
| 6,697,770 B1 | 2/2004 | Nagetgaal |
| 6,703,585 B2 | 3/2004 | Suzuki |
| 6,708,385 B1 | 3/2004 | Lemelson |
| 6,710,298 B2 | 3/2004 | Eriksson |
| 6,710,299 B2 | 3/2004 | Blankenship et al. |
| 6,715,502 B1 | 4/2004 | Rome et al. |
| D490,347 S | 5/2004 | Meyers |
| 6,730,875 B2 | 5/2004 | Hsu |
| 6,734,393 B1 | 5/2004 | Friedl et al. |
| 6,744,011 B1 | 6/2004 | Hu et al. |
| 6,750,428 B2 | 6/2004 | Okamoto et al. |
| 6,765,584 B1 | 7/2004 | Wloka et al. |
| 6,772,802 B2 | 8/2004 | Few |
| 6,788,442 B1 | 9/2004 | Potin et al. |
| 6,795,778 B2 | 9/2004 | Dodge et al. |
| 6,798,974 B1 | 9/2004 | Nakano et al. |
| 6,857,553 B1 | 2/2005 | Hartman et al. |
| 6,858,817 B2 | 2/2005 | Blankenship et al. |
| 6,865,926 B2 | 3/2005 | O'Brien et al. |
| D504,449 S | 4/2005 | Butchko |
| 6,920,371 B2 | 7/2005 | Hillen et al. |
| 6,940,037 B1 | 9/2005 | Kovacevic et al. |
| 6,940,039 B2 | 9/2005 | Blankenship et al. |
| 7,021,937 B2 | 4/2006 | Simpson et al. |
| 7,024,342 B1 | 4/2006 | Waite et al. |
| 7,126,078 B2 | 10/2006 | Demers et al. |
| 7,132,617 B2 | 11/2006 | Lee et al. |
| 7,170,032 B2 | 1/2007 | Flood |
| 7,194,447 B2 | 3/2007 | Harvey et al. |
| 7,247,814 B2 | 7/2007 | Ott |
| D555,446 S | 11/2007 | Picaza Ibarrondo |
| 7,315,241 B1 | 1/2008 | Daily et al. |
| D561,973 S | 2/2008 | Kinsley et al. |
| 7,353,715 B2 | 4/2008 | Myers |
| 7,363,137 B2 | 4/2008 | Brant et al. |
| 7,375,304 B2 | 5/2008 | Kainec et al. |
| 7,381,923 B2 | 6/2008 | Gordon et al. |
| 7,414,595 B1 | 8/2008 | Muffler |
| 7,465,230 B2 | 12/2008 | LeMay et al. |
| 7,478,108 B2 | 1/2009 | Townsend et al. |
| D587,975 S | 3/2009 | Aronson et al. |
| 7,516,022 B2 | 4/2009 | Lee et al. |
| 7,580,821 B2 | 8/2009 | Schirm et al. |
| D602,057 S | 10/2009 | Osicki |
| 7,621,171 B2 | 11/2009 | O'Brien |
| D606,102 S | 12/2009 | Bender et al. |
| 7,643,890 B1 | 1/2010 | Hillen et al. |
| 7,687,741 B2 | 3/2010 | Kainec et al. |
| D614,217 S | 4/2010 | Peters et al. |
| D615,573 S | 5/2010 | Peters et al. |
| 7,817,162 B2 | 10/2010 | Bolick et al. |
| 7,853,645 B2 | 12/2010 | Brown et al. |
| D631,074 S | 1/2011 | Peters et al. |
| 7,874,921 B2 | 1/2011 | Baszucki et al. |
| 7,970,172 B1 | 6/2011 | Hendrickson |
| 7,972,129 B2 | 7/2011 | O'Donoghue |
| 7,991,587 B2 | 8/2011 | Ihn |
| 8,069,017 B2 | 11/2011 | Hallquist |
| 8,224,881 B1 | 7/2012 | Spear et al. |
| 8,248,324 B2 | 8/2012 | Nangle |
| 8,265,886 B2 | 9/2012 | Bisiaux et al. |
| 8,274,013 B2 | 9/2012 | Wallace |
| 8,287,522 B2 | 10/2012 | Moses et al. |
| 8,316,462 B2 | 11/2012 | Becker et al. |
| 8,363,048 B2 | 1/2013 | Gering |
| 8,365,603 B2 | 2/2013 | Lesage et al. |
| 8,512,043 B2 | 8/2013 | Choquet |
| 8,569,646 B2 | 10/2013 | Daniel et al. |
| 8,680,434 B2 | 3/2014 | Stoger et al. |
| 8,747,116 B2 | 6/2014 | Zboray et al. |
| 8,777,629 B2 | 7/2014 | Kreindl et al. |
| RE45,062 E | 8/2014 | Maguire, Jr. |
| 8,851,896 B2 | 10/2014 | Wallace et al. |
| 8,860,760 B2 | 10/2014 | Chen |
| RE45,398 E | 3/2015 | Wallace |
| 8,992,226 B1 * | 3/2015 | Leach .................... G09B 19/24 |
| | | 219/136 |
| 9,011,154 B2 | 4/2015 | Kindig et al. |
| 9,101,994 B2 * | 8/2015 | Albrecht .................. B23K 9/00 |
| 9,221,117 B2 * | 12/2015 | Conrardy ............... B23K 37/04 |
| 9,293,056 B2 | 3/2016 | Zboray et al. |
| 9,293,057 B2 | 3/2016 | Zboray et al. |
| 9,318,026 B2 | 4/2016 | Peters et al. |
| 9,323,056 B2 | 4/2016 | Williams |
| 2001/0045808 A1 | 11/2001 | Hietmann et al. |
| 2001/0052893 A1 | 12/2001 | Jolly et al. |
| 2002/0032553 A1 | 3/2002 | Simpson et al. |
| 2002/0046999 A1 | 4/2002 | Veikkolainen et al. |
| 2002/0050984 A1 | 5/2002 | Roberts |
| 2002/0085843 A1 | 7/2002 | Mann |
| 2002/0111557 A1 * | 8/2002 | Madill ................ A61B 5/0488 |
| | | 600/546 |
| 2002/0175897 A1 | 11/2002 | Pelosi |
| 2003/0000931 A1 | 1/2003 | Ueda et al. |
| 2003/0023592 A1 | 1/2003 | Modica et al. |
| 2003/0025884 A1 | 2/2003 | Hamana et al. |
| 2003/0106787 A1 | 6/2003 | Santilli |
| 2003/0111451 A1 | 7/2003 | Blankenship et al. |
| 2003/0172032 A1 | 9/2003 | Choquet |
| 2003/0186199 A1 | 10/2003 | McCool et al. |
| 2003/0234885 A1 | 12/2003 | Pilu |
| 2004/0020907 A1 | 2/2004 | Zauner et al. |
| 2004/0035990 A1 | 2/2004 | Ackeret |
| 2004/0050824 A1 | 3/2004 | Samler |
| 2004/0088071 A1 | 5/2004 | Kouno et al. |
| 2004/0140301 A1 | 7/2004 | Blankenship et al. |
| 2004/0181382 A1 | 9/2004 | Hu et al. |
| 2004/0217096 A1 | 11/2004 | Lipnevicius |
| 2005/0007504 A1 | 1/2005 | Fergason |
| 2005/0017152 A1 | 1/2005 | Fergason |
| 2005/0046584 A1 | 3/2005 | Breed |
| 2005/0050168 A1 | 3/2005 | Wen et al. |
| 2005/0101767 A1 | 5/2005 | Clapham et al. |
| 2005/0103766 A1 | 5/2005 | Iizuka et al. |
| 2005/0103767 A1 | 5/2005 | Kainec et al. |
| 2005/0109735 A1 | 5/2005 | Flood |
| 2005/0128186 A1 | 6/2005 | Shahoian et al. |
| 2005/0133488 A1 | 7/2005 | Blankenship |
| 2005/0159840 A1 | 7/2005 | Lin et al. |
| 2005/0163364 A1 | 7/2005 | Beck et al. |
| 2005/0189336 A1 | 9/2005 | Ku |
| 2005/0199602 A1 | 9/2005 | Kaddani et al. |
| 2005/0230573 A1 | 10/2005 | Ligertwood |
| 2005/0252897 A1 | 11/2005 | Hsu |
| 2005/0275913 A1 | 12/2005 | Vesely et al. |
| 2005/0275914 A1 | 12/2005 | Vesely et al. |
| 2006/0014130 A1 | 1/2006 | Weinstein |
| 2006/0076321 A1 | 4/2006 | Maev et al. |
| 2006/0136183 A1 | 6/2006 | Choquet |
| 2006/0142656 A1 | 6/2006 | Malackowski et al. |
| 2006/0154226 A1 | 7/2006 | Maxfield |
| 2006/0163227 A1 | 7/2006 | Hillen et al. |
| 2006/0166174 A1 | 7/2006 | Rowe et al. |
| 2006/0169682 A1 | 8/2006 | Kainec et al. |
| 2006/0173619 A1 | 8/2006 | Brant et al. |
| 2006/0189260 A1 | 8/2006 | Sung |
| 2006/0207980 A1 | 9/2006 | Jacovetty et al. |
| 2006/0213892 A1 | 9/2006 | Ott |

(56) References Cited

U.S. PATENT DOCUMENTS

| | | |
|---|---|---|
| 2006/0214924 A1 | 9/2006 | Kawamoto et al. |
| 2006/0226137 A1 | 10/2006 | Huismann et al. |
| 2006/0252543 A1 | 11/2006 | Van Noland et al. |
| 2006/0258447 A1 | 11/2006 | Baszucki et al. |
| 2007/0034611 A1 | 2/2007 | Drius et al. |
| 2007/0038400 A1 | 2/2007 | Lee et al. |
| 2007/0045488 A1 | 3/2007 | Shin |
| 2007/0088536 A1 | 4/2007 | Ishikawa |
| 2007/0112889 A1 | 5/2007 | Cook et al. |
| 2007/0198117 A1 | 8/2007 | Wajihuddin |
| 2007/0209586 A1 | 9/2007 | Ebensberger et al. |
| 2007/0211026 A1 | 9/2007 | Ohta |
| 2007/0221797 A1 | 9/2007 | Thompson et al. |
| 2007/0256503 A1 | 11/2007 | Wong et al. |
| 2007/0277611 A1 | 12/2007 | Portzgen et al. |
| 2007/0291035 A1 | 12/2007 | Vesely et al. |
| 2008/0021311 A1 | 1/2008 | Goldbach |
| 2008/0031774 A1 | 2/2008 | Magnant et al. |
| 2008/0038702 A1* | 2/2008 | Choquet .............. A61B 5/1124 434/260 |
| 2008/0061113 A9 | 3/2008 | Seki et al. |
| 2008/0078811 A1 | 4/2008 | Hillen et al. |
| 2008/0078812 A1 | 4/2008 | Peters et al. |
| 2008/0117203 A1 | 5/2008 | Gering |
| 2008/0120075 A1 | 5/2008 | Wloka |
| 2008/0128398 A1 | 6/2008 | Schneider |
| 2008/0135533 A1 | 6/2008 | Ertmer et al. |
| 2008/0140815 A1 | 6/2008 | Brant et al. |
| 2008/0149686 A1 | 6/2008 | Daniel et al. |
| 2008/0203075 A1 | 8/2008 | Feldhausen et al. |
| 2008/0233550 A1 | 9/2008 | Solomon |
| 2008/0303197 A1 | 12/2008 | Paquette et al. |
| 2008/0314887 A1* | 12/2008 | Stoger ................ B23K 9/0956 219/137 R |
| 2009/0015585 A1 | 1/2009 | Klusza |
| 2009/0021514 A1 | 1/2009 | Klusza |
| 2009/0045183 A1 | 2/2009 | Artelsmair et al. |
| 2009/0057286 A1 | 3/2009 | Ihara et al. |
| 2009/0152251 A1 | 6/2009 | Dantinne et al. |
| 2009/0173726 A1 | 7/2009 | Davidson et al. |
| 2009/0184098 A1 | 7/2009 | Daniel et al. |
| 2009/0200281 A1 | 8/2009 | Hampton |
| 2009/0200282 A1 | 8/2009 | Hampton |
| 2009/0231423 A1 | 9/2009 | Becker et al. |
| 2009/0259444 A1 | 10/2009 | Dolansky et al. |
| 2009/0298024 A1* | 12/2009 | Batzler ................ B23K 9/32 434/234 |
| 2009/0325699 A1 | 12/2009 | Delgiannidis |
| 2010/0012017 A1 | 1/2010 | Miller |
| 2010/0012637 A1 | 1/2010 | Jaeger |
| 2010/0048273 A1 | 2/2010 | Wallace et al. |
| 2010/0062405 A1 | 3/2010 | Zboray et al. |
| 2010/0062406 A1* | 3/2010 | Zboray ................ G09B 19/24 434/234 |
| 2010/0096373 A1 | 4/2010 | Hillen et al. |
| 2010/0121472 A1 | 5/2010 | Babu et al. |
| 2010/0133247 A1 | 6/2010 | Mazumder et al. |
| 2010/0133250 A1 | 6/2010 | Sardy et al. |
| 2010/0176107 A1 | 7/2010 | Bong |
| 2010/0201803 A1 | 8/2010 | Melikian |
| 2010/0224610 A1* | 9/2010 | Wallace ............. B23K 9/0953 219/137 R |
| 2010/0276396 A1 | 11/2010 | Cooper et al. |
| 2010/0299101 A1 | 11/2010 | Shimada et al. |
| 2010/0307249 A1 | 12/2010 | Lesage et al. |
| 2011/0006047 A1* | 1/2011 | Penrod ............... B23K 9/0956 219/137 R |
| 2011/0060568 A1 | 3/2011 | Goldfine et al. |
| 2011/0091846 A1 | 4/2011 | Kreindl et al. |
| 2011/0114615 A1 | 5/2011 | Daniel et al. |
| 2011/0116076 A1 | 5/2011 | Chantry et al. |
| 2011/0117527 A1 | 5/2011 | Conrardy et al. |
| 2011/0122495 A1 | 5/2011 | Togashi |
| 2011/0183304 A1 | 7/2011 | Wallace et al. |
| 2011/0187746 A1 | 8/2011 | Suto et al. |
| 2011/0248864 A1 | 10/2011 | Becker et al. |
| 2011/0290765 A1 | 12/2011 | Albrecht et al. |
| 2011/0316516 A1 | 12/2011 | Schiefermuller et al. |
| 2012/0122062 A1 | 5/2012 | Yang et al. |
| 2012/0189993 A1* | 7/2012 | Kindig ................ G09B 19/24 434/234 |
| 2012/0291172 A1 | 11/2012 | Wills et al. |
| 2012/0298640 A1 | 11/2012 | Conrardy et al. |
| 2013/0026150 A1 | 1/2013 | Chantry et al. |
| 2013/0040270 A1 | 2/2013 | Albrecht |
| 2013/0049976 A1 | 2/2013 | Maggiore |
| 2013/0075380 A1 | 3/2013 | Albrech et al. |
| 2013/0182070 A1 | 7/2013 | Peters et al. |
| 2013/0183645 A1 | 7/2013 | Wallace et al. |
| 2013/0189657 A1* | 7/2013 | Wallace ................ G09B 5/00 434/234 |
| 2013/0189658 A1 | 7/2013 | Peters et al. |
| 2013/0209976 A1 | 8/2013 | Postlethwaite et al. |
| 2013/0230832 A1* | 9/2013 | Peters ................ G09B 19/24 434/234 |
| 2013/0231980 A1 | 9/2013 | Elgart et al. |
| 2013/0327747 A1 | 12/2013 | Dantinne et al. |
| 2014/0017642 A1 | 1/2014 | Postlethwaite et al. |
| 2014/0038143 A1 | 2/2014 | Daniel et al. |
| 2014/0065584 A1 | 3/2014 | Wallace et al. |
| 2014/0134579 A1 | 5/2014 | Becker |
| 2014/0134580 A1* | 5/2014 | Becker ................ G09B 9/00 434/234 |
| 2014/0263224 A1 | 9/2014 | Becker |
| 2014/0272835 A1 | 9/2014 | Becker |
| 2014/0272836 A1 | 9/2014 | Becker |
| 2014/0272837 A1 | 9/2014 | Becker |
| 2014/0272838 A1 | 9/2014 | Becker |
| 2014/0312020 A1 | 10/2014 | Daniel |
| 2014/0315167 A1 | 10/2014 | Kreindl et al. |
| 2014/0322684 A1 | 10/2014 | Wallace et al. |
| 2014/0346158 A1 | 11/2014 | Matthews |
| 2015/0056584 A1 | 2/2015 | Boulware et al. |
| 2015/0056585 A1 | 2/2015 | Boulware et al. |
| 2015/0056586 A1 | 2/2015 | Penrod et al. |

FOREIGN PATENT DOCUMENTS

| | | |
|---|---|---|
| CN | 101214178 A | 7/2008 |
| CN | 201083660 Y | 7/2008 |
| CN | 101419755 A1 | 4/2009 |
| CN | 201229711 Y | 4/2009 |
| CN | 101571887 A | 11/2009 |
| CN | 101587659 A | 11/2009 |
| CN | 102014819 A | 4/2011 |
| CN | 102165504 A | 8/2011 |
| CN | 202684308 U | 1/2013 |
| CN | 103871279 A | 6/2014 |
| DE | 28 33 638 A1 | 2/1980 |
| DE | 30 46 634 A1 | 1/1984 |
| DE | 32 44 307 A1 | 5/1984 |
| DE | 35 22 581 A1 | 1/1987 |
| DE | 4037879 A1 | 6/1991 |
| DE | 196 15 069 A1 | 10/1997 |
| DE | 197 39 720 C1 | 10/1998 |
| DE | 19834205 A1 | 2/2000 |
| DE | 200 09 543 U1 | 8/2001 |
| DE | 10 2005 047 204 A1 | 4/2007 |
| DE | 10 2010 038 902 A1 | 2/2012 |
| DE | 202012013151 U1 | 2/2015 |
| EP | 0 108 599 A1 | 5/1984 |
| EP | 0 127 299 | 12/1984 |
| EP | 0 145 891 A1 | 6/1985 |
| EP | 319623 B1 | 10/1990 |
| EP | 0852986 A1 | 7/1998 |
| EP | 1 527 852 A1 | 5/2005 |
| EP | 1905533 A2 | 4/2008 |
| ES | 2 274 736 A1 | 5/2007 |
| ES | 2274736 A1 | 5/2007 |
| FR | 1456780 | 3/1965 |
| FR | 2 827 066 A1 | 1/2003 |
| FR | 2 926 660 A1 | 7/2009 |

(56) References Cited

FOREIGN PATENT DOCUMENTS

| | | |
|---|---|---|
| GB | 1 455 972 | 11/1976 |
| GB | 1 511 608 | 5/1978 |
| GB | 2 254 172 A | 9/1992 |
| GB | 2435838 A | 9/2007 |
| GB | 2 454 232 A | 5/2009 |
| JP | 2-224877 | 9/1990 |
| JP | 05-329645 | 12/1993 |
| JP | 07-047471 | 2/1995 |
| JP | 07-232270 | 9/1995 |
| JP | 08-505091 | 4/1996 |
| JP | 08-150476 | 6/1996 |
| JP | 08-132274 | 5/1998 |
| JP | 11104833 | 4/1999 |
| JP | 2000-167666 A | 6/2000 |
| JP | 2001-071140 A | 3/2001 |
| JP | 2002278670 A | 9/2002 |
| JP | 2003-200372 A | 7/2003 |
| JP | 2003-326362 A | 11/2003 |
| JP | 2006-006604 A | 1/2006 |
| JP | 2006006604 A | 1/2006 |
| JP | 2006-281270 A | 10/2006 |
| JP | 2007-290025 A | 11/2007 |
| JP | 2009-500178 A | 1/2009 |
| JP | 2009160636 A | 7/2009 |
| JP | 2012024867 A | 2/2012 |
| KR | 20090010693 | 1/2009 |
| RU | 2008 108 601 C1 | 11/2009 |
| SU | 1038963 A1 | 8/1983 |
| WO | 98/45078 | 10/1998 |
| WO | 0112376 A1 | 2/2001 |
| WO | 01/43910 | 6/2001 |
| WO | 0158400 A1 | 8/2001 |
| WO | 2005102230 A1 | 11/2005 |
| WO | 2006034571 A1 | 4/2006 |
| WO | WO-2007009131 A1 | 1/2007 |
| WO | WO-2007039278 A1 | 4/2007 |
| WO | 2009120921 | 1/2009 |
| WO | 2009060231 A1 | 5/2009 |
| WO | 2009149740 A1 | 12/2009 |
| WO | 2010000003 A2 | 1/2010 |
| WO | WO-2010020867 A2 | 2/2010 |
| WO | WO-2010020870 A2 | 2/2010 |
| WO | 2010044982 | 4/2010 |
| WO | 2010091493 A1 | 8/2010 |
| WO | 2011045654 A1 | 4/2011 |
| WO | 2011058433 | 5/2011 |
| WO | 2011058433 A1 | 5/2011 |
| WO | 2011067447 A1 | 6/2011 |
| WO | 2011097035 A2 | 8/2011 |
| WO | 2012082105 A1 | 6/2012 |
| WO | 2012143327 A1 | 10/2012 |
| WO | 2013014202 A1 | 1/2013 |
| WO | WO-2013061518 A1 | 5/2013 |
| WO | 2013114189 A1 | 8/2013 |
| WO | 2013175079 A1 | 11/2013 |
| WO | 2014007830 A1 | 1/2014 |
| WO | 2014019045 A1 | 2/2014 |
| WO | 2014020386 | 2/2014 |

OTHER PUBLICATIONS

Echtler et al, "17 The Intelligent Welding Gun: Augmented Reality for Experimental Vehicle Construction," Virtual and Augmented Reality Applications in Manufacturing (2003) pp. 1-27.

Teeravarunyou et al, "Computer Based Welding Training System," International Journal of Industrial Engineering (2009) 16(2): 116-125.

Antonelli et al, "A Semi-Automated Welding Station Exploiting Human-Robot Interaction," Advanced Manufacturing Systems and Technology (2011) pp. 249-260.

Praxair Technology Inc, "The RealWeld Trainer System: Real Weld Training Under Real Conditions" Brochure (2013) 2 pages.

United States Provisional Patent Application for "System for Characterizing Manual Welding Operations on Pipe and Other Curved Structures," U.S. Appl. No. 62/055,724, filed Sep. 26, 2014, 35 pages.

Lincoln Global, Inc., "VRTEX 360: Virtual Reality Arc Welding Trainer" Brochure (2015) 4 pages.

Wuhan Onew Technology Co Ltd, "ONEW-360 Welding Training Simulator" http://en.onewtech.com/_d276479751.htm as accessed on Jul. 10, 2015, 12 pages.

The Lincoln Electric Company, "VRTEX Virtual Reality Arc Welding Trainer," http://www.lincolnelectric.com/en-us/equipment/training-equipment/Pages/vrtex.aspx as accessed on Jul. 10, 2015, 3 pages.

Miller Electric Mfg Co, "LiveArc: Welding Performance Management System" Owner's Manual, (Jul. 2014) 64 pages.

Miller Electric Mfg Co, "LiveArc Welding Performance Management System" Brochure, (Dec. 2014) 4 pages.

Chuansong Wu: "Microcomputer-based welder training simulator", Computers in Industry, vol. 20, No. 3, Oct. 1992, 5 pages, pp. 321-325, XP000205597, Elsevier Science Publishers, Amsterdam, NL.

ViziTech USA, retrieved on Mar. 27, 2014 from http://vizitechusa.com/, 2 pages.

Guu and Rokhlin ,Technique for Simultaneous Real-Time Measurements of Weld Pool Surface Geometry and Arc Force, 10 pages, Dec. 1992.

William T. Reeves, "Particles Systems—A Technique for Modeling a Class of Fuzzy Objects", Computer Graphics 17:3 pp. 359-376, 1983, 17 pages.

S.B. Chen, L. Wu, Q. L. Wang and Y. C. Liu, Self-Learning Fuzzy Neural Networks and Computer Vision for Control of Pulsed GTAW, 9 pages, dated May 1997.

Patrick Rodjito, Position tracking and motion prediction using Fuzzy Logic, 81 pages, 2006, Colby College.

D'Huart, Deat, and Lium; Virtual Environment for Training, 6th International Conference, ITS 20002, 6 pages, Jun. 2002.

Konstantinos Nasios (Bsc), Improving Chemical Plant Safety Training Using Virtual Reality, Thesis submitted to the University of Nottingham for the Degree of Doctor of Philosophy, 313 pages, Dec. 2001.

ANSI/A WS D 10.11 MID 10. 11 :2007 Guide for Root Pass Welding of Pipe without Backing Edition: 3rd American Welding Society / Oct. 13, 2006/36 pages ISBN: 0871716445, 6 pages.

M. Jonsson, L. Karlsson, and L-E Lindgren, Simulation of Tack Welding Procedures in Butt Joint Welding of Plates Welding Research Supplement, Oct. 1985, 7 pages.

Isaac Brana Veiga, Simulation of a Work Cell in the IGRIP Program, dated 2006, 50 pages.

Balijepalli, A. and Kesavadas, Haptic Interfaces for Virtual Environment and Teleoperator Systems, Haptics 2003, 7-.,Department of Mechanical & Aerospace Engineering, State University of New York at Buffalo, NY.

Yao et al., 'Development of a Robot System for Pipe Welding'. 2010 International Conference on Measuring echnology and Mechatronics Automation. Retrieved from the Internet: http://ieeexplore.ieee.org/stamp/stamp.jsp?tp=&arnumber=5460347&tag=1; pp. 1109-1112, 4 pages.

Steve Mann, Raymond Chun Bing Lo, Kalin Ovtcharov, Shixiang Gu, David Dai, Calvin Ngan, Tao Ai, Realtime HDR (High Dynamic Range) Video for Eyetap Wearable Computers, FPGA-Based Seeing Aids, and Glasseyes (Eyetaps), 2012 25th IEEE Canadian Conference on Electrical and Computer Engineering (CCECE),pp. 1-6, 6 pages, Apr. 29, 2012.

Kyt Dotson, Augmented Reality Welding Helmet Prototypes How Awsome the Technology Can Get, Sep. 26, 2012, Retrieved from the Internet: URL:http://siliconangle.com/blog/2012/09/26/augmented-reality-welding-helmet-prototypes-how-awesome-the-technology-can-get/,1 pages, retrieved on Sep. 26, 2014.

Terrence O'Brien, "Google's Project Glass gets some more details", Jun. 27, 2012 (Jun. 27, 2012), Retrieved from the Internet: http://www.engadget.com/2012/06/27/googles-project-glass-gets-some-more-details/, 1 page, retrieved on Sep. 26, 2014.

International Search Report for PCT/IB2009/00605.

(56) References Cited

OTHER PUBLICATIONS

Robert Schoder, "Design and Implementation of a Video Sensor for Closed Loop Control of Back Bead Weld Puddle Width," Massachusetts, Institute of Technology, Dept. of Mechanical Engineering, May 27, 1983, 64 pages.
Hills and Steele, Jr.; "Data Parallel Algorithms", Communications of the ACM, Dec. 1986, vol. 29, No. 12, p. 1170.
Nancy C. Porter, J. Allan Cote, Timothy D. Gifford, and Wim Lam, Virtual Reality Welder Training, 29 pages, dated Jul. 14, 2006.
J.Y. (Yosh) Mantinband, Hillel Goldenberg, Llan Kleinberger, Paul Kleinberger, Autosteroscopic, field-sequential display with full freedom of movement or Let the display were the shutter-glasses, 3ality (Israel) Ltd., 8 pages, 2002.
ARS Electronica Linz GMBH, Fronius, 2 pages, May 18, 1997.
D.K. Aidun and S.A. Martin, "Penetration in Spot GTA Welds during Centrifugation," Journal of Material Engineering and Performance vol. 7(5), 4 pages, Oct. 1998—597.
Arc+ simulator; httl://www.123arc.com/en/depliant_ang.pdf; 2 pages, 2000.
Glen Wade, "Human uses of ultrasound: ancient and modern", Ulrasonics vol. 38, 5 pages, dated 2000.
ASME Definitions, Consumables, Welding Positions, 4 pages, dated Mar. 19, 2001. See http://www.gowelding.com/asme4.htm.
M. Abbas, F. Waeckel, Code Aster (Software) EDF (France), 14 pages, Oct. 2001.
Achim Mahrle, Jurgen Schmidt, "The influence of fluid flow phenomena on the laser beam welding process"; International Journal of Heat and Fluid Flow 23, 10 pages, dated 2002.
The Lindoln Electric Company; CheckPoint Production Monitoring brochure; four (4) pages; http://www.lincolnelectric.com/assets/en_US/products/literature/s232.pdf; Publication S2.32; 4 pages, Issue Date Feb. 2012.
G. Wang, P.G. Huang, and Y.M. Zhang; "Numerical Analysis of Metal Transfer in Gas Metal Arc Welding," Departments of Mechanical and Electrical Engineering. University of Kentucky, 10 pages, Dec. 10, 2001.
Desroches, X.; Code-Aster, Note of use for aclculations of welding; Instruction manual U2.03 booklet: Thermomechincal; Document: U2.03.05; 13 pages, Oct. 1, 2003.
Fast, K. et al., "Virtual Training for Welding", Mixed and Augmented Reality, 2004, ISMAR 2004, Third IEEE and SM International Symposium on Arlington, VA, 2 pages, Nov. 2-5, 2004.
Cooperative Research Program, Virtual Reality Welder Training, Summary Report SR 0512, 4 pages, Jul. 2005.
Porter, et al., Virtual Reality Training, Paper No. 2005-P19, 14 pages, 2005.
Eduwelding+, Weld Into the Future; Online Welding Seminar—A virtual training environment; 123arc.com; 4 pages, 2005.
Miller Electric Mfg Co.; MIG Welding System features weld monitoring software; NewsRoom 2010 (Dialog® File 992); © 2011 Dialog. 2010; http://www.dialogweb.com/cgi/dwclient?reg=133233430487; three (3) pages; printed Mar. 8, 2012.
M. Abida and M. Siddique, Numerical simulation to study the effect of tack welds and root gap on welding deformations and residual stresses of a pipe-flange joint, Faculty of Mechanical Engineering, GIK Institute of Engineering Sciences and Technology, Topi, NWFP, Pakistan, 12 pages, Available on-line Aug. 25, 2005.
Abbas, M. et al..; Code_Aster; Introduction to Code_Aster; User Manual; Booklet U1.0-: Introduction to Code_Aster; Document: U1.02.00; Version 7.4; 14 pages, Jul. 22, 2005.
Mavrikios D et al, A prototype virtual reality-based demonstrator for immersive and interactive simulation of welding processes, International Journal of Computer Integrated manufacturing, Taylor and Francis, Basingstoke, GB, vol. 19, No. 3, 8 pages, Apr. 1, 2006, pp. 294-300.
Nancy C. Porter, Edison Welding Institute; J. Allan Cote, General Dynamics Electric Boat; Timothy D. Gifford, VRSim; and WIM LAM, FCS Controls; Virtual Reality Welder Trainer, Sessiion 5: Joining Technologies for Naval Applications, 16 pages, earliest date Jul. 14, 2006 (http://weayback.archive.org).

T Borzecki, G. Bruce, Y.S. Han, M. Heinemann, A. Imakita, L. Josefson, W. Nie, D. Olson, F. Roland, and Y. Takeda, 16th International Shop and Offshore Structures Congress: Aug. 20-25, 2006: Southhampton, UK, 49 pages, vol. 2 Specialist Committee V.3 Fabrication Technology Committee Mandate.
Ratnam and Khalid: "Automatic classification of weld defects using simulated data and an MLP neutral network." Insight vol. 49, No. 3; 6 pages, Mar. 2007.
Wang et al., Study on welder training by means of haptic guidance and virtual reality for arc welding, 2006 IEEE International Conference on Robotics and Biomimetics, ROBIO 2006 ISBN-10: 1424405718, 5 pages, p. 954-958.
CS Wave, The Virtual Welding Trainer, 6 pages, 2007.
asciencetutor.com, A division of Advanced Science and Automation Corp., VWL (Virtual Welding Lab), 2 pages, 2007.
Eric Linholm, John Nickolls, Stuart Oberman, and John Montrym, "NVIDIA Testla: A Unifired Graphics and Computing Architecture", IEEE Computer Society, 17 pages, 2008.
NSRP ASE, Low-Cost Virtual Realtiy Welder Training System, 1 Page, 2008.
Edison Welding Institute, E-Weld Predictor, 3 pages, 2008.
CS Wave, A Virtual learning tool for welding motion, 10 pages, Mar. 14, 2008.
The Fabricator, Virtual Welding, 4 pages, Mar. 2008.
N. A. Tech., P/NA.3 Process Modeling and Optimization, 11 pages, Jun. 4, 2008.
FH Joanneum, Fronius—virtual welding, 2 pages, May 12, 2008.
Eduwelding+, Training Activities with arc+ simulator; Weld Into the Future, Online Welding Simulator—A virtual training environment; 123arc.com; 6 pages, May 2008.
ChemWeb.com, Journal of Materials Engineering and Performance (v.7, #5), 3 pgs., printed Sep. 26, 2012.
Choquet, Claude; "Arc+: Today's Virtual Reality Solution for Welders" Internet Page, 6 pages, Jan. 1, 2008.
Juan Vicenete Rosell Gonzales, "RV-Sold: simulator virtual para la formacion de soldadores"; Deformacion Metalica, Es. vol. 34, No. 301, 14 pages, Jan. 1, 2008.
White et al., Virtual welder training, 2009 IEEE Virtual Reality Conference, 1 page, p. 303, 2009.
Training in a virtual environment gives welding students a leg up, retrieved on Apr. 12, 2010 from: http://www.thefabricator.com/article/arcwelding/virtually-welding, 4 pages.
Sim Welder, retrieved on Apr. 12, 2010 from: http://www.simwelder.com, 2 pages.
P. Beatriz Garcia-Allende, Jesus Mirapeix, Olga M. Conde, Adolfo Cobo and Jose M. Lopez-Higuera; Defect Detection in Arc-Welding Processes by Means of the Line-to-Continuum Method and Feature Selection; www.mdpi.com/journal/sensors; 2009; 18 pages; Sensors 2009, 9, 7753-7770; doi; 10.3390/s91007753.
Production Monitoring 2 brochure, four (4) pages, The Lincoln Electric Company, May 2009.
International Search Report and Written Opinion from PCT/IB10/02913, 11 pages, dated Apr. 19, 2011.
Bjorn G. Agren; Sensor Integration for Robotic Arc Welding; 1995; vol. 5604C of Dissertations Abstracts International p. 1123; Dissertation Abs Online (Dialog® File 35): © 2012 ProQuest Info& Learning: http://dialogweb.com/cgi/dwclient?req=1331233317524; one (1) page; printed Mar. 8, 2012.
J. Hu and Hi Tsai, Heat and mass transfer in gas metal arc welding. Part 1: the arc, found in ScienceDirect, International Journal of Heat and Mass Transfer 50 (2007), 14 pages, 833-846 Available on Line on Oct. 24, 2006 http://www.web.mst.edu/~tsai/publications/HU-IJHMT-2007-1-60.pdf.
M. Ian Graham, Texture Mapping, Carnegie Mellon University Class 15-462 Computer Graphics, Lecture 10, 53 pages, dated Feb. 13, 2003.
"High Performance Computer Architectures_A Historical Perspective," downloaded May 5, 2016.
Adams, et al., "Adaptively sampled particle fluids," ACM SIGGRAPH 2007 papers, Aug. 5-9, 2007, San Diego, California.
Aidun, D., "Influence of Simulated High-g on the Weld Size of Al—Li Alloy" Elevator Science Ltd.; 2001; 4 pages.

(56) References Cited

OTHER PUBLICATIONS

Aiteanu et al., "Generation and Rendering of a Virtual Welding Seam in an Augmented Reality Training Environment" Proceedings of the Sixth IASTED International Conference, Aug. 2006, 8 pages.

Aiteanu, "Virtual and Augmented Reality Supervisor for a New Welding Helmet" Dissertation Nov. 15, 2005.

Aiteanu, et al., "A Step Forward in Manual Welding:; Demonstration of Augmented Reality Helmet" Institute of Automation, University of Bremen,; Germany, Proceedings of the Second IEEE and ACM International Symposium on Mixed and; Augmented Reality; 2003; 2 pages.

Aiteanu, et al., "Computer-Aided Manual Welding Using an Augmented; Reality Supervisor" Sheet Metal Welding Conference XII, Livonia, MI, May 9-12, 2006, 14 pages.

American Welding Society Advance Program of Programs and Events. Nov. 11-14, 2007. 31 pages. Chicago, IL.

American Welding Society Detroit Section, "Sheet Metal Welding Conference XII", May 2006, 11 pages.

American Welding Society, "Vision for Welding Industry"; 41 pages.

American Welding Society, http://www.nsrp.org/6-presentations/WDVirtual_Welder. pdf (Virtual Reality Welder Training,; Project No. SI051, Navy ManTech Program, Project Review for Ship Tech 2005); 22 pages.; Biloxi, MS.

American Welding Society, https://app.aws.org/conferences/defense/live index.html (AWS Welding in the Defense; Industry conference schedule, 2004); 12 pages.

American Welding Society, https://app.aws.org/w/r/www/wj/2005/03/WJ_2005_03.pdf (AWS Welding Journal, Mar. 2005; (see, e.g., p. 54)).; 114 pages.

American Welding Society, https://app.aws.org/wj/2004/04/052/njc (AWS Virtual Reality Program to Train Welders for; Shipbuilding, workshop information, 2004); 7 pages.

American Welding Society, https://app.aws.org/wj/2007 /11/WJ200711.pdf (AWS Welding Journal, Nov. 2007); 240 pages.

American Welding Society, Welding Handbook, Welding Science & Technology, Ninth Ed., Copyright 2001. Appendix A "Terms and Definitions".

Arc+—Archived Press Release from WayBack Machine from Jan. 31, 2008-Apr. 22, 2013, Page, https://web.archive.org/web/20121006041803/http://www.123certification.com/en/article_press/index.htm, Jan. 21, 2016, 3 pages.

ArcSentry Weld Quality Monitoring System; Native American Technologies, allegedly 2002, 5; pages.

Arvika Forum Vorstellung Projekt PAARi. BMW Group Virtual Reality Center. 4 pages.; Nuernberg. 2003.

Bargteil, et al., "A semi-lagrangian contouring method for fluid simulation," ACM Transactions on Graphics, 25(1), 2006.

Bargteil, et al., "A texture synthesis method for liquid animations," In Proceedings of the ACM SIGGRAPH/Eurographics Symposium on Computer Animation, Sep. 2006.

Bender Shipbuilding and Repair Co. Virtual Welding—A Low Cost Virtual Reality Welding; Training System. Proposal submitted pursuant to MSRP Advanced Shipbuilding Enterprise; Research Announcement, Jan. 23, 2008. 28 pages, See also, http://www.nsrp.org/6-; Presentations/WD/020409 Virtual Weldinq Wilbur.pdf.

Catalina, et al., "Interaction of Porosity with a Planar Solid/Liquid Interface" ("Catalina"), Metallurgical and Materials Transactions, vol. 35A, May 2004, pp. 1525-1538.

Chentanez, et al., "Liquid simulation on lattice-based tetrahedral meshes." In ACM SIGGRAPH/Eurographics Symposium on Computer Animation 2007, pp. 219-228, Aug. 2007.

Chentanez, et al., "Simultaneous coupling of fluids and deformable bodies," In ACM SIGGRAPH/Eurographics Symposium on Computer Animation, pp. 83-89, Aug. 2006.

Choquet, C., "Arc+®: Today's Virtual Reality Solution for Welders", Published in Proceedings of the IIW Internatioal Conference; Jul. 10-11, 2008; 19 pages.

Clausen, et al., "Simulating liquids and solid-liquid interactions with lagrangian meshes," ACM Transactions on Graphics, 32(2):17:1-15, Apr. 2013. Presented at SIGGRAPH 2013.

CS Wave—Manual, "Virtual Welding Workbench User Manual 3.0" 2007.

CUDA Programming Guide Version 1.1, Nov. 29, 2007.

DA Dalto, et al. "CS Wave: Learning welding motion in a virtual environment" Published in Proceedings of the IIW International Conference, Jul. 10-11, 2008.

Energetics, Inc. "Welding Technology Roadmap", Sep. 2000, 38 pages.

Feldman, et al., "Animating Suspended Particle Explosions". In Proceedings of ACM SIGGRAPH 2003, pp. 708-715, Aug. 2003.

Feldman, et al., "Fluids in deforming meshes" In ACM SIGGRAPH/Eurographics Symposium on Computer Animation 2005, Jul. 2005.

Fite-Georgel, "Is there a Reality in Industrial Augmented Reality?" 10th IEEE International Symposium on Mixed and Augmented Reality (ISMAR). 10 pages, allegedly 2011.

Foster, et al., "Realistic animation of liquids," Graphical Models and Image Processing, v.58 n.5, p. 471-483, Sep. 1996.

Foster, et al., "Practical animation of liquids," Proceedings of the 28th annual conference on Computer graphics and interactive techniques, p. 23-30, Aug. 2001.

Goktekin, et al., "A Method for Animating Viscoelastic Fluids". ACM Transactions on Graphics (Proc. of ACM SIGGRAPH 2004), 23(3):463-468, 2004.

Grahn, A., "Interactive Simulation of Contrast Fluid using Smoothed Particle Hydrodynamics," Jan. 1, 2008, Master's Thesis in Computing Science, Umeå University, Department of Computing Science, Umeå, Sweden.

Hillers, et al., "Augmented Reality—Helmet for the Manual; Welding Process" Institute of Automation, University of Bremen, Germany; 21 pages.

Hillers, et al., "Direct welding arc observation without harsh flicker," 8 pages, allegedly FABTECH International and AWS welding show, 2007.

Hillers, et al., "Real time Arc-Welding Video Observation System." 62nd International Conference of IIW, Jul. 12-17, 2009, 5 pages Singapore 2009.

Hillers, et al., "TEREBES:; Welding Helmet with AR Capabilities", Institute of Automatic University Bremen; Institute of; Industrial Engineering and Ergonomics, 10 pages, alleqedlv 2004.

Hirche, et al. "Hardware Accelerated Per-Pixel Displacement Mapping" University of Tubingen, Germany, Alexander Ehlert, Stefan Guthe, WStlGRfS & Michael Doggett, ATI Research; 8 pages.

Holmberg et al, "Efficient modeling and rendering of turbulent water over natural terrain," In Proceedings of the 2nd international conference on Computer graphics and interactive techniques in Australasia and South East Asia (GRAPHITE '04) 2004.

Irving, et al., "Efficient simulation of large bodies of water by coupling two and three dimensional techniques," ACM SIGGRAPH 2006 Papers, Jul. 30-Aug. 3, 2006, Boston, Massachusetts.

Jeffus, "Welding Principles and Applications" Sixth Edition, 2008, 10 pages.

Kass, et al., "Rapid, Stable Fluid Dynamics for Computer Graphics," Proceedings of SIGGRAPH '90, in Computer Graphics, vol. 24, No. 4, pp. 49-57, 1990.

Klingner, et al., "Fluid animation with dynamic meshes," In Proceedings of ACM SIGGRAPH 2006, pp. 820-825, Aug. 2006.

Kobayashi, et al., "Simulator of Manual Metal Arc Welding with Haptic Display" ("Kobayashi 2001"), Proc. of the 11th International Conf. on Artificial Reality and Telexistence (ICAT), Dec. 5-7, 2001, pp. 175-178, Tokyo, Japan.

Kobayashi, et al., "Skill Training System of Manual Arc Welding by Means of Face-Shield-Like HMD and Virtual Electrode" ("Kobayashi 2003"), Entertainment Computing, vol. 112 of the International Federation for Information Processing (IFIP), Springer Science + Business Media, New York, copyright 2003, pp. 389-396.

Moore, "No exponential is forever: but 'Forever' can be delayed!," IEEE International Solid-State Circuits Conference, 2003.

(56) References Cited

OTHER PUBLICATIONS

Müller, et al., "Particle-based fluid simulation for interactive applications," Proceedings of the 2003 ACM SIGGRAPH/Eurographics symposium on Computer animation, Jul. 26-27, 2003, San Diego, California.

Müller, et al., "Point Based Animation of Elastic, Plastic and Melting Objects," Eurographics/ACM SIGGRAPH Symposium on Computer Animation (2004).

Nealen, A., "Point-Based Animation of Elastic, Plastic, and Melting Objects," CG topics, Feb. 2005.

Nordruch, et al., "Visual Online Monitoring of PGMAW Without a Lighting Unit", Jan. 2005.

O'Brien et al.,"Dynamic Simulation of Splashing Fluids". In Proceedings of Computer Animation 95, pp. 198-205, Apr. 1995.

P/NA.3 Process Modelling and Optimization; Native American Technologies, allegedly 2002,; 5 paqes.

Penrod, "New Welder Training Tools." EWI PowerPoint presentation; 16 pages allegedly 2008.

Phar, "GPU Gems 2 Programming Techniques for High-Performance Graphics and General-Purpose Computation," 2005, 12 pages.

Porter, et al., Virtual Reality Training, vol. 22, No. 3, Aug. 2006; 13 pages.

Premoze, et al., "Particle-based simulation of fluids," Comput. Graph. Forum 22, 3, 401-410, 2003.

Rasmussen, et al., "Directable photorealistic liquids," Proceedings of the 2004 ACM SIGGRAPH/Eurographics symposium on Computer animation, Aug. 27-29, 2004, Grenoble, France.

Renwick, et al., "Experimental Investigation of GTA Weld Pool Oscillations" Welding Research—Supplement to the Welding Journal, Feb. 1983, 7 pages.

Russel, et al., "Artificial Intelligence: A Modern Approach", Prentice-Hall (Copywrite 1995).

Sandor, et al., "Lessons Learned in Designing Ubiquitous Augmented; Reality User Interfaces." 21 pages, allegedly from Emerging Technologies of Augmented; Reality: Interfaces Eds. Haller, M.; Billinghurst, M.; Thomas, B. Idea Group Inc. 2006.

Sandor, et al., "PAARTI: Development of an Intelligent Welding Gun for; BMW." PIA2003, 7 pages, Tokyo. 2003.

SIMFOR / CESOL, "RV-SOLD" Welding Simulator, Technical and Functional Features, 20 pages, estimated Jan. 2010.

Sclater, et al., "Mechanisms and Mechanical Devices Sourcebook," McGraw Hill; 2nd Addition, 1996.

Stam, J., "Stable fluids," Proceedings of the 26th annual conference on Computer graphics and interactive techniques, p. 121-128, Jul. 1999.

SWANTEC corporate web page downloaded Apr. 19, 2016. http://www.swantec.com/technology/numerical-simulation/.

Tamasi, T., "The Evolution of Computer Graphics," NVIDIA, 2008.

Thurey, et al., "Real-time BreakingWaves for Shallow Water Simulations," In Proceedings of the 15th Pacific Conference on Computer Graphics and Applications (PG '07) 2007.

Tonnesen, D., "Modeling Liquids and Solids using Thermal Particles," Proceedings of Graphics Interface'91, pp. 255-262, Calgary, Alberta, 1991.

Tschirner, et al., "Virtual and Augmented Reality for Quality Improvement of Manual Welds" National Institute of Standards and Technology, Jan. 2002, Publication 973, 24 pages.

Tschirner, et al, "A Concept for the Application of Augmented Reality in Manual Gas Metal Arc Welding." Proceedings of the International Symposium on Mixed and Augmented Reality; 2 pages; 2002.

Vesterlund, M., "Simulation and Rendering of a Viscous Fluid using Smoothed Particle Hydrodynamics," Dec. 3, 2004, Master's Thesis in Computing Science, Umeå University, Department of Computing Science, Umeå, Sweden.

Virtual Welding: A Low Cost Virtual Reality Welder Training System, NSRP RA 07-01—BRP Oral Review Meeting in Charleston, SC at ATI, Mar. 2008.

VRSim Inc. "About Us—History" www.vrsim.net/history, 2016, 1 page.

VRSim Powering Virtual Reality, www.lincolnelectric.com/en-us/equipmenl/Iraining-equipmenl/Pages/powered-by-; 'rsim.aspx, 2016, 1 page.

Wang, et al., "Impingement of Filler Droplets and Weld Pool During Gas Metal Arc Welding Process" International Journal of Heat and Mass Transfer, Sep. 1999, 14 pages.

Webster's II new college dictionary, 3rd ed., Houghton Mifflin Co., copyright 2005, Boston, MA, p. 1271, definition of "wake."

Yoder, Fletcher, Opinion U.S. Pat. No. Re. 45,398 and U.S. Appl. No. 14/589,317, including Appendices ; dated Sep. 9, 2015; 1700 pages.

Office Action from U.S. Appl. No. 14/526,914 dated Feb. 3, 2017.

International Search Report for PCT/IB2014/001796, dated Mar. 24, 3016; 8 pages.

International Search Report for PCT/IB2015/000161, dated Aug. 25, 2016; 9 pages.

International Search Report for PCT/IB2015/000777, dated Dec. 15, 2016; 11 pages.

International Search Report for PCT/IB2015/000814 dated Dec. 15, 2016; 9 pages.

Petition for Inter Partes Review of U.S. Pat. No. 8,747,116; IPR 2016-00749; Apr. 7, 2016; 70 pages.

Declaration of Edward Bohnart, Apr. 27, 2016, exhibit to IPR 2016-00749.

Declaration of Dr. Michael Zyda, May 3, 2016, exhibit to IPR 2016-00749.

Trial Denied IPR Proceeding of U.S. Pat. No. 8,747,116; IPR 2016-00749; Sep. 21, 2016; 21 pages.

Petition for Inter Partes Review of U.S. Pat. No. Re. 45,398; IPR 2016-00840; Apr. 18, 2016; 71 pages.

Declaration of AxelGraeser, Apr. 17, 2016, exhibit to IPR 2016-00840; 88 pages.

Decision Denying Request for Rehearing of U.S. Patent No. Re. 45398; IPR 2016-00840; Nov. 17, 2016; 10 pages.

Petition for Inter Partes Review of U.S. Pat. No. 8,747,116; IPR 2016-01568; Aug. 9, 2016; 75 pages.

Decision Termination Proceeding of U.S. Pat. No. 8,747,116; IPR 2016-01568; Nov. 15, 2016; 4 pages.

Petition for Inter Partes Review of U.S. Pat. No. 9,293,056; IPR 2016-00904; May 9, 2016; 91 pages.

Declaration of Edward Bohnart, Apr. 27, 2016, exhibit to IPR 2016-00904; 22 pages.

Declaration of Dr. Michael Zyda, May 3, 2016, exhibit to IPR 2016-00904; 76 pages.

Decision Trial Denied IPR Proceeding of U.S. Pat. No. 9,293,056; IPR 2016-00904; Nov. 3, 2016; 15 pages.

Petition for Inter Partes Review of U.S. Pat. No. 9,293,057; IPR 2016-00905; May 9, 2016; 87 pages.

Declaration of Edward Bohnart, Apr. 27, 2016, exhibit to IPR 2016-00905; 23 pages.

Declaration of Dr. Michael Zyda, May 3, 2016, exhibit to IPR 2016-00905; 72 pages.

Decision Trial Denied IPR Proceeding of U.S. Pat. No. 9,293,057; IPR 2016-00905; Nov. 3, 2016; 21 pages.

*Lincoln Electric Company et al v. Seabery Soluciones SL et al*—1:15-cv-01575-DCN—Complaint filed Aug. 15, 2015.

*Lincoln Electric Company et al v. Seabery Soluciones SL et al*—1:15-cv-01575-DCN—Amended Answer filed Mar. 1, 2016 by Seabery North America.

*Lincoln Electric Company et al v. Seabery Soluciones SL et al*—1:15-cv-01575-DCN—Amended Answer filed Mar. 1, 2016 by Seabery Soluciones SL.

*Lincoln Electric Company et al v. Seabery Soluciones SL et al*—1:15-cv-01575-DCN—Amended Answer filed Mar. 22, 2016 by Lincoln Electri c Company.

*Lincoln Electric Company et al v. Seabery Soluciones SL et al*—1:15-cv-01575-DCN—Answer filed Mar. 22, 2016 by Lincoln Global Inc.

Exhibit B from Declaration of Morgan Lincoln in *Lincoln Electric Co. et al. v. Seabery Soluciones, S.L. et al.*, Case No. 1:15-cv-01575-DCN, dated Dec. 20, 2016, 5 pages.

(56) References Cited

OTHER PUBLICATIONS

Sun Yaoming; Application of Micro Computer in Robotic Technologies; Science and Technology Literature Press; Catalogue of New Books of Science and Technology; Sep. 1987, pp. 360-363.
Kenneth Fast; Virtual Welding—A Low Cost Virtual Reality Welder system training system phase II; NSRP ASE Technology Investment Agreement; Feb. 29, 2012; pp. 1-54.
Arc Simulation & Certification, Weld Into the Future, 4 pages, 2005.
SIMFOR/CESOL, "RV-SOLD" Welding Simulator, Technical and Functional Features, 20 pages, estimated Jan. 2010.
Johannas Hirhe, Alexander Ehlert, Stefan Guthe, Michael Doggett, Hardware Accelerated Per. Pixel Displacement Mapping, 8 pages, May 17, 2004.
Arc+ Welding Simulation presentation; 25 pages, estimated Jan. 2008.
http://www.sciencedirect.com/science/article/pil/
S009457650000151X; Sep. 2011.
Impact Welding: examples from current and archived website, trade shows, etc. See, e.g., http://www.impactweldinq.com. 53 pages, estimated Jan. 2000.
Screen Shot of CS Wave Control Centre V3.0.0 https://web.archive.org/web/20081128081915/http:/wave.cs.fr/images/english/snap_evolution4.jpg, estimated Jan. 2007.
Screen Shot of CS Wave Control Centre V3.0.0 https://web.archive.org/web/20081128081817/http:/wave.cs.fr/images/english/snap_evolution6.jpg, estimated Jan. 2007.
Screen Shot of CS Wave Exercise 135.FWPG Root Pass Level 1 https://www.web.archive.org/web/20081128081858/http:/wave.cs.fr/images/english/snap_evolution2.jpg, estimated Jan. 2007.
TEREBES: examples from http://www.terebes.uni-bremen.de.; 6 pages, estimated Jan. 2004.
T. Borzecki, G. Bruce, YS. Han, et al., Specialist Committee V.3 Fabrication Technology Committee Mandate, Aug. 20-25, 2006, 49 pages, vol. 2, 16th International Ship and Offshore Structures Congress, Southampton, UK.
G. Wang, P.G. Huang, and Y.M. Zhang: "Numerical Analysis of Metal Transfer in Gas Metal Arc Welding": Departments of Mechanical Engineering; and Electrical and Computer Engineering, University of Kentucky, Lexington, KY 40506-0108, Dec. 10, 2001, 10 pages.
William Hoff, Khoi Nguyen,"Computer Vision Based Registration Techniques for Augmented Reality", Colorado School of Mines, Division of Engineering, Proceedings of Intellectual Robots and Computer Vision XV, pp. 538-548; SPIE vol. 2904, Nov. 18-22, 1996, Boston MA.

\* cited by examiner

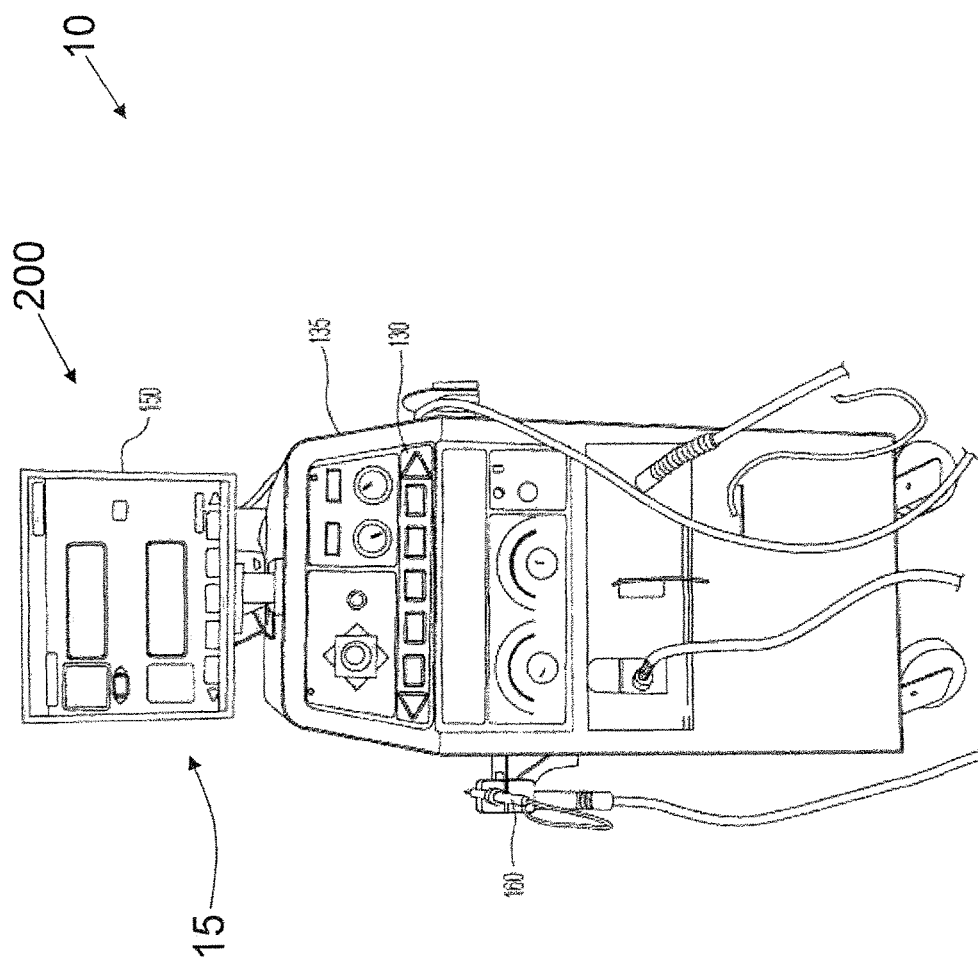

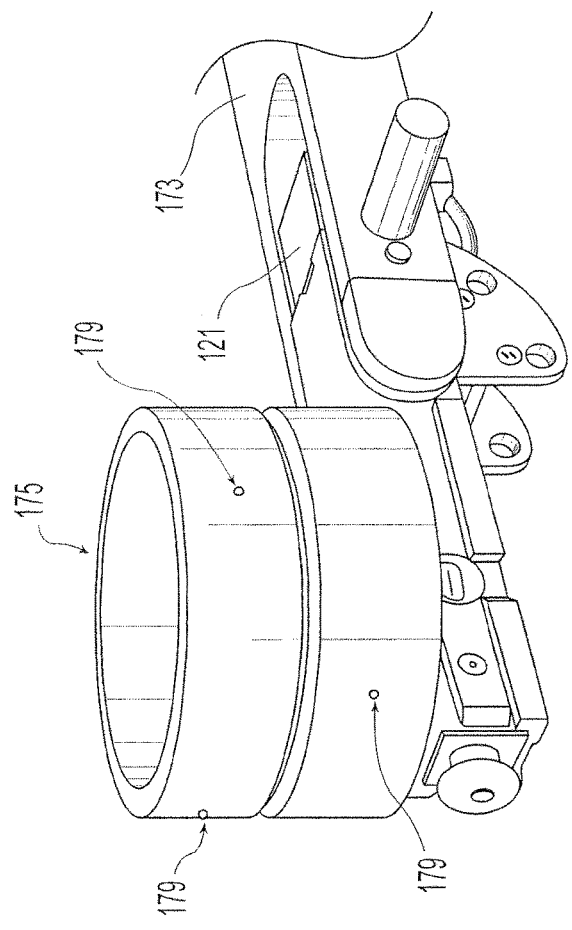
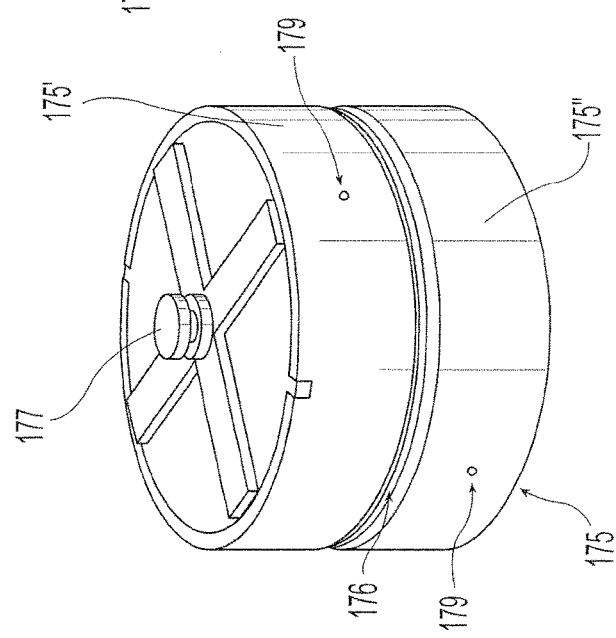
Fig. 9b
Fig. 9a

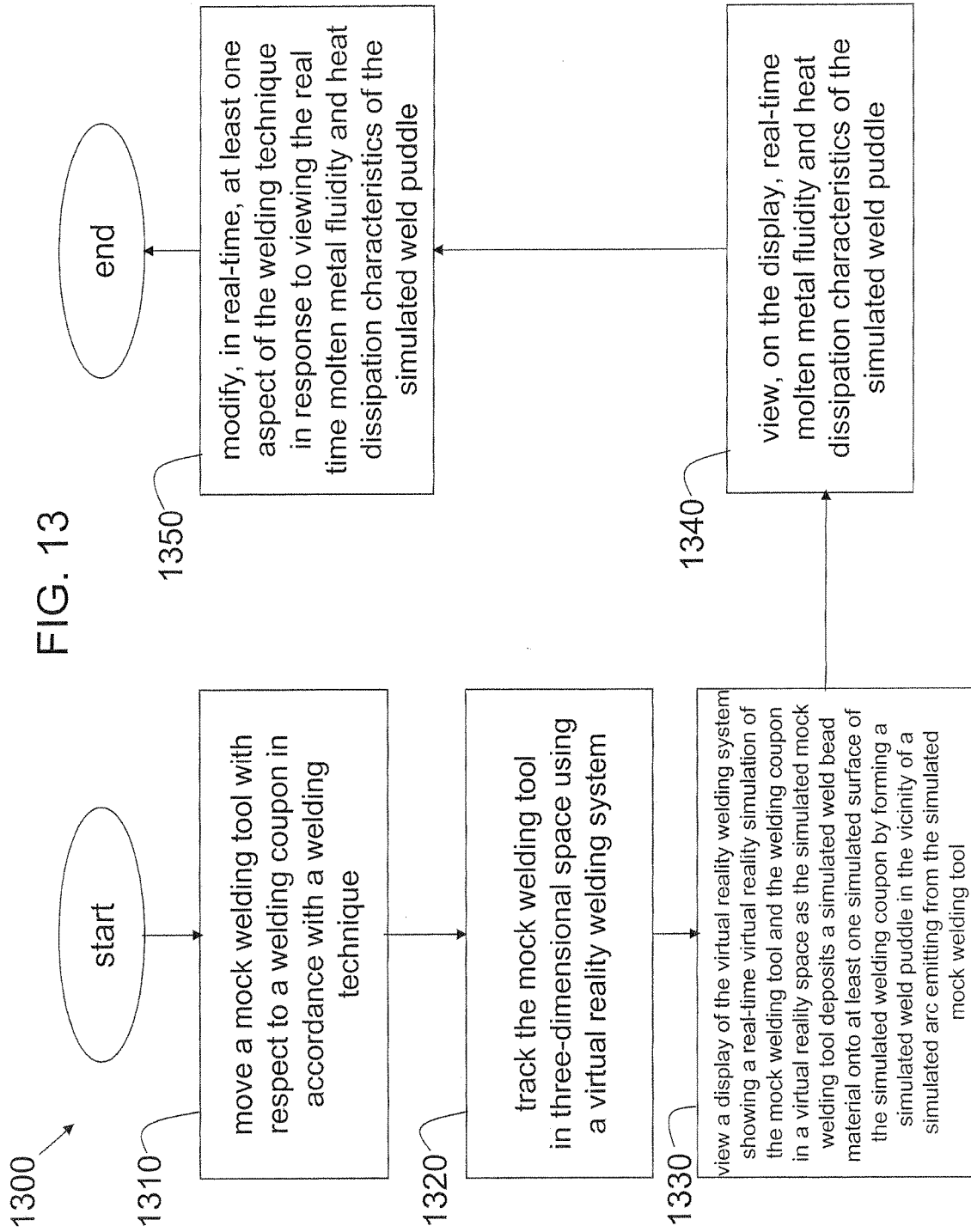

FIG. 17
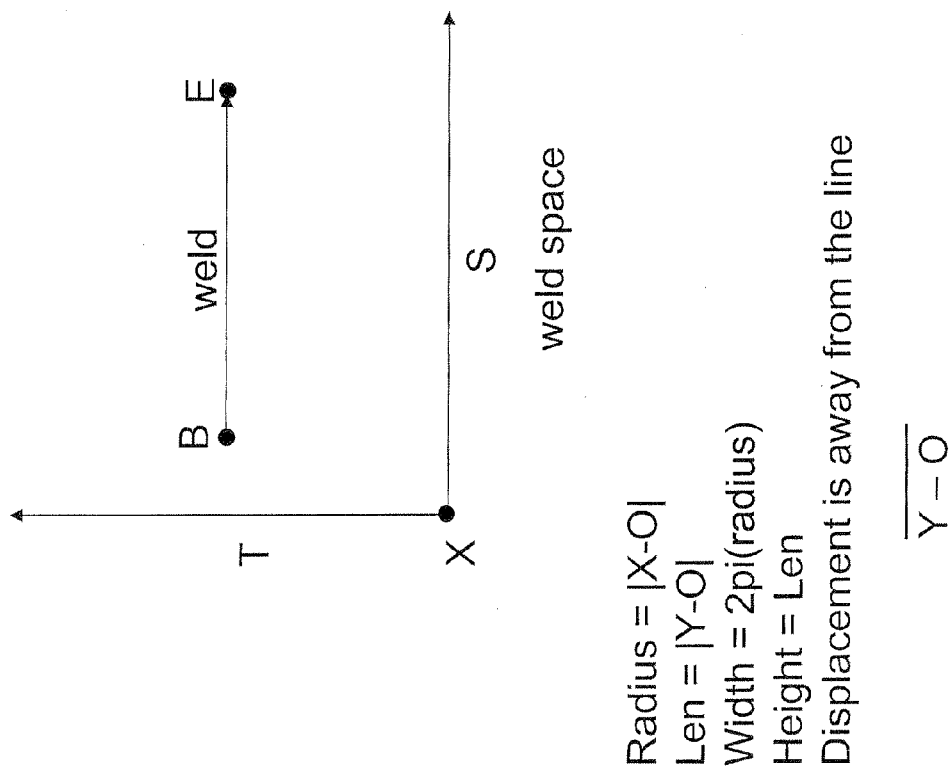
Radius = |X−O|
Len = |Y−O|
Width = 2pi(radius)
Height = Len
Displacement is away from the line $\overline{Y-O}$
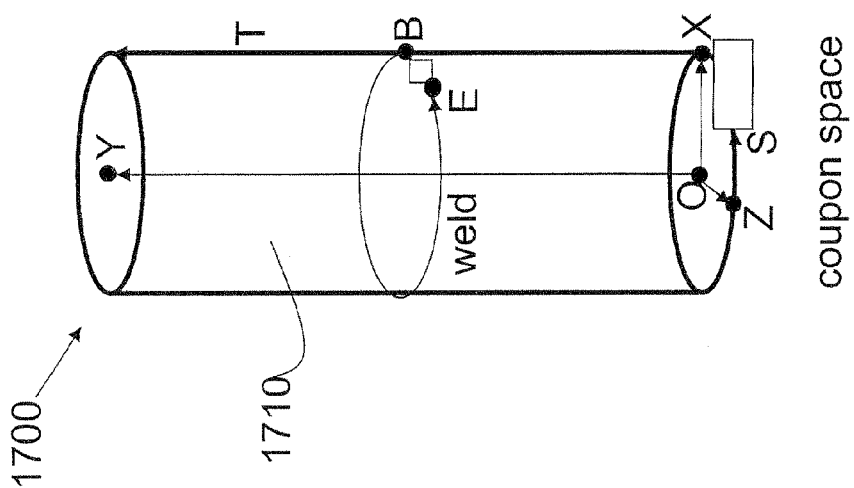

VIRTUAL REALITY GTAW AND PIPE WELDING SIMULATOR AND SETUP

CROSS-REFERENCE TO RELATED APPLICATIONS

This utility patent application is a continuation of U.S. patent application Ser. No. 13/792,294 filed on Mar. 11, 2013, which is incorporated herein by reference in its entirety, and which is a continuation-in-part of U.S. patent application Ser. No. 13/545,058 filed on Jul. 10, 2012, which is incorporated herein by reference in its entirety, and which is a continuation-in-part of U.S. patent application Ser. No. 12/501,263 filed Jul. 10, 2009, which is incorporated herein by reference in its entirety, and which claims priority to U.S. provisional patent application Ser. No. 61/090,794 filed on Aug. 21, 2008.

TECHNICAL FIELD

The present invention pertains to systems for emulating a virtual welding environment, and more particularly to virtual welding environments that emulate Gas Tungsten Arc Welding (GTAW or TIG), the welding of pipe and open root joints in real time, and the setup thereof.

BACKGROUND OF THE INVENTION

For decades companies have been teaching welding skills. Traditionally, welding has been taught in a real world setting, that is to say that welding has been taught by actually striking an arc with an electrode on a piece of metal. Instructors, skilled in the art, oversee the training process making corrections in some cases as the trainee performs a weld. By instruction and repetition, a new trainee learns how to weld using one or more processes. However, costs are incurred with every weld performed, which varies depending on the welding process being taught.

In more recent times, cost saving systems for training welders have been employed. Some systems incorporate a motion analyzer. The analyzer includes a physical model of a weldment, a mock electrode and sensing means that track movement of the mock electrode. A report is generated that indicates to what extent the electrode tip traveled outside an acceptable range of motion. More advanced systems incorporate the use of virtual reality, which simulates manipulation of a mock electrode in a virtual setting. Similarly, these systems track position and orientation. Such systems teach only muscle memory, but cannot teach the more advanced welding skills required of a skilled welder.

BRIEF SUMMARY

One embodiment provides a simulator for facilitating virtual welding activity. The simulator includes a logic processor based subsystem operable to execute coded instructions for generating an interactive welding environment in virtual reality space that emulates welding activity on a virtual welding coupon, wherein the interactive welding environment simulates a virtual weld puddle on the virtual welding coupon, having dynamic real time molten metal fluidity and heat dissipation characteristics, responsive to performing the virtual welding activity in real time. The simulator further includes a foot pedal device in operative communication with the logic processor based subsystem and configured to affect at least one characteristic of the virtual weld puddle in real time, responsive to user control of the foot pedal device. The simulator also includes displaying means operatively connected to the logic processor based subsystem and configured to visually depict the interactive welding environment, including the virtual weld puddle on the virtual welding coupon, in real time.

One embodiment provides a simulator for facilitating virtual welding activity. The simulator includes a mock welding coupon represented in virtual reality space by a virtual welding coupon, and a mock welding tool represented in virtual reality space by a virtual welding tool. The simulator further includes a logic processor based subsystem operable to execute coded instructions for generating an interactive welding environment in virtual reality space that emulates welding activity on the virtual welding coupon by the virtual welding tool, wherein the interactive welding environment simulates a virtual weld puddle on the virtual welding coupon, having dynamic real time molten metal fluidity and heat dissipation characteristics, responsive to performing the virtual welding activity in real time. The simulator also includes one or more first sensors configured to facilitate tracking movement of at least a tip of the mock welding tool in real time by communicating data about the three-dimensional position of the mock welding tool to the logic processor based subsystem. The logic processor based subsystem is configured to determine when the tip of the virtual welding tool, corresponding to the tip of the mock welding tool, intersects a surface of the virtual weld puddle in virtual reality space during the virtual welding activity, and wherein the logic processor based subsystem is further configured to generate an indication, to be provided to a user, that the virtual welding tool has become contaminated due to the intersecting.

One embodiment provides a simulator for facilitating welding activity. The simulator includes a logic processor based subsystem operable to execute coded instructions for generating an interactive welding environment in virtual reality space that emulates gas tungsten arc welding (GTAW) activity on a virtual welding coupon, wherein the interactive welding environment simulates a virtual weld puddle on the virtual welding coupon responsive to performing the simulated welding activity in real time. The simulator also includes displaying means operatively connected to the logic processor based subsystem and configured to visually depict the interactive welding environment, including the virtual weld puddle on the virtual welding coupon, in real time. The simulator may further include a mock welding coupon representative of the virtual welding coupon in virtual reality space, a mock GTAW tool for performing the simulated welding activity on the mock welding coupon in real time as a user manipulates the mock GTAW tool with respect to the mock welding coupon, a spatial tracking subsystem operatively connected to the logic processor based subsystem, and one or more sensors configured to facilitate tracking movement of the mock GTAW tool in real time by communicating data about a temporally changing position of the mock GTAW tool to the spatial tracking subsystem. The mock GTAW tool may simulate a non-consumable tungsten electrode.

One embodiment provides a system for facilitating simulated welding activity. The system includes a mock welding coupon represented in virtual reality space as a virtual welding coupon, a mock gas tungsten arc welding (GTAW) tool, and a logic processor based subsystem operable to execute coded instructions for generating an interactive welding environment in virtual reality space that emulates GTAW activity on the mock welding coupon by the mock GTAW tool, wherein the interactive welding environment simulates a virtual weld puddle on the virtual welding coupon responsive to performing the simulated welding activity in real time. The system also includes a spatial tracking subsystem operatively connected to the logic processor based subsystem, and one or more first sensors configured to facilitate tracking movement of at least a tip of the mock GTAW tool in real time by communicating data about a temporally changing position of the mock GTAW tool to the spatial tracking subsystem. The logic processor based subsystem is configured to accept tracking information from the spatial tracking subsystem and determine when the tip of the mock GTAW tool simulatively intersects a surface of the virtual weld puddle during the simulated welding activity, and wherein the logic processor based subsystem is further configured to generate an indication, to be provided to a user, that the mock GTAW tool has simulatively become contaminated due to the intersecting. The system may also include a mock filler wire and one or more second sensors configured to facilitate tracking movement of at least a tip of the mock filler wire in real time by communicating data about a temporally changing position of the mock filler wire to the spatial tracking subsystem. The logic processor based subsystem may be configured to accept tracking information from the spatial tracking subsystem and determine when the tip of the mock GTAW tool simulatively intersects a surface of the virtual weld puddle during the simulated welding activity, and wherein the logic processor based subsystem is further configured to generate an indication, to be provided to a user, that the mock GTAW tool has simulatively become contaminated due to the intersecting. The logic processor based subsystem may be further configured to determine when the tip of the mock filler wire simulatively penetrates the virtual weld puddle, and modify at least a height of the virtual weld puddle due to the penetration. The system may further include displaying means operatively connected to the logic processor based subsystem for visually depicting the interactive welding environment, wherein said displaying means depicts the virtual weld puddle on the virtual welding coupon in real time. The logic processor based subsystem may be configured to convert the virtual weld puddle to a virtual weld bead during the virtual welding activity, wherein the indication that the mock GTAW tool has simulatively become contaminated due to the intersecting corresponds to depicting the virtual weld bead on the displaying means as having one or more defects. The mock GTAW tool may simulate a non-consumable tungsten electrode. A stick-out position of the mock GTAW tool may be adjustable. The system may further include a user selectable gas flow selector mounted on the mock GTAW tool and configured to communicate to the logic processor based subsystem that a simulated gas flow, as represented in the interactive welding environment in virtual reality space, out of the mock GTAW tool is off when in a first position, and that the simulated gas flow is on when in a second position. The system may also include a plurality of mock gas flow cups each configured to be attached to and detached from the mock GTAW tool, wherein each mock gas flow cup of the plurality of mock gas flow cups is configured to simulate a unique directing of gas flow out of the mock GTAW tool. The logic processor based subsystem may be configured to simulate the establishment of an arc between the tip of the mock GTAW tool and the mock welding coupon when a user touches the tip of the mock GTAW tool to the mock welding coupon and lifts the tip of the mock GTAW tool off of the mock welding coupon in a determined manner. The logic processor based subsystem may be configured to simulate the establishment of an arc between the tip of the mock GTAW tool and the mock welding coupon when a user drags the tip of the mock GTAW tool across a surface of the mock welding coupon in a determined manner. The logic processor based subsystem may be configured to simulate the establishment of an arc between the tip of the mock GTAW tool and the mock welding coupon when a user moves the tip of the mock GTAW tool toward the mock welding coupon in a determined manner, without touching the mock welding coupon with the tip of the mock GTAW tool.

BRIEF DESCRIPTION OF THE DRAWINGS

FIG. 2 is a front view of a simulator;

FIG. 9a is a perspective view of a pipe welding coupon;

FIG. 9b is a perspective view of a pipe welding coupon mounted into the stand.

FIG. 13 is a flow chart of an embodiment of a method of training using the virtual reality training system;

FIG. 17 illustrates an example embodiment of a coupon space and a weld space of a pipe welding coupon simulated in the simulator;

DETAILED DESCRIPTION OF THE INVENTION

Figure 1:
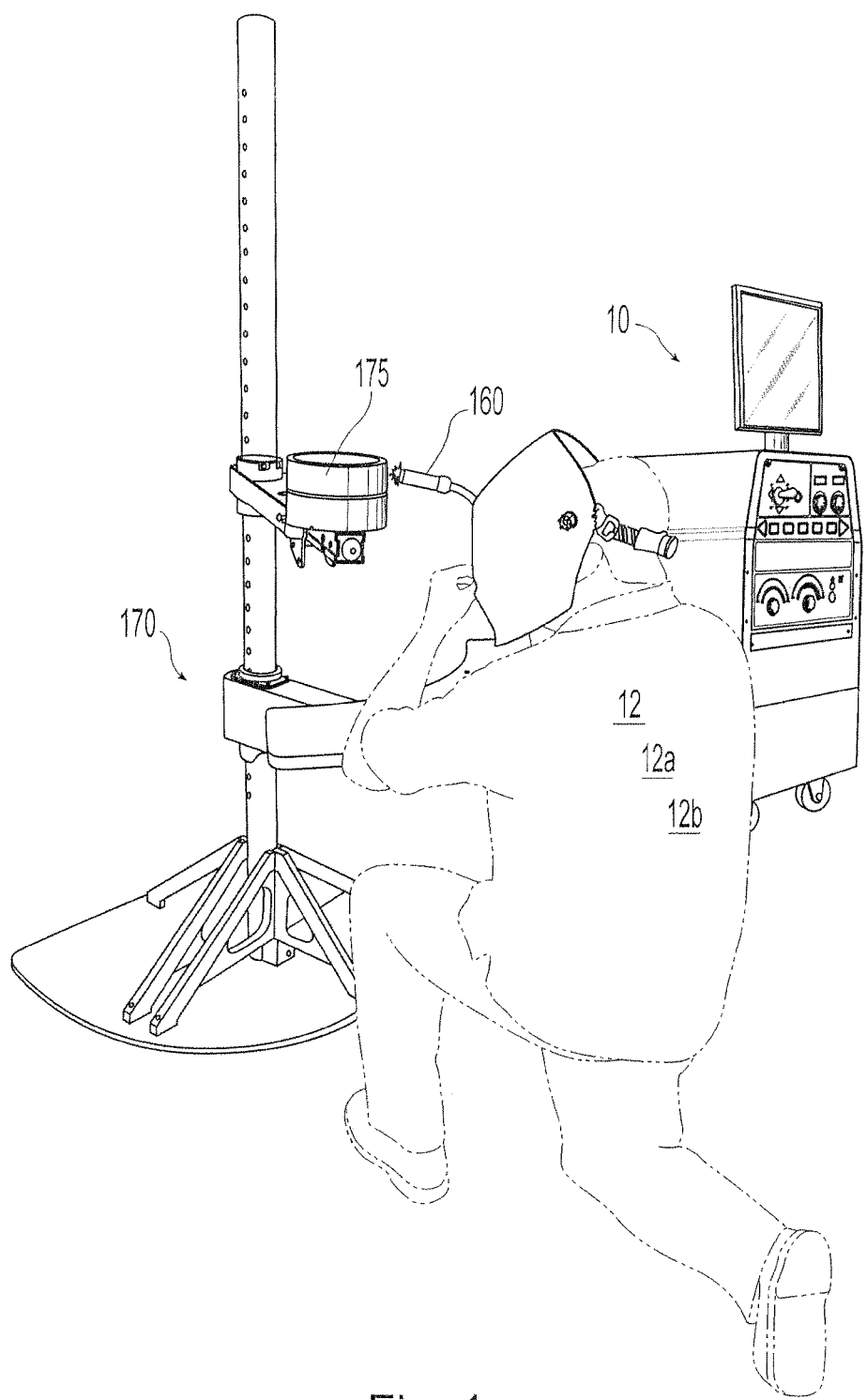
FIG. 1 is a perspective view of an end user operator engaging in virtual welding activity with a simulator.

Referring now to the drawings wherein the showings are for purposes of illustrating embodiments of the invention only and not for purposes of limiting the same, FIGS. 1 and 2 show a system for simulating welding depicted generally at 10, termed herein as simulator 10 or system 10. Simulator 10 is capable of generating a virtual environment 15, which may depict a welding setting similar to that in the real world, and may be known as virtual reality arc welding (VRAW). Within the virtual environment 15, simulator 10 facilitates interaction with one or more end user(s) 12. An input device 155 is included that allows an end user 12 to engage in real-world activity, which is tracked by the simulator 10 and translated into virtual activity. The virtual environment 15 thus comprises an interactive virtual welding environment 15. A displaying device 200 is included that provides visual access into the virtual environment 15 and the end user's 12 activity. In one embodiment, simulator 10 may include a display screen 150 viewable by a plurality of end users 12 or other observers. Additionally, simulator 10 may include a personalized display 140 adapted for use by a single end user 12, which may be a trainee user 12a or an instructor user 12b. It is expressly noted here that the end user's 12 activity in the real world is translated into virtual welding activity and viewed on one or more displays 140, 150 in real-time. As used herein, the term "real-time" means perceiving and experiencing, in time, a virtual environment in the same way that an end user 12 would perceive and experience, in time, in a real-world setting.

In generating an interactive virtual welding environment 15, simulator 10 emulates one or more welding processes for a plurality of weld joints in different welding positions, and additionally emulates the effects of different kinds of electrodes for the plurality of joint configurations. In one particular embodiment, simulator 10 generates an interactive virtual welding environment 15 that emulates pipe welding and/or welding of open root joints. The system is capable of simulating a weld puddle having real-time molten metal fluidity and heat dissipation characteristics. The simulator 10 is also capable of modeling how virtual welding activity affects the weld joint, e.g. the underlying base material. Illustratively, simulator 10 may emulate welding a root pass and a hot pass, as well as subsequent filler and cap passes, each with characteristics paralleling real-world scenarios. Each subsequent pass may weld significantly different from that of the previous pass as a result of changes in the base material made during the previous pass and/or as a result of a differently selected electrode. Real-time feedback of the puddle modeling allows the end user 12 to observe the virtual welding process on the display 200 and adjust or maintain his/her technique as the virtual weld is being performed. Examples of the kinds of virtual indicators observed may include: flow of the weld puddle, shimmer of molten puddle, changes in color during puddle solidification, freeze rate of the puddle, color gradients of heat dissipation, sound, bead formation, weave pattern, formation of slag, undercut, porosity, spatter, slag entrapment, overfill, blowthrough, and occlusions to name a few. It is to be realized that the puddle characteristics are dependent upon, that is to say responsive to, the end user's 12 movement of the input device 155. In this manner, the displayed weld puddle is representative of a real-world weld puddle formed in real-time based on the selected welding process and on the end user's 12 welding technique. Furthermore, "wagon tracks" is the visual trail of weld defects and slag left behind in the toes of the root pass made during pipe welding using the SMAW process. The second pass in pipe welding, called the hot pass, must be hot enough to remelt the wagon tracks so they are eliminated in the final weldment. Also, wagon tracks may be removed by a grinding process. Such wagon tracks and elimination of the wagon tracks are properly simulated in the simulator 10 described herein, in accordance with an embodiment of the present invention.

Figure 3A:
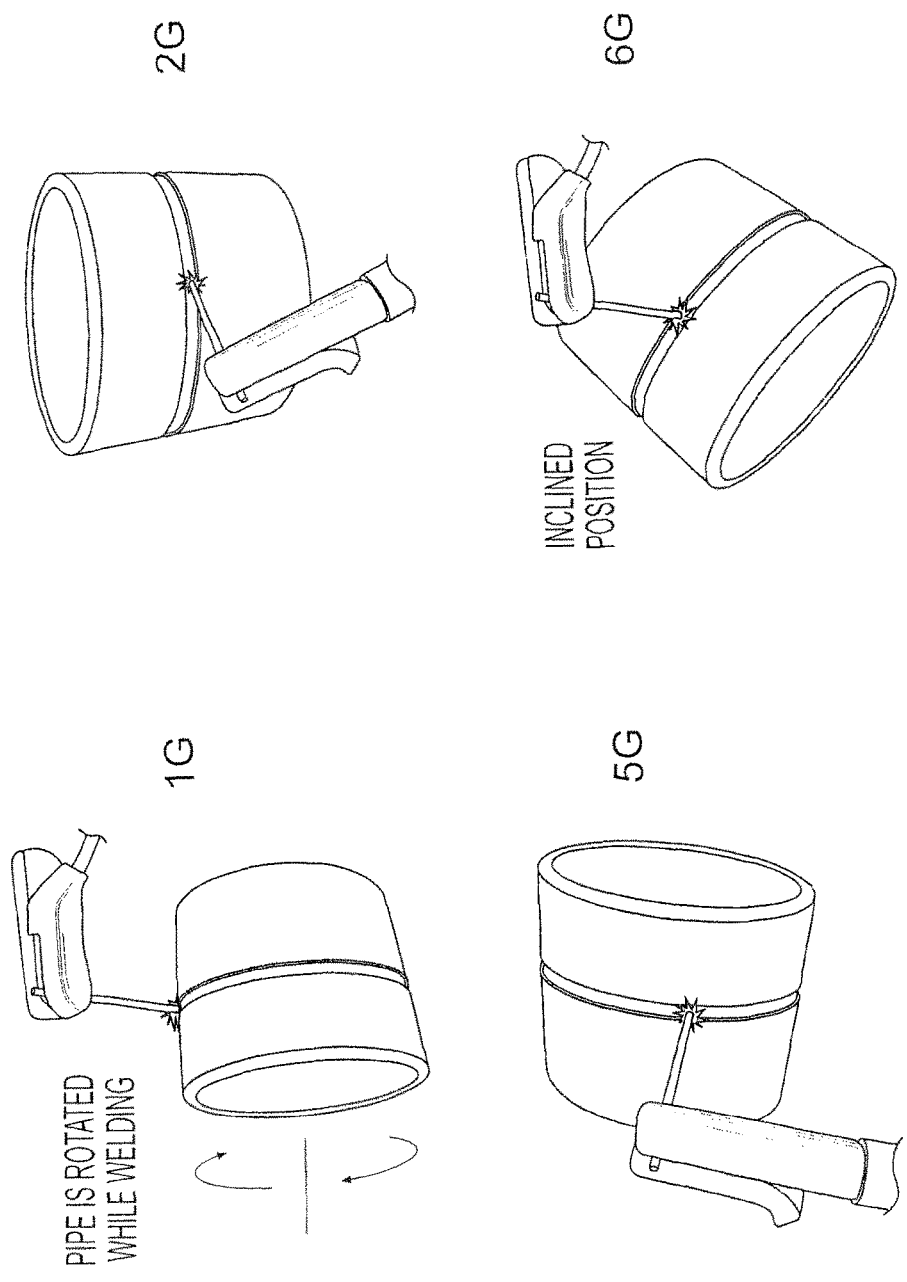
FIG. 3a is a chart showing pipe welding positions.
Figure 3B:
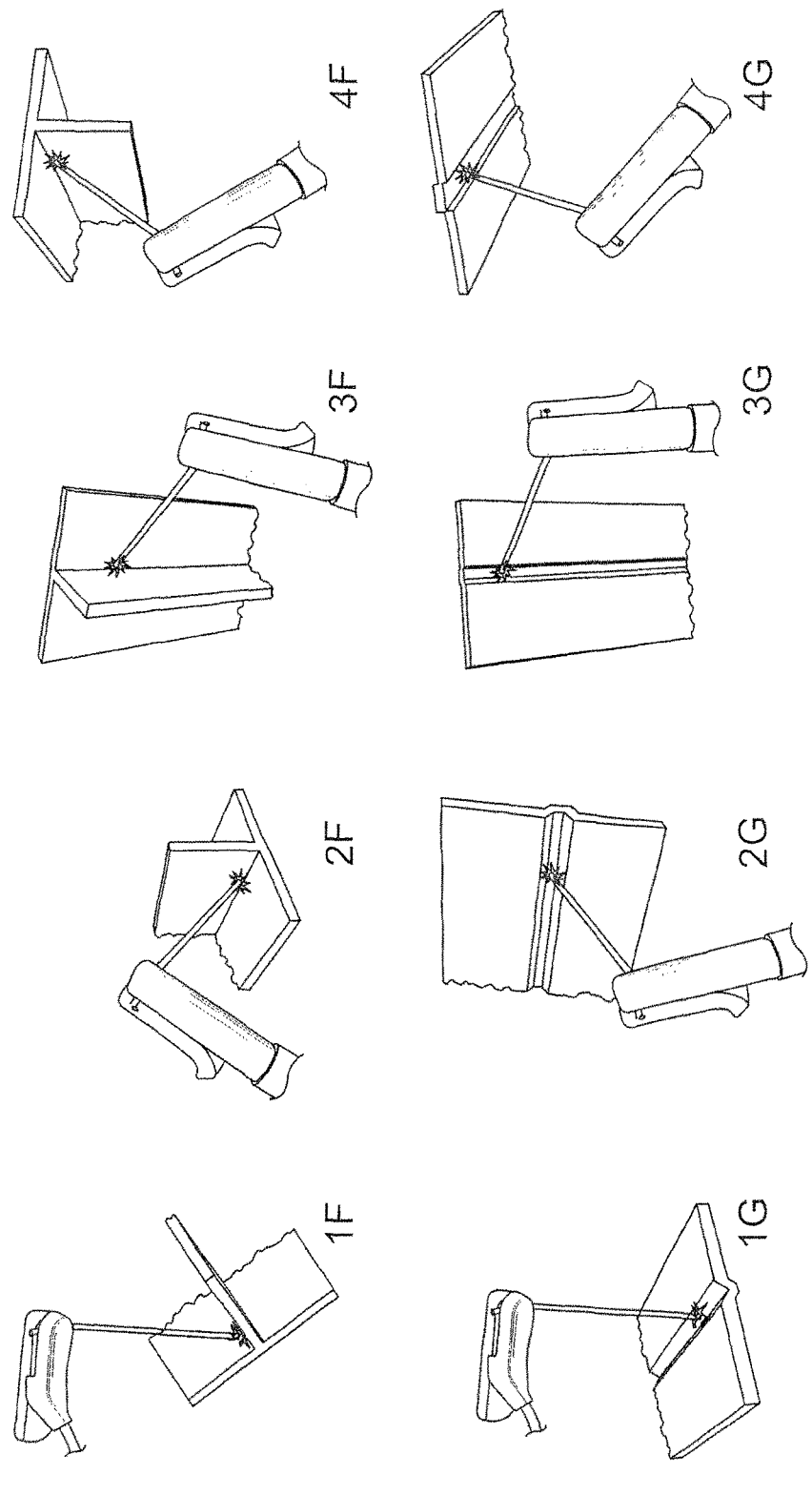
FIG. 3b is a chart showing plate welding positions.

With continued reference to FIGS. 1 and 2 and now also to FIGS. 3a and 3b, simulator 10 may emulate welding processes in various welding positions and models how the weld puddle reacts in each position. More specifically, simulator 10 may emulate pipe welding in vertical, horizontal and/or inclined positions referred to in the art respectively as the 5G, 2G and 6G positions. Additionally, simulator 10 may emulate welding in a 1G position which relates to the rotating horizontal position of the pipe, or in a 4G position which relates to welding overhead as may be associated with a groove weld in abutting plates. Other welding positions may relate to the welding of open root joints for various configurations of flat plate. It is to be understood that the simulator 10, including a modeling and analysis engine to be described in detail in subsequent paragraphs, takes into account the effects of gravity on the weld puddle. Accordingly, the weld puddle reacts differently, for example, for a welding pipe in a 5G position from that of a 6G position. The examples above are not to be construed as limiting, but are included for illustrative purposes. Those skilled in the art will readily understand its application to any weld joint, welding position, or type of weldment including different kinds of base material.

Figure 4:
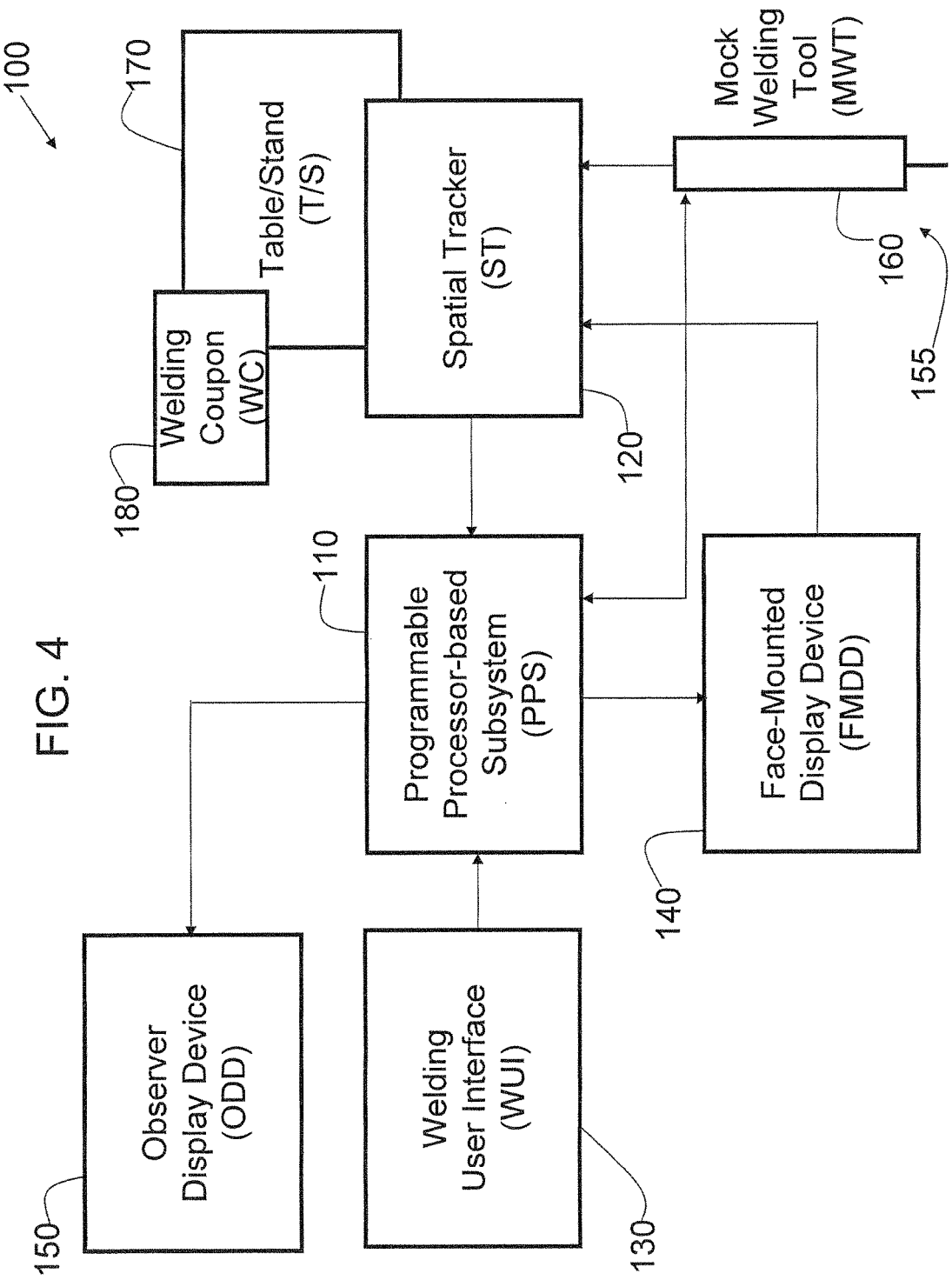
FIG. 4 is an exemplary schematic block diagram of a representation of a first embodiment of a simulator.

With reference now to FIGS. 2 and 4, simulator 10 includes a logic processor-based subsystem 110, which may be programmable and operable to execute coded instructions for generating the interactive virtual welding environment 15. Simulator 10 further includes sensors and/or sensor systems, which may be comprised of a spatial tracker 120, operatively connected to the logic processor-based subsystem 110. Simulator 10 also includes a welding user interface 130 in communication with the logic processor-based subsystem 110 for set up and control of the simulator 10. As referenced above, displaying device(s) 200 are included, which may comprise a face-mounted display device 140 and an observer display device 150 each connected to the logic processor-based subsystem 110 providing visual access to the interactive virtual welding environment 15. One or more of the displaying devices 200 may be connected to the spatial tracker 120 for changing the images viewed on the device in response to its position and/or movement thereof, as described below.

Input Device

Figure 5:
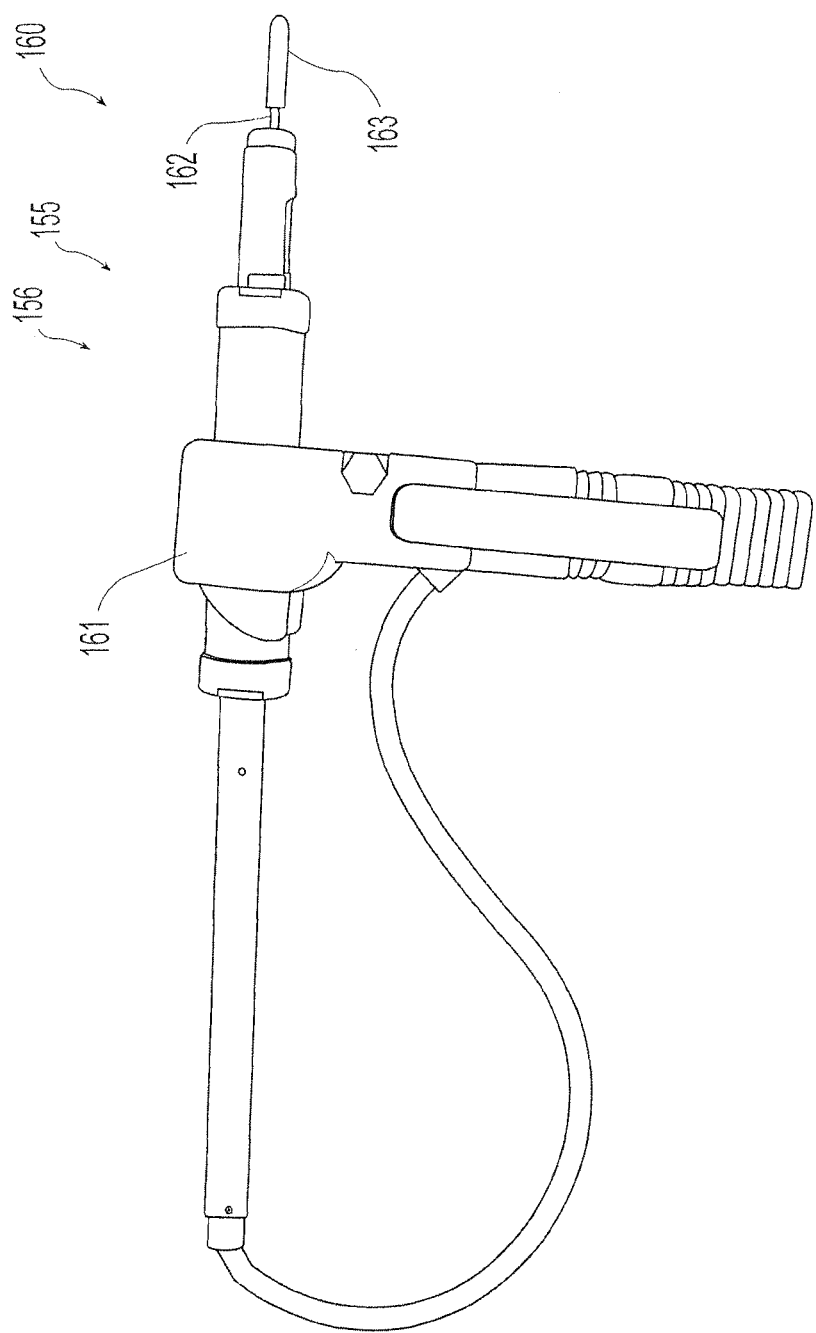
FIG. 5 is a side perspective view of a mock welding tool.

With reference now to FIG. 5, as mentioned above, simulator 10 includes an input device 155 that facilitates interaction with the end-user 12. In one embodiment, input device 155 comprises a mock welding tool 160. The mock welding tool 160 may be fashioned to resemble a real-world welding tool, like for example, a manual welding electrode holder or a weld gun delivering a continuous feed to electrode, i.e. MIG, FCAW, or GTAW welding tools. Still, other configurations of the mock welding tool 160 may be implemented without departing from the intended scope of coverage of the embodiments of the subject invention. For discussion purposes, the embodiments of the subject invention will be described in the context of using a mock welding tool 160 that resembles a manual welding electrode holder 156. The mock welding tool 160 may closely resemble a real world welding tool. In one particular embodiment, mock welding tool 160 may have the same shape, weight and feel as a real-world welding tool. In fact, a real welding tool could be used as the mock welding tool 160 to provide the actual feel of the tool in the user's hands, even though, in the simulator 10, the real welding tool would not be used to actually create a real arc. In this manner, end-user 12, which may be a trainee user 12a, becomes accustomed to handling a real-world welding tool thereby enhancing the virtual welding experience. However, the mock welding tool 160 may be constructed in any manner chosen with sound judgment.

Illustratively, mock welding tool 160 simulates a stick welding tool for pipe welding and includes a holder 161 and a simulated stick electrode 162 extending therefrom. The simulated stick electrode 162 may include a tactilely resistive tip 163 to simulate resistive feedback that occurs during welding in a real-world setting. If the end user 12 moves the simulated stick electrode 162 too far back out of the root (described in detail below), the end user 12 will be able to feel or sense the reduced resistance thereby deriving feedback for use in adjusting or maintaining the current welding process. It is contemplated that the stick welding tool may incorporate an actuator, not shown, that withdraws the simulated stick electrode 162 during the virtual welding process. That is to say that as end user 12 engages in virtual welding activity, the distance between holder 161 and the tip of the simulated stick electrode 162 is reduced to simulate consumption of the electrode. The consumption rate, i.e. withdrawal of the stick electrode 162, may be controlled by the logic processor-based subsystem 110 and more specifically by coded instructions executed by the logic processor-based subsystem 110. The simulated consumption rate may also depend on the end user's 12 technique. It is noteworthy to mention here that as simulator 10 facilitates virtual welding with different types of electrodes, the consumption rate or reduction of the stick electrode 162 may change with the welding procedure used and/or setup of the simulator 10.

The actuator of the mock welding tool 160 may be electrically driven. Power for engaging the actuator may come from the simulator 10, from an external power source or from internal battery power. In one embodiment, the actuator may be an electromotive device, such as an electric motor. Still, any type of actuator or form of motive force may be used including, but not limited to: electromagnetic actuators, pneumatic actuators, mechanical or spring-loaded actuators, in any combination thereof.

As indicated above, the mock welding tool 160 may work in conjunction with the spatial tracker for interacting with the simulator 10. In particular, the position and/or orientation of mock welding tool 160 may be monitored and tracked by the spatial tracker 120 in real time. Data representing the position and orientation may therefore be communicated to the logic processor-based subsystem 110 and modified or converted for use as required for interacting with the virtual welding environment 15.

Spatial Tracker

Figure 8:
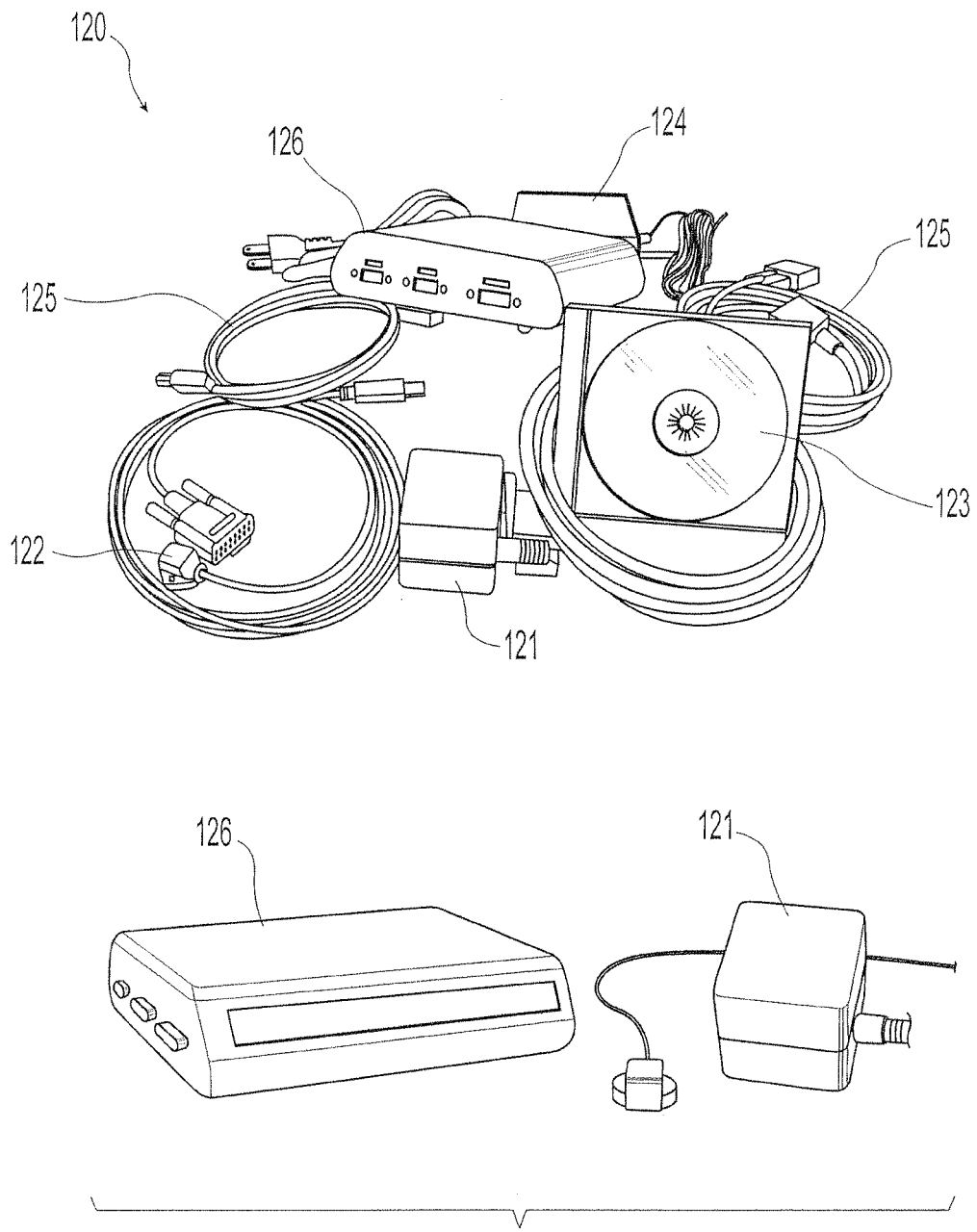
FIG. 8 is a perspective view of a spatial tracker.

Referencing FIG. 8, an example of a spatial tracker 120 is illustrated. Spatial tracker 120 may interface with the logic processor-based subsystem 110. In one embodiment, the spatial tracker 120 may track the mock welding tool 160 magnetically. That is to say that the spatial tracker generates a magnetic envelope, which is used to determine position and orientation, as well as speed and/or changes in speed. Accordingly, the spatial tracker 120 includes a magnetic source 121 and source cable, one or more sensors 122, host software on disk 123, a power source 124, USB and RS-232 cables 125, a processor tracking unit 126, and other associated cables. The magnetic source 121 is capable of being operatively connected to the processor tracking unit 126 via cables, as is sensor 122. The power source 124 is also capable of being operatively connected to the processor tracking unit 126 via a cable. The processor tracking unit 126 is capable of being operatively connected to the logic processor-based subsystem 110 via a USB or RS-232 cable 125. The host software on disk 123 may be loaded onto the logic processor-based subsystem 110 and allows functional communication between the spatial tracker 120 and the logic processor-based subsystem 110.

The magnetic source 121 creates a magnetic field, or envelope, surrounding the source 121 defining a three dimensional space within which end user 12 activity may be tracked for interacting with the simulator 10. The envelope establishes a spatial frame of reference. Objects used within the envelope, e.g. mock welding tool 160 and coupon stand (described below), may be comprised of non-metallic, i.e. non-ferric and non-conductive, material so as not to distort the magnetic field created by the magnetic source 121. The sensor 122 may include multiple induction coils aligned in crossing spatial directions, which may be substantially orthogonally aligned. The induction coils measure the strength of the magnetic field in each of the three directions providing information to the processor tracking unit 126. In one embodiment, the sensor 122 may be attached to the mock welding tool 160 allowing the mock welding tool 160 to be tracked with respect to the spatial frame of reference in both position and orientation. More specifically, the induction coils may be mounted in the tip of the electrode 162. In this way, simulator 10 is able to determine where within the three dimensional envelope the mock welding tool 160 is positioned. Additional sensors 122 may be provided and operatively attached to the one or more displaying devices 200. Accordingly, simulator 10 may use sensor data to change the view seen by the end user 12 responsive to the end user's 12 movements. As such, the simulator 10 captures and tracks the end user's 12 activity in the real world for translation into the virtual welding environment 15.

In accordance with an alternative embodiment of the present invention, the sensor(s) 122 may wirelessly interface to the processor tracking unit 126, and the processor tracking unit 126 may wirelessly interface to the logic processor-based subsystem 110. In accordance with other alternative embodiments of the present invention, other types of spatial trackers 120 may be used in the simulator 10 including, for example, an accelerometer/gyroscope-based tracker, an optical tracker, an infrared tracker, an acoustic tracker, a laser tracker, a radio frequency tracker, an inertial tracker, an active or passive optical tracker, and augmented reality based tracking. Still, other types of trackers may be used without departing from the intended scope of coverage of the embodiment of the subject invention.

Displaying Device

Figure 7C:
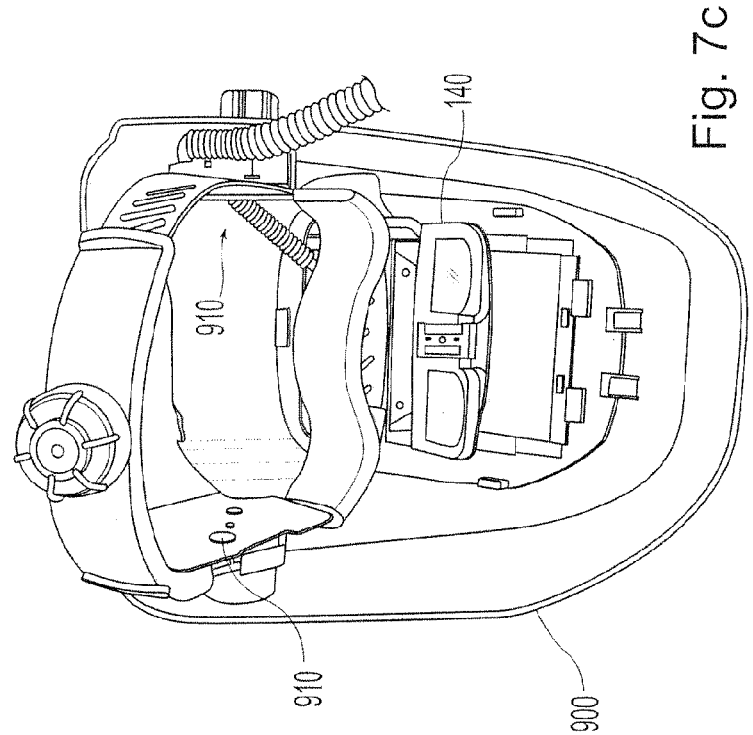
FIG. 7c is perspective view of a personalized display device mounted in a welding helmet.
Figure 7A:
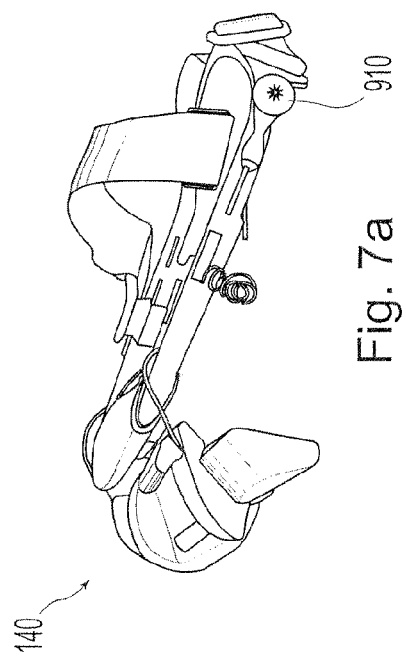
FIG. 7a is perspective view of a personalized display device.
Figure 7B:
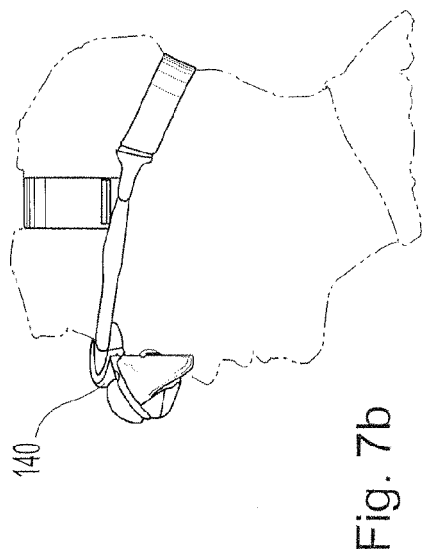
FIG. 7b is perspective view of a personalized display device worn by an end user.

With reference now to FIG. 7a, an example of the face-mounted display device 140 will now be described. The face mounted display device 140 may be integrated into a welding helmet 900, as shown in FIG. 7c or alternatively may be separately mounted as shown in FIG. 7b. The face mounted display device 140 may include two high-contrast SVGA 3D OLED micro-displays capable of delivering fluid full-motion video in the 2D and frame sequential video modes. Virtual images, e.g. video, from the virtual welding environment 15 is provided and displayed on the face mounted display device 140. In one embodiment of the subject invention, the logic processor-based subsystem 110 provides stereoscopic video to the face mounted display device 140, enhancing the depth perception of the user. Stereoscopic images may be produced by a logic processing unit, which may be a graphics processing unit described in detail below. A zoom, e.g., 2×, mode may also be provided, allowing a user to simulate a cheater plate. The face mounted display device 140 operatively connects to the logic processor-based subsystem 110 and the spatial tracker 120 via wired or wireless means. A sensor 122 of the spatial tracker 120 may be attached to the face mounted display device 140 or to the welding helmet 900 thereby allowing the face mounted display device 140 to be tracked with respect to the 3D spatial frame of reference created by the spatial tracker 120. In this way, movement of the welding helmet 900 responsively alters the image seen by the end user 12 in a three dimensional virtual reality setting.

The face mounted display device 140 may also function to call up and display menu items similar to that of observer display device 150, as subsequently described. In this manner, an end user is therefore able to use a control on the mock welding tool 160 (e.g., a button or switch) to activate and select options from the menu. This may allow the user to easily reset a weld if he makes a mistake, change certain parameters, or back up to re-do a portion of a weld bead trajectory, for example.

The face mounted display device 140 may further include speakers 910, allowing the user to hear simulated welding-related and environmental sounds produced by the simulator 10. Sound content functionality and welding sounds provide particular types of welding sounds that change depending on if certain welding parameters are within tolerance or out of tolerance. Sounds are tailored to the various welding processes and parameters. For example, in a MIG spray arc welding process, a crackling sound is provided when the user does not have the mock welding tool 160 positioned correctly, and a hissing sound is provided when the mock welding tool 160 is positioned correctly. In a short arc welding process, a hissing sound is provided when undercutting is occurring. These sounds mimic real world sounds corresponding to correct and incorrect welding technique.

High fidelity sound content may be taken from real world recordings of actual welding using a variety of electronic and mechanical means. The perceived volume and direction of the sound is modified depending on the position, orientation, and distance of the end user's head, i.e. the face mounted display device 140, with respect to the simulated arc between the mock welding tool 160 and the welding coupon 175. Sound may be provided to the user via speakers 910, which may be earbud speakers or any other type of speakers or sound generating device, mounted in the face mounted display device 140 or alternatively mounted in the console 135 and/or stand 170. Still, any manner of presenting sound to the end user 12 while engaging in virtual welding activity may be chosen. It is also noted here that other types of sound information may be communicated through the speakers 910. Examples include verbal instructions from the instructor user 12b, in either real time or via prerecorded messages. Prerecorded messages may be automatically triggered by particular virtual welding activity. Real time instructions may be generated on site or from a remote location. Still, any type of message or instruction may be conveyed to end user 12.

Console

Figure 6:
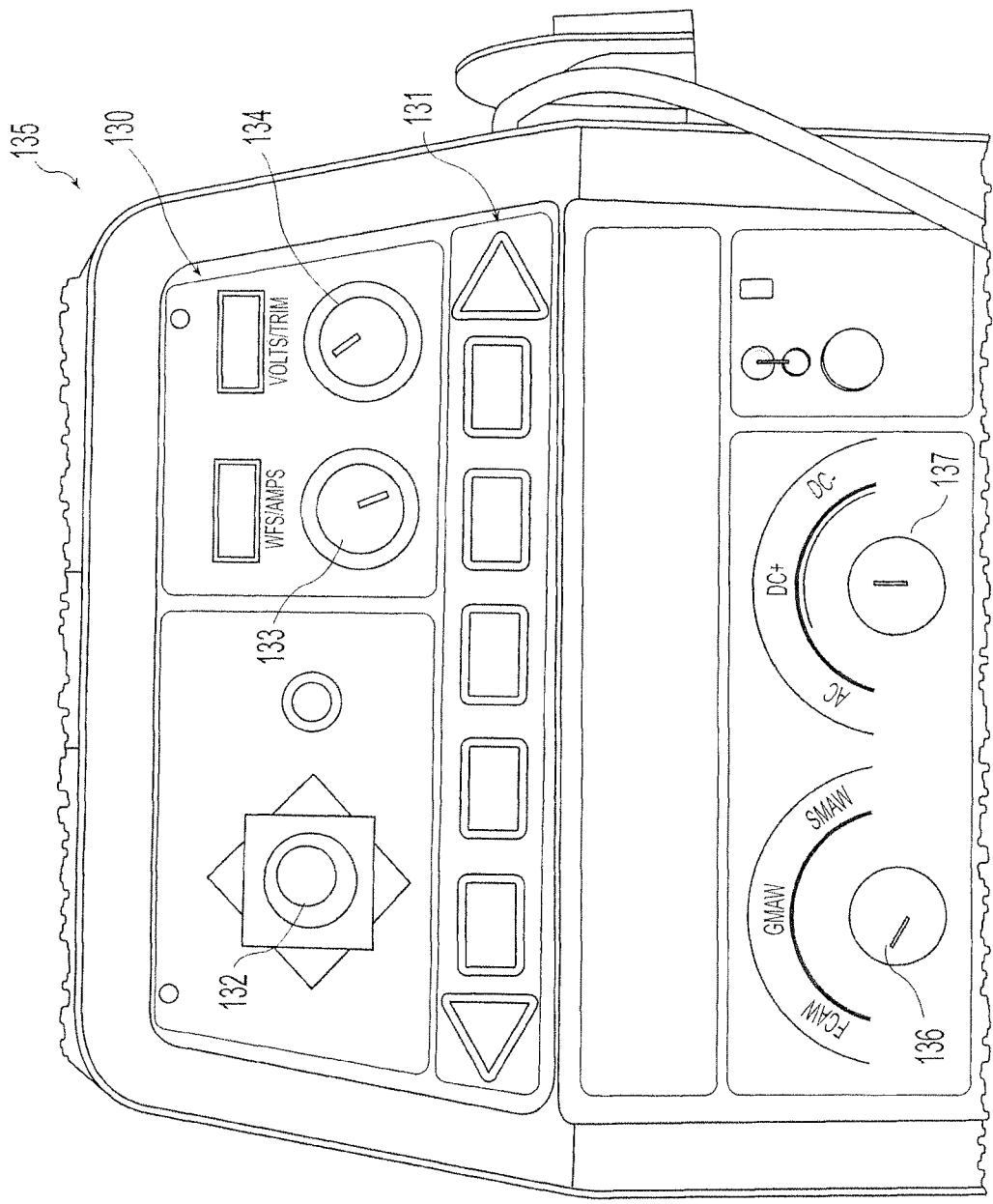
FIG. 6 is a close up view of welding user interface.

With reference now to FIGS. 2, 6 and 7, the simulator 10 may include a console 135 housing one or more components of the simulator 10. In one embodiment, the console 135 may be constructed to resemble a welding power source. That is to say that the shape and size of the console 135 may match that of a real-world device. Operation of the simulator 10 may be facilitated by a welding unit interface 130, which may be fashioned to resemble welding power source knobs, dials and/or switches 133, 134. Simulator 10 may further include a display, which may be displaying device 200. Coded instructions, i.e. software, installed onto the simulator 10 may direct the end user's 12 interaction with the simulator 10 by displaying instructions and/or menu options on the display screen 200. Interaction with the simulator 10 may include functions relating to: administrative activity or simulation set up and activation. This may include selection of a particular welding process and electrode type, as well as part set up including welding position. Selections made by way of welding unit interface 130 are reflected on the displaying device 200.

FIG. 6 illustrates an exemplary embodiment of the console 135 and welding user interface 130. The welding unit interface 130 may include a set of buttons 131 corresponding to the user selections 153 used during set up and operation of the simulator 10. The buttons 131 may be colored to correspond to colors of the user selections 153 displayed on displaying device 200. When one of the buttons 131 is pressed, a signal is sent to the logic processor-based subsystem 110 to activate the corresponding function. The welding unit interface 130 may also include a joystick 132 capable of being used by a user to select various parameters and selections displayed on the displaying device 200. The welding unit interface 130 further includes a dial or knob 133, which in an exemplary manner, may be used for adjusting wire feed speed/amps, and another dial or knob 134 for adjusting volts/trim. The welding unit interface 130 also includes a dial or knob 136 for selecting an arc welding process. In accordance with an embodiment of the present invention, three arc welding processes are selectable including flux cored arc welding (FCAW), gas metal arc welding (GMAW), and shielded metal arc welding (SMAW). The welding unit interface 130 further includes a dial or knob 137 for selecting a welding polarity. In accordance with an embodiment of the present invention, three arc welding polarities are selectable including alternating current (AC), positive direct current (DC+), and negative direct current (DC−). Still, other welding processes and set up features may be incorporated in the simulator 10 without departing from the intended scope of coverage of the embodiments of the subject invention, including but not limited to TIG welding. From the aforementioned, it will be readily seen that set up of the simulator 10 parallels set up of a real-world device.

The graphical user interface functionality 1213 (see FIG. 12) allows a user, viewable via the observer display device 150 and using the joystick 132 of the physical user interface 130, to set up a welding scenario. The set up of a welding scenario may include selecting a language, entering an end user name, selecting a practice plate (e.g. a welding coupon, T-plate, flat plate), selecting a welding process (e.g., FCAW, GMAW, SMAW, TIG) and associated axial spray, pulse, or short arc mode of transfer, selecting a gas type and flow rate, selecting a type of stick electrode (e.g., E6010 or E7018), and selecting a type of flux cored wire (e.g., self-shielded, gas-shielded). The set up of a welding scenario may also include setting up a coupon stand 170 to be discussed in detail below. The set up of a welding scenario further includes selecting an environment (e.g., a background environment in virtual reality space), setting a wire feed speed, setting a voltage level, selecting a polarity, and turning particular visual cues on or off. It is noted here that in one embodiment, limitations may be incorporated into the simulator 10, which may be software limitations, that prevent operation of a given welding scenario until the appropriate settings for a selected process have been properly entered. In this way, trainee users 12a are taught or learn the proper range of real-world welding settings by setting up virtual welding scenarios.

Accordingly, displaying device 200 reflects activity corresponding to the end user selections 153 including menu, actions, visual cues, new coupon set up, and scoring. These user selections may be tied to user buttons on the console 135. As a user makes various selections via displaying device 200, the displayed characteristics can change to provide selected information and other options to the user. However, the displaying device 200, which may be an observer display device 150, may have another function, which is to display virtual images seen by the end user 12 during operation of the simulator 10, i.e. while engaging in virtual welding activity. Displaying device 200 may be set up to view the same image as seen by the end user 12. Alternatively, displaying device 200 may also be used to display a different view, or different perspective of the virtual welding activity.

Figure 10:
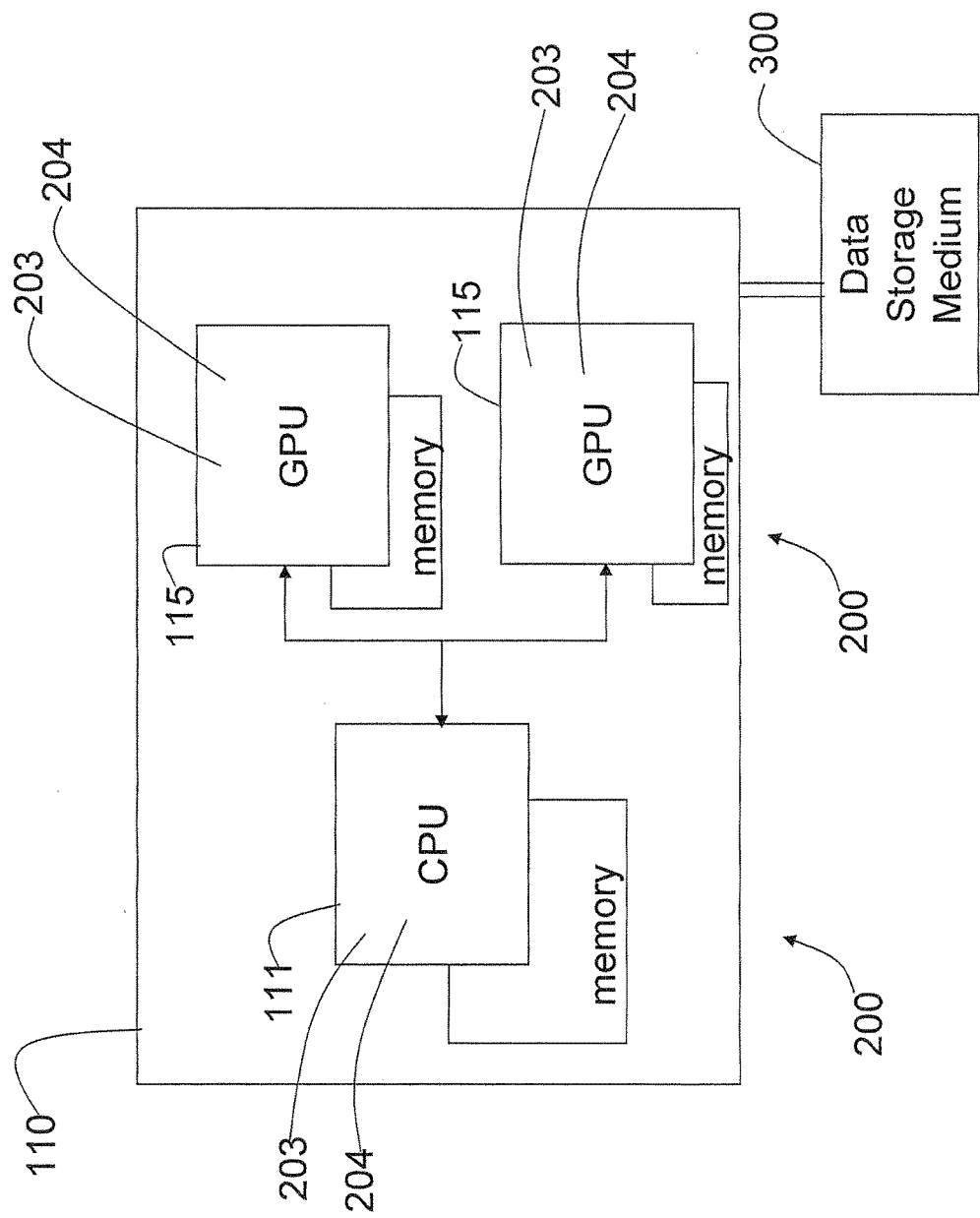
FIG. 10 illustrates an example embodiment of a subsystem block diagram of a logic processor-based subsystem.

In one embodiment, displaying device 150, 200 may be used to play back virtual welding activity stored electronically on data storage devices 300, shown in FIG. 10. Data representing the end user's 12 virtual welding activity may be stored for: playback and review, downloaded for archiving purposes and/or transmitted to remote locations for viewing and critiquing in real-time. In replaying the virtual welding activity, details such as weld puddle fluidity, travel speed, as well as discontinuity states 152 including, for example, improper fillet size, poor bead placement, concave bead, excessive convexity, undercut, porosity, incomplete fusion, slag entrapment, excess spatter, and burn-through, may be represented. Undercut may also be displayed, which is the result of an out of tolerance angle. Moreover, porosity may be displayed caused by moving the arc too far away from the weldment. In this manner, the simulator 10 is capable of replaying part or all of particular virtual welding activity, modeling all aspects of the virtual welding scenario including occlusions and defects related directly to the end user's activity.

Figure 6A:
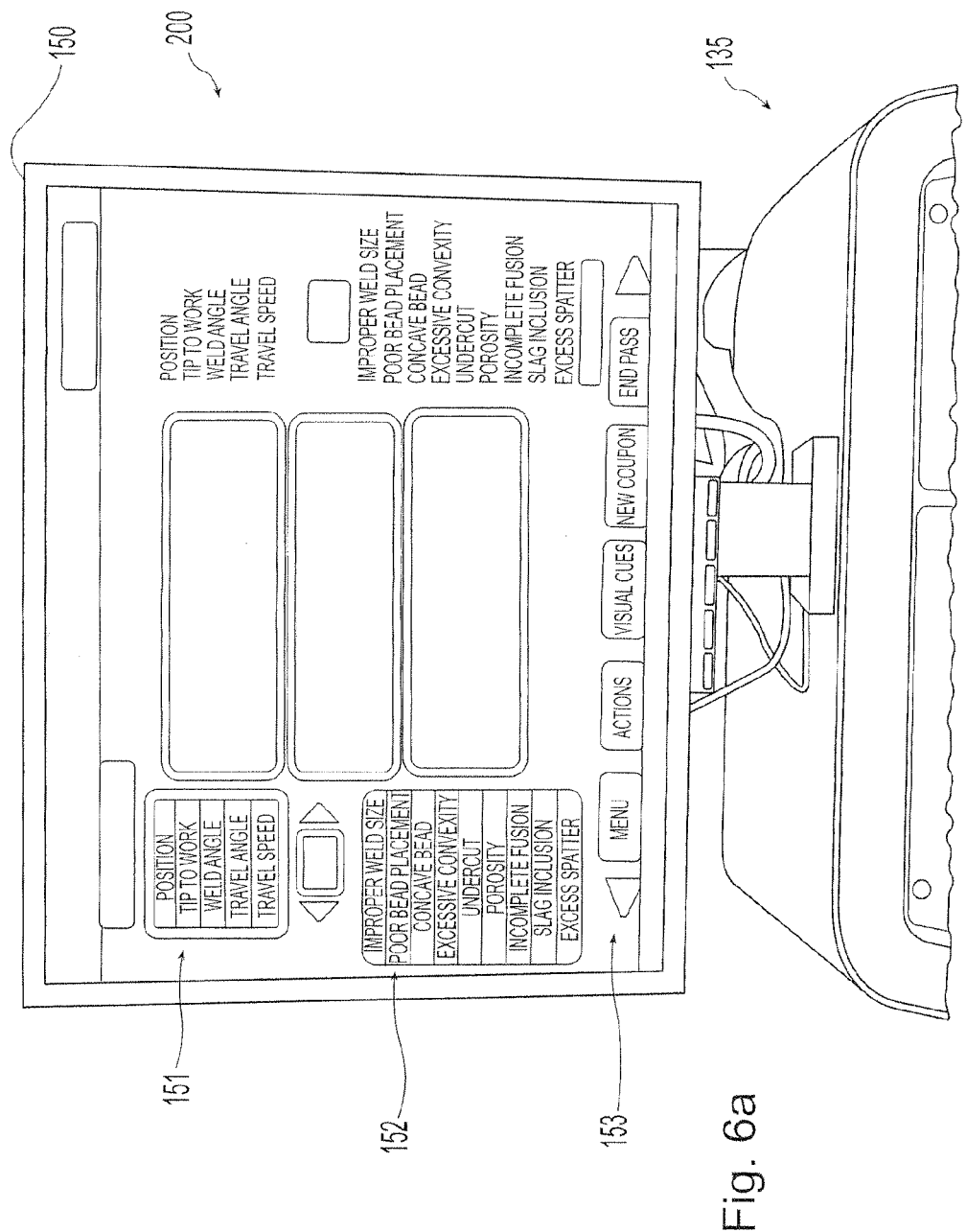
FIG. 6a is a close up view of an observer display device.

Referencing FIG. 6a, simulator 10 is also capable of analyzing and displaying the results of virtual welding activity. By analyzing the results, it is meant that simulator 10 is capable of determining when during the welding pass and where along the weld joints, the end user 12 deviated from the acceptable limits of the welding process. A score may be attributed to the end user's 12 performance. In one embodiment, the score may be a function of deviation in position, orientation and speed of the mock welding tool 160 through ranges of tolerances, which may extend from an ideal welding pass to marginal or unacceptable welding activity. Any gradient of ranges may be incorporated into the simulator 10 as chosen for scoring the end user's 12 performance. Scoring may be displayed numerically or alphanumerically. Additionally, the end user's 12 performance may be displayed graphically showing, in time and/or position along the weld joint, how closely the mock welding tool traversed the weld joint. Parameters such as travel angle, work angle, speed, and distance from the weld joint are examples of what may be measured, although any parameters may be analyzed for scoring purposes. The tolerance ranges of the parameters are taken from real-world welding data, thereby providing accurate feedback as to how the end user will perform in the real world. In another embodiment, analysis of the defects corresponding to the end user's 12 performance may also be incorporated and displayed on the displaying device 150, 200. In this embodiment, a graph may be depicted indicating what type of discontinuity resulted from measuring the various parameters monitored during the virtual welding activity. While occlusions may not be visible on the displaying device 200, defects may still have occurred as a result of the end user's 12 performance, the results of which may still be correspondingly displayed, i.e. graphed.

Displaying device 200 may also be used to display tutorial information used to train an end user 12. Examples of tutorial information may include instructions, which may be displayed graphically as depicted by video or pictures. Additionally, instructions may be written or presented in audio format, mentioned above. Such information may be stored and maintained on the data storage devices 300. In one embodiment, simulator 10 is capable of displaying virtual welding scenes showing various welding parameters 151 including position, tip to work, weld angle, travel angle, and travel speed, termed herein as visual cues.

In one embodiment, remote communications may be used to provide virtual instruction by offsite personnel, i.e. remote users, working from similarly or dissimilarly constructed devices, i.e. simulators. Portraying a virtual welding process may be accomplished via a network connection including but not limited to the internet, LANs, and other means of data transmission. Data representing a particular weld (including performance variables) may be sent to another system capable of displaying the virtual image and/or weld data. It should be noted that the transmitted data is sufficiently detailed for allowing remote user(s) to analyze the welder's performance. Data sent to a remote system may be used to generate a virtual welding environment thereby recreating a particular welding process. Still, any way of communicating performance data or virtual welding activity to another device may be implemented without departing from the intended scope of coverage of the embodiments of the subject invention.

Welding Coupon

With reference now to FIGS. 1, 9a and 9b, simulator 10 may include a welding coupon 175 that resembles pipe sections juxtaposed to form a welding joint 176. The welding coupon 175 may work in conjunction with the simulator 10 serving as a guide for the end user 12 while engaging in virtual welding activity. A plurality of welding coupons 175 may be used, that is to say interchanged for use in a given cycle of virtual welding activity. The types of welding coupons may include cylindrical pipe sections, arcuate pipe segments, flat plate and T-plate weld joints, just to name a few. In one embodiment, each of the welding coupons may incorporate open root joints or grooves. However, any configurations of weld joints may be incorporated into a welding coupon without departing from the intended scope of coverage of the embodiments of the subject invention.

The dimensions of welding coupons 175 may vary. For cylindrical pipe, the range of inside diameters may extend from 1½ inches (inside diameter) to 18 inches (inside diameter). In one particular embodiment, the range of inside diameters may exceed 18 inches. In another embodiment, arcuate pipe segments may have a characteristic radius in the range extending from 1½ inches (inside diameter) up to and exceeding 18 inches (inside diameter). Furthermore, it is to be construed that any inside diameter of welding coupon 175 may be utilized, both those smaller than 1½ inches and those exceeding 18 inches. In a practical sense, any size of welding coupon 175 can be used as long as the welding coupon 175, or a portion of the welding coupon 175, fits within the envelope generated by the spatial tracker 120. Flat plate may extend up to and exceed 18 inches in length as well. Still, it is to be understood that the upper dimensional limits of a welding coupon 175 are constrained only by the size and strength of the sensing field generated by the spatial tracker 120 and its ability to be positioned respective of the welding coupon 175. All such variations are to be construed as falling within the scope of coverage of the embodiments of the subject invention.

As mentioned above, the welding coupon 175 may be constructed from a material that does not interfere with the spatial tracker 120. For spatial trackers generating a magnetic field, the welding coupon 175 may be constructed from non-ferrous and non-conductive material. However, any type of material may be chosen that is suitable for use with the type of spatial tracker 120 or other sensors selected.

Referencing FIGS. 9a and 9b, the welding coupon 175 may be constructed so that it fits into a table or stand 170, which functions (at least in part) to hold the welding coupon 175 constant with respect to the spatial tracker 120. Accordingly, the welding coupon 175 may include a connecting portion 177 or connector 177. The connecting portion 177 may extend from one side of the welding coupon 175, which as illustrated may be the bottom side, and may be received into a mechanical interlocking device included with the stand 170. It will be appreciated that the orientation at which the welding coupon 175 is inserted into the stand 170 may need to be constant, i.e. repeatable, for closely matching the virtual weldment, i.e. pipe, created within the virtual welding environment 15. In this manner, as long as the simulator 10 is aware of how the position of the welding coupon 175 has changed, adjustments to the virtual counterpart may be made accordingly. For example, during set up, the end user 12 may select the size of pipe to be welded on. The end user 12 may then insert the appropriate welding coupon 175 into the stand 170, locking it into position. Subsequently, the end user 12 may choose a desired welding position making the selection via the welding user interface 130. As will be described below, the stand 170 may then be tilted or adjusted to position the welding coupon 175 in any of the welding positions recognized by the simulator 10. Of course, it will be appreciated that adjusting the position of the welding coupon 175 also adjusts the position of the spatial tracker 120 thereby preserving the relative position of the welding coupon 175 within the sensory tracking field.

Figure 9:
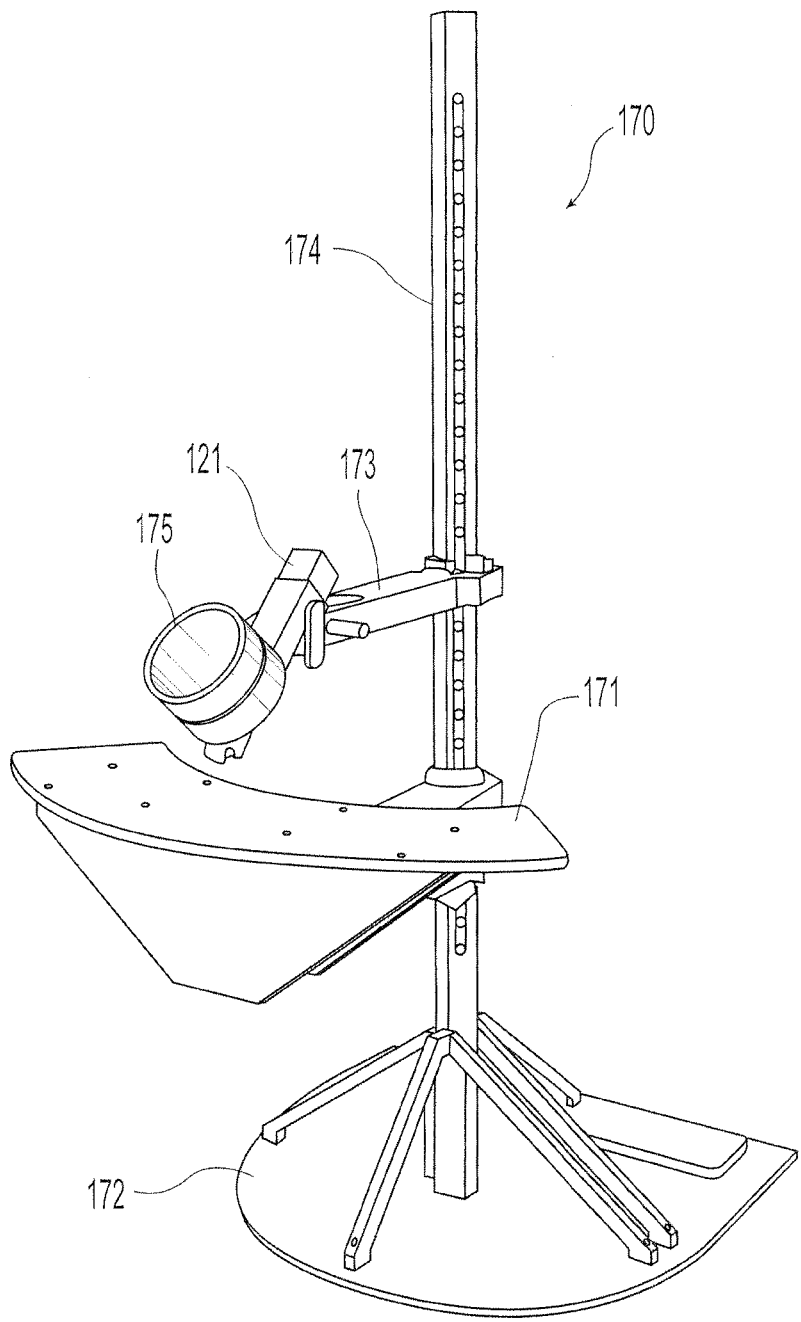
FIG. 9 is a perspective view of a stand for holding welding coupons.

FIG. 9 depicts one embodiment of the stand 170. The stand 170 may include an adjustable table 171, a stand base 172, an adjustable arm 173, and a vertical post 174. The table 171 and the arm 173 are respectively attached to the vertical post 174. The table 171 and the arm 173 are each capable of being adjusted along the height of the vertical post 174, which may include upward, downward, and/or rotational movement with respect to the vertical post 174. The arm 173 is used to hold the welding coupon 175, in a manner consistent with that discussed herein. The table 171 may assist the end user 12 by allowing his/her arms to rest on the table 171 during use. In one particular embodiment, the vertical post 174 is indexed with position information such that a user may know exactly where the arm 173 and the table 171 are positioned. This information may also be entered into the simulator 10 by way of the welding user interface 130 and the displaying device 150 during set up.

An alternative embodiment of the subject invention is contemplated wherein the positions of the table 171 and the arm 173 are automatically adjusted responsive to selections made during set up of the simulator 10. In this embodiment, selections made via the welding user interface 130 may be communicated to the logic processor-based subsystem 110. Actuators and feedback sensors employed by the stand 170 may be controlled by the logic processor-based subsystem 110 for positioning the welding coupon 175 without physically moving the arm 173 or the table 171. In one embodiment, the actuators and feedback sensors may comprise electrically driven servomotors. However, any locomotive device may be used to automatically adjust the position of the stand 170 as chosen with sound engineering judgment. In this manner, the process of setting up the welding coupon 175 is automated and does not require manual adjustment by the end user 12.

Another embodiment of the subject invention includes the use of intelligence devices used in conjunction with the welding coupon 175, termed herein as "smart" coupons 175. In this embodiment, the welding coupon 175 includes a device having information about that particular welding coupon 175 that may be sensed by the stand 170. In particular, the arm 173 may include detectors that read data stored on or within the device located on the welding coupon 175. Examples may include the use of digital data encoded on a sensor, e.g. micro-electronic device, that may be read wirelessly when brought into proximity of the detectors. Other examples may include the use of passive devices like bar coding. Still any manner of intelligently communicating information about the welding coupon 175 to the logic processor-based subsystem 110 may be chosen with sound engineering judgment.

The data stored on the welding coupon 175 may automatically indicate, to the simulator 10, the kind of welding coupon 175 that has been inserted in the stand 170. For example, a 2-inch pipe coupon may include information related to its diameter. Alternatively, a flat plate coupon may include information that indicates the kind of weld joint included on the coupon, e.g. groove weld joint or a butt weld joint, as well as its physical dimensions. In this manner, information about the welding coupon 175 may be used to automate that portion of the setup of the simulator 10 related to selecting and installing a welding coupon 175.

Calibration functionality 1208 (see FIG. 12) provides the capability to match up physical components in real world space (3D frame of reference) with visual components in the virtual welding environment 15. Each different type of welding coupon 175 is calibrated in the factory by mounting the welding coupon 175 to the arm 173 of the stand 170 and touching the welding coupon 175 at predefined points 179 (indicated by, for example, three dimples 179 on the welding coupon 175) with a calibration stylus operatively connected to the stand 170. The simulator 10 reads the magnetic field intensities at the predefined points 179, provides position information to the logic processor-based subsystem 110, and the logic processor-based subsystem 110 uses the position information to perform the calibration (i.e., the translation from real world space to virtual reality space).

Any part of the same type of welding coupon 175, accordingly, fits into the arm 173 of the stand 170 in the same repeatable way to within very tight tolerances. Therefore, once a particular type welding coupon 175 is calibrated, repeated calibration of similar coupons is not necessary, i.e. calibration of a particular type of welding coupon 175 is a one-time event. Stated differently, welding coupons 175 of the same type are interchangeable. Calibration ensures that physical feedback perceived by the user during a welding process matches up with what is displayed to the user in virtual reality space, making the simulation seem more real. For example, if the user slides the tip of a mock welding tool 160 around the corner of an actual welding coupon 175, the user will see the tip sliding around the corner of the virtual welding coupon on the displaying device 200 as the user feels the tip sliding around the actual corner. In accordance with an embodiment of the present invention, the mock welding tool 160 may also be placed in a pre-positioned jig and calibrated in a similar manner, based on the known jig position.

In accordance with another embodiment of the subject invention, "smart" coupons may include sensors that allow the simulator 10 to track the pre-defined calibration point, or corners of the "smart" coupon. The sensors may be mounted on the welding coupon 175 at the precise location of the predefined calibration points. However, any manner of communicating calibration data to the simulator 10 may be chosen. Accordingly, the simulator 10 continuously knows where the "smart" coupon is in real world 3D space. Furthermore, licensing keys may be provided to "unlock" welding coupons 175. When a particular welding coupon 175 is purchased, a licensing key may be provided that allows the end user 12a, 12b to enter the licensing key into the simulator 10, unlocking the software associated with that particular welding coupon 175. In an alternative embodiment, special non-standard welding coupons may be provided based on real-world CAD drawings of parts.

Processor-Based System

With reference now to FIGS. 2, 4 and 10, as mentioned above, simulator 10 includes a logic processor-based subsystem 110, which may comprise programmable electronic circuitry 200 for executing coded instructions used to generate the virtual welding environment 15. The programmable electronic circuitry 200 may include one or more logic processors 203 or logic processor-based systems 203, which may be comprised of one or more microprocessors 204. In one particular embodiment, the programmable electronic circuitry 200 may be comprised of central processing unit(s) (CPU) and graphics processing unit(s) (GPU), to be discussed further below. Additional circuitry may be included, like for example electronic memory, i.e. RAM, ROM, as well as other peripheral support circuitry. It is noted that electronic memory may be included for both the CPU and the GPU, each of which may be separately programmable for use in rendering aspects of the virtual welding environment 15 as described herein. Moreover, the programmable electronic circuitry 200 may include and utilize data storage devices 300 such as hard disk drives, optical storage devices, flash memory and the like. Still other types of electronic circuitry may be included that facilitate the transfer of data between devices within the simulator 10 or between different simulators 10. This may include, for example, receiving data from one or more input devices 155, e.g. spatial tracker or sensor, or transferring data over one or more networks which may be a local area networks (LAN), a wide area network (WAN) and/or Internet. It is to be understood that the aforementioned devices and processes are exemplary in nature and should not be construed as limiting. In fact, any form of programmable circuitry, support circuitry, communication circuitry and/or data storage may be incorporated into the embodiments of the subject invention as chosen with sound engineering judgment.

FIG. 10 illustrates an example embodiment of a subsystem block diagram of the logic processor-based subsystem 110 of the simulator 10. The logic processor-based subsystem 110 may include a central processing unit (CPU) 111 and two graphics processing units (GPU) 115. The two GPUs 115 may be programmed to provide virtual reality simulation of a weld puddle having real-time molten metal fluidity and heat absorption and dissipation characteristics.

Figure 11:
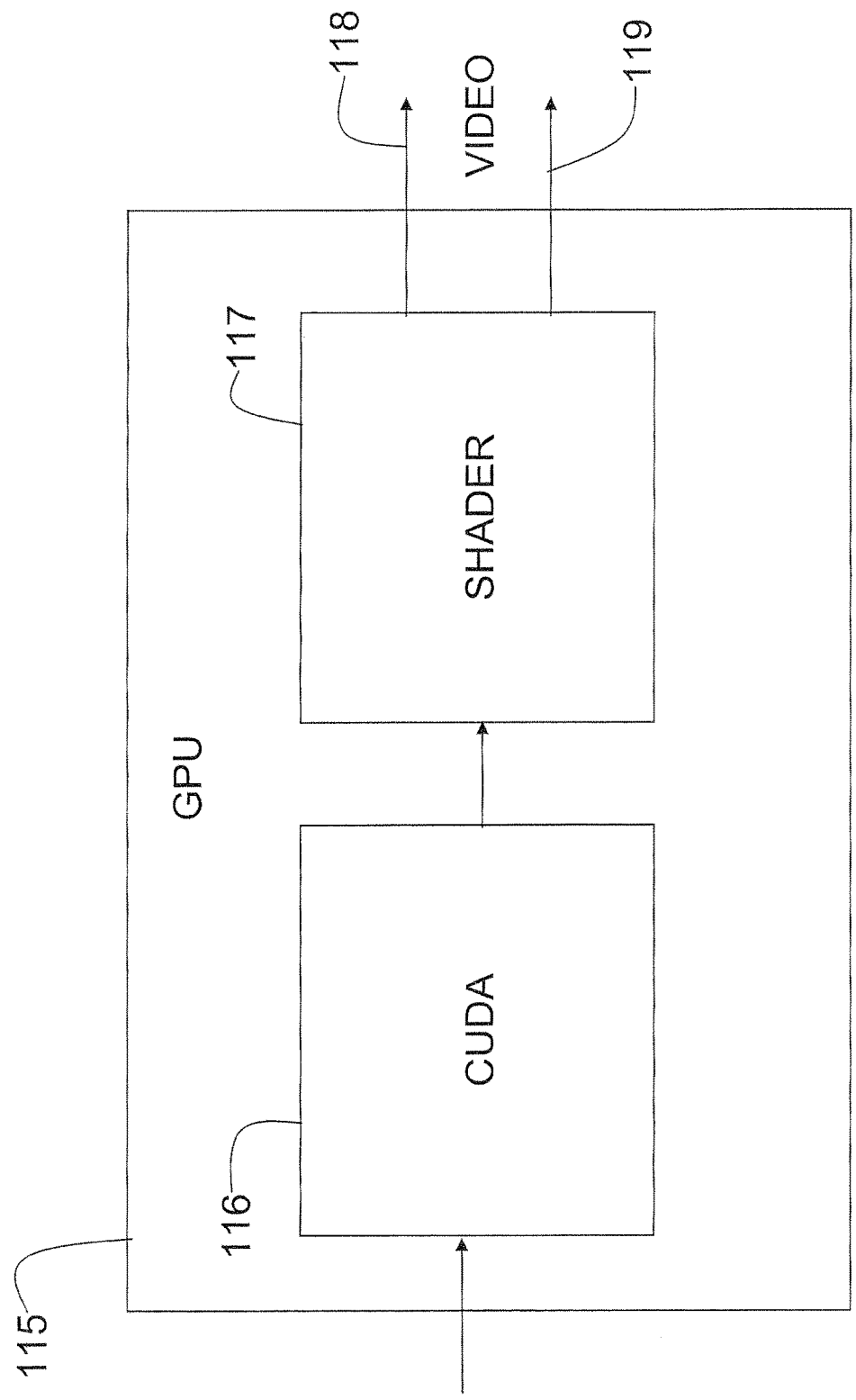
FIG. 11 illustrates an example embodiment of a block diagram of a graphics processing unit (GPU) of the logic processor-based subsystem.

With reference to FIG. 11, a block diagram of the graphics processing unit (GPU) 115 is shown. Each GPU 115 supports the implementation of data parallel algorithms. In accordance with an embodiment of the present invention, each GPU 115 provides two video outputs 118 and 119 capable of providing two virtual reality views. Two of the video outputs may be routed to the face-mounted display device 140, rendering the welder's point of view, and a third video output may be routed to the observer display device 150, for example, rendering either the welder's point of view or some other point of view. The remaining fourth video output may be routed to a projector, for example, or used for any other purpose suitable for simulating a virtual welding environment 15. Both GPUs 115 may perform the same welding physics computations but may render the virtual welding environment 15 from the same or different points of view. The GPU 115 includes a computed unified device architecture (CUDA) 116 and a shader 117. The CUDA 116 is the computing engine of the GPU 115 which is accessible to software developers through industry standard programming languages. The CUDA 116 includes parallel cores and is used to run the physics model of the weld puddle simulation described herein. The CPU 111 provides real-time welding input data to the CUDA 116 on the GPU 115. In one particular embodiment, the shader 117 is responsible for drawing and applying all of the visuals of the simulation. Bead and puddle visuals are driven by the state of a wexel displacement map which is described later herein. In accordance with an embodiment of the present invention, the physics model runs and updates at a rate of about 30 times per second.

Figure 12:
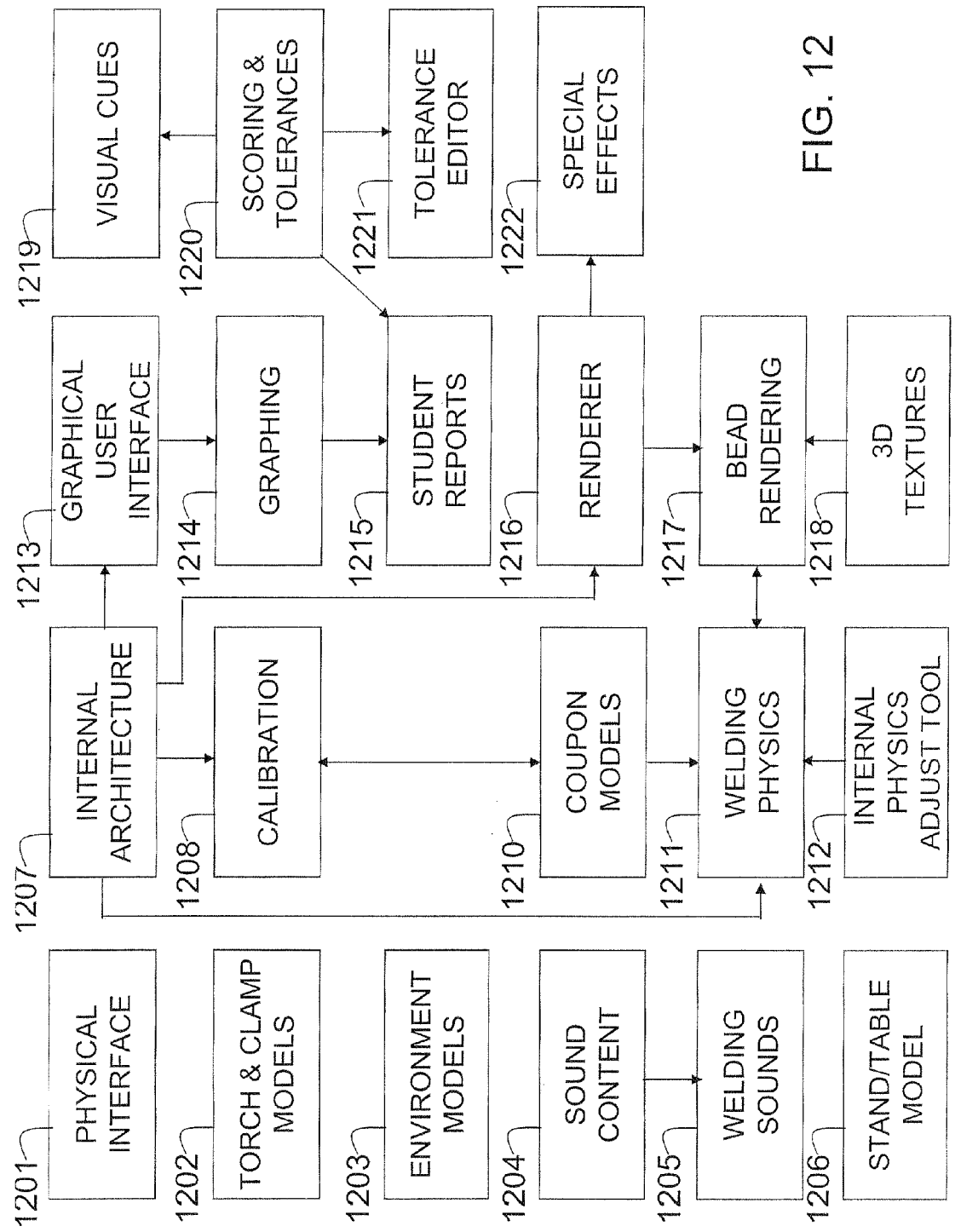
FIG. 12 illustrates an example embodiment of a functional block diagram of the simulator.

FIG. 12 illustrates an example embodiment of a functional block diagram of the simulator 10. The various functional blocks of the simulator 10 may be implemented largely via software instructions and modules running on the logic processor-based subsystem 110. The various functional blocks of the simulator 10 include a physical interface 1201, torch and clamp models 1202, environment models 1203, sound content functionality 1204, welding sounds 1205, stand/table model 1206, internal architecture functionality 1207, calibration functionality 1208, coupon models 1210, welding physics 1211, internal physics adjustment tool (tweaker) 1212, graphical user interface functionality 1213, graphing functionality 1214, student reports functionality 1215, renderer 1216, bead rendering 1217, 3D textures 1218, visual cues functionality 1219, scoring and tolerance functionality 1220, tolerance editor 1221, and special effects 1222.

The internal architecture functionality 1207 provides the higher level software logistics of the processes of the simulator 10 including, for example, loading files, holding information, managing threads, turning the physics model on, and triggering menus. The internal architecture functionality 1207 runs on the CPU 111, in accordance with an embodiment of the present invention. Certain real-time inputs to the logic processor-based subsystem 110 include arc location, gun position, face-mounted display device or helmet position, gun on/off state, and contact made state (yes/no).

During a simulated welding scenario, the graphing functionality 1214 gathers user performance parameters and provides the user performance parameters to the graphical user interface functionality 1213 for display in a graphical format (e.g., on the observer display device 150). Tracking information from the spatial tracker 120 feeds into the graphing functionality 1214. The graphing functionality 1214 includes a simple analysis module (SAM) and a whip/weave analysis module (WWAM). The SAM analyzes user welding parameters including welding travel angle, travel speed, weld angle, position, and tip to work by comparing the welding parameters to data stored in bead tables. The WWAM analyzes user whipping parameters including dime spacing, whip time, and puddle time. The WWAM also analyzes user weaving parameters including width of weave, weave spacing, and weave timing. The SAM and WWAM interpret raw input data (e.g., position and orientation data) into functionally usable data for graphing. For each parameter analyzed by the SAM and the WWAM, a tolerance window is defined by parameter limits around an optimum or ideal set point input into bead tables using the tolerance editor 1221, and scoring and tolerance functionality 1220 is performed.

The tolerance editor 1221 includes a weldometer which approximates material usage, electrical usage, and welding time. Furthermore, when certain parameters are out of tolerance, welding discontinuities (i.e., welding defects) may occur. The state of any welding discontinuities are processed by the graphing functionality 1214 and presented via the graphical user interface functionality 1213 in a graphical format. Such welding discontinuities include fillet size, poor bead placement, concave bead, excessive convexity, undercut, porosity, incomplete fusion, slag entrapment, and excess spatter. In accordance with an embodiment of the present invention, the level or amount of a discontinuity is dependent on how far away a particular user parameter is from the optimum or ideal set point.

Different parameter limits may be pre-defined for different types of users such as, for example, welding novices, welding experts, and persons at a trade show. The scoring and tolerance functionality 1220 provide number scores depending on how close to optimum (ideal) a user is for a particular parameter and depending on the level of discontinuities or defects present in the weld. Information from the scoring and tolerance functionality 1220 and from the graphics functionality 1214 may be used by the student reports functionality 1215 to create a performance report for an instructor and/or a student.

Visual cues functionality 1219 provide immediate feedback to the user by displaying overlaid colors and indicators on the face mounted display device 140 and/or the observer display device 150. Visual cues are provided for each of the welding parameters 151 including position, tip to work, weld angle, travel angle, and travel speed and visually indicate to the user if some aspect of the user's welding technique should be adjusted based on the predefined limits or tolerances. Visual cues may also be provided for whip/weave technique and weld bead "dime" spacing, for example.

In accordance with an embodiment of the present invention, simulation of a weld puddle or pool in virtual reality space is accomplished where the simulated weld puddle has real-time molten metal fluidity and heat dissipation characteristics. At the heart of the weld puddle simulation is the welding physics functionality 1211 (a.k.a., the physics model) which may be executed on the GPUs 115, in accordance with an embodiment of the present invention. The welding physics functionality employs a double displacement layer technique to accurately model dynamic fluidity/viscosity, solidity, heat gradient (heat absorption and dissipation), puddle wake, and bead shape, and is described in more detail herein with respect to FIG. 14a-14c.

The welding physics functionality 1211 communicates with the bead rendering functionality 1217 to render a weld bead in all states from the heated molten state to the cooled solidified state. The bead rendering functionality 1217 uses information from the welding physics functionality 1211 (e.g., heat, fluidity, displacement, dime spacing) to accurately and realistically render a weld bead in virtual reality space in real-time. The 3D textures functionality 1218 provides texture maps to the bead rendering functionality 1217 to overlay additional textures (e.g., scorching, slag, grain) onto the simulated weld bead. The renderer functionality 1216 is used to render various non-puddle specific characteristics using information from the special effects module 1222 including sparks, spatter, smoke, arc glow, fumes, and certain discontinuities such as, for example, undercut and porosity.

The internal physics adjustment tool 1212 is a tweaking tool that allows various welding physics parameters to be defined, updated, and modified for the various welding processes. In accordance with an embodiment of the present invention, the internal physics adjustment tool 1212 runs on the CPU 111, and the adjusted or updated parameters are downloaded to the GPUs 115. The types of parameters that may be adjusted via the internal physics adjustment tool 1212 include parameters related to welding coupons, process parameters that allow a process to be changed without having to reset a welding coupon (allows for doing a second pass), various global parameters that can be changed without resetting the entire simulation, and other various parameters.

FIG. 13 is a flow chart of an embodiment of a method 1300 of training using the virtual reality training simulator 10. In step 1310, move a mock welding tool with respect to a welding coupon in accordance with a welding technique. In step 1320, track position and orientation of the mock welding tool in three-dimensional space using a virtual reality system. In step 1330, view a display of the virtual reality welding system showing a real-time virtual reality simulation of the mock welding tool and the welding coupon in a virtual reality space as the simulated mock welding tool deposits a simulated weld bead material onto at least one simulated surface of the simulated welding coupon by forming a simulated weld puddle in the vicinity of a simulated arc emitting from said simulated mock welding tool. In step 1340, view on the display, real-time molten metal fluidity and heat dissipation characteristics of the simulated weld puddle. In step 1350, modify in real-time, at least one aspect of the welding technique in response to viewing the real-time molten metal fluidity and heat dissipation characteristics of the simulated weld puddle.

The method 1300 illustrates how a user is able to view a weld puddle in virtual reality space and modify his welding technique in response to viewing various characteristics of the simulated weld puddle, including real-time molten metal fluidity (e.g., viscosity) and heat dissipation. The user may also view and respond to other characteristics including real-time puddle wake and dime spacing. Viewing and responding to characteristics of the weld puddle is how many welding operations are actually performed in the real world. The double displacement layer modeling of the welding physics functionality 1211 run on the GPUs 115 allows for such real-time molten metal fluidity and heat dissipation characteristics to be accurately modeled and represented to the user. For example, heat dissipation determines solidification time (i.e., how much time it takes for a wexel to completely solidify).

Furthermore, a user may make a second pass over the weld bead material using the same or a different (e.g., a second) mock welding tool, welding electrode and/or welding process. In such a second pass scenario, the simulation shows the simulated mock welding tool, the welding coupon, and the original simulated weld bead material in virtual reality space as the simulated mock welding tool deposits a second simulated weld bead material merging with the first simulated weld bead material by forming a second simulated weld puddle in the vicinity of a simulated arc emitting from the simulated mock welding tool. Additional subsequent passes using the same or different welding tools or processes may be made in a similar manner. In any second or subsequent pass, the previous weld bead material is merged with the new weld bead material being deposited as a new weld puddle is formed in virtual reality space from the combination of any of the previous weld bead material, the new weld bead material, and possibly the underlying coupon material in accordance with certain embodiments of the present invention. Such subsequent passes may be performed to repair a weld bead formed by a previous pass, for example, or may include a heat pass and one or more gap closing passes after a root pass as is done in pipe welding. In accordance with various embodiments of the present invention, base and weld bead material may be simulated to include mild steel, stainless steel, and aluminum.

In accordance with an embodiment of the present invention, welding with stainless steel materials is simulated in a real-time virtual environment. The base metal appearance is simulated to provide a realistic representation of a stainless steel weldment. Simulation of the visual effect is provided to change the visual spectrum of light to accommodate the coloration of the arc. Realistic sound is also simulated based on proper work distance, ignition, and speed. The arc puddle appearance and deposition appearance are simulated based on the heat affected zone and the torch movement. Simulation of dross or broken particles of aluminum oxide or aluminum nitride films, which can be scattered throughout the weld bead, is provided. Calculations related to the heating and cooling affected zones are tailored for stainless steel welding. Discontinuity operations related to spatter are provided to more closely and accurately simulate the appearance of stainless steel GMAW welding.

In accordance with an embodiment of the present invention, welding with aluminum materials is simulated in a real-time virtual environment. The bead wake is simulated to closely match the appearance of the aluminum welding to that seen in the real world. The base metal appearance is simulated to represent a realistic representation of an aluminum weldment. Simulation of the visual effect is provided to change the visual spectrum of light to accommodate the coloration of the arc. A calculation of lighting is provided to create reflectivity. Calculations related to the heating and cooling affected zones are tailored for aluminum welding. Simulation of oxidation is provided to create a realistic "cleaning action". Realistic sound is also simulated based on proper work distance, ignition, and speed. The arc puddle appearance and deposition appearance are simulated based on the heat affected zone and the torch movement. The appearance of the aluminum wire is simulated in the GMAW torch to provide a realistic and proper appearance.

In accordance with an embodiment of the present invention, GTAW welding is simulated in a real-time virtual environment. Simulation of operational parameters for GTAW welding are provided including, but not limited to, flow rate, pulsing frequency, pulse width, arc voltage control, AC balance, and output frequency control. Visual representation of the puddle "splash" or dipping technique and melt off of the welding consumable are also simulated. Furthermore, representations of autogenous (no filler metal) and GTAW with filler metal welding operations in the welding puddle are rendered visually and audibly. Implementation of additional filler metal variations may be simulated including, but not limited to, carbon steel, stainless steel, aluminum, and Chrome Moly. A selectable implementation of an external foot pedal may be provided for operation while welding.

Engine for Modeling

Figure 14A:
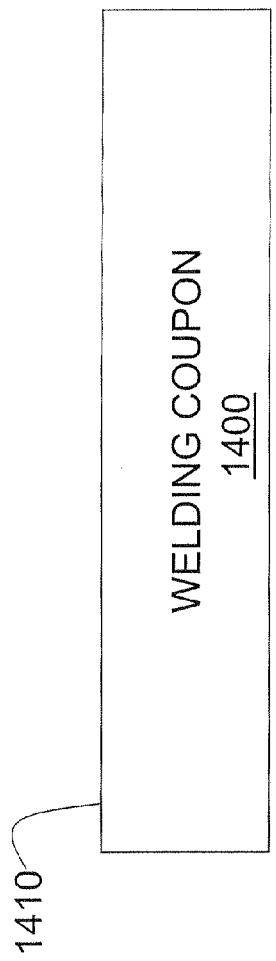
FIGS. 14a-14b illustrate the concept of a welding pixel (wexel) displacement map.
Figure 14B:
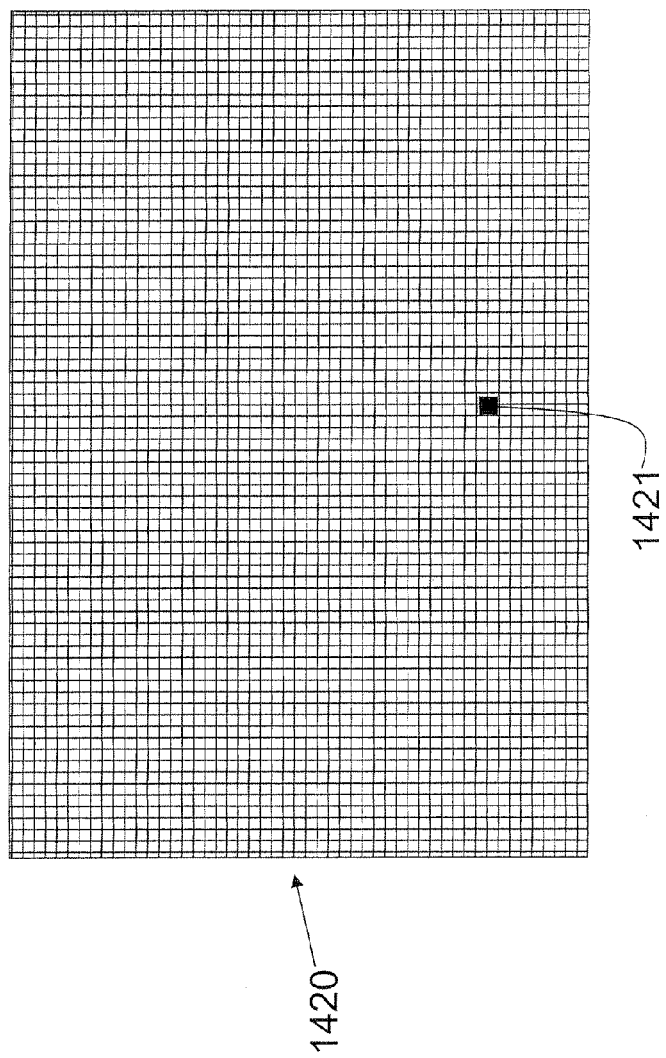

FIGS. 14a-14b illustrate the concept of a welding element (wexel) displacement map 1420, in accordance with an embodiment of the present invention. FIG. 14a shows a side view of a flat welding coupon 1400 having a flat top surface 1410. The welding coupon 1400 exists in the real world as, for example, a plastic part, and also exists in virtual reality space as a simulated welding coupon. FIG. 14b shows a representation of the top surface 1410 of the simulated welding coupon 1400 broken up into a grid or array of welding elements, termed "wexels" forming a wexel map 1420. Each wexel (e.g., wexel 1421) defines a small portion of the surface 1410 of the welding coupon. The wexel map defines the surface resolution. Changeable channel parameter values are assigned to each wexel, allowing values of each wexel to dynamically change in real-time in virtual reality weld space during a simulated welding process. The changeable channel parameter values correspond to the channels Puddle (molten metal fluidity/viscosity displacement), Heat (heat absorption/dissipation), Displacement (solid displacement), and Extra (various extra states, e.g., slag, grain, scorching, virgin metal). These changeable channels are referred to herein as PHED for Puddle, Heat, Extra, and Displacement, respectively.

Figure 15:
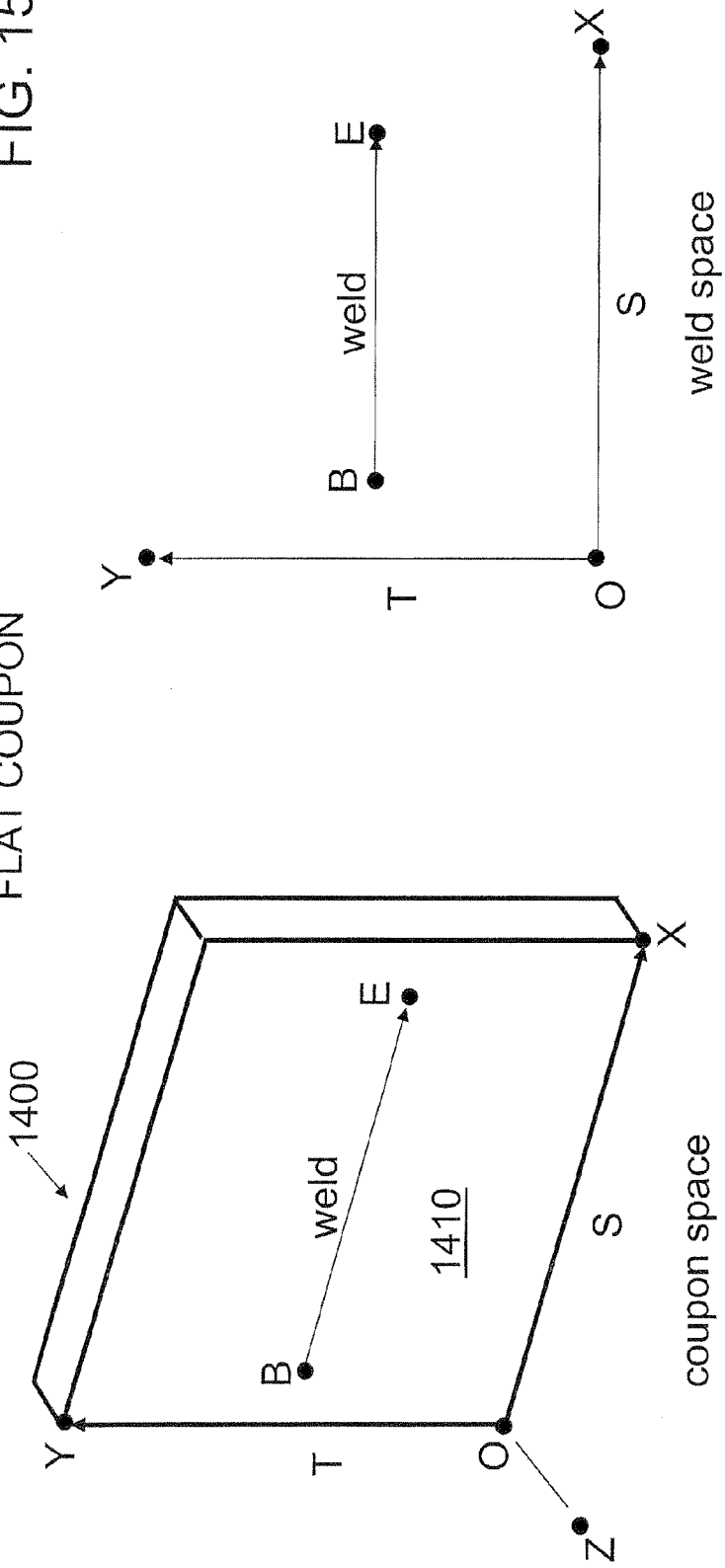
FIG. 15 illustrates an example embodiment of a coupon space and a weld space of a flat welding coupon simulated in the simulator.

FIG. 15 illustrates an example embodiment of a coupon space and a weld space of the flat welding coupon 1400 of FIG. 14 simulated in the simulator 10 of FIGS. 1 and 2. Points O, X, Y, and Z define the local 3D coupon space. In general, each coupon type defines the mapping from 3D coupon space to 2D virtual reality weld space. The wexel map 1420 of FIG. 14 is a two-dimensional array of values that map to weld space in virtual reality. A user is to weld from point B to point E as shown in FIG. 15. A trajectory line from point B to point E is shown in both 3D coupon space and 2D weld space in FIG. 15.

Each type of coupon defines the direction of displacement for each location in the wexel map. For the flat welding coupon of FIG. 15, the direction of displacement is the same at all locations in the wexel map (i.e., in the Z-direction).

The texture coordinates of the wexel map are shown as S, T (sometimes called U, V) in both 3D coupon space and 2D weld space, in order to clarify the mapping. The wexel map is mapped to and represents the rectangular surface 1410 of the welding coupon 1400.

Figure 16:
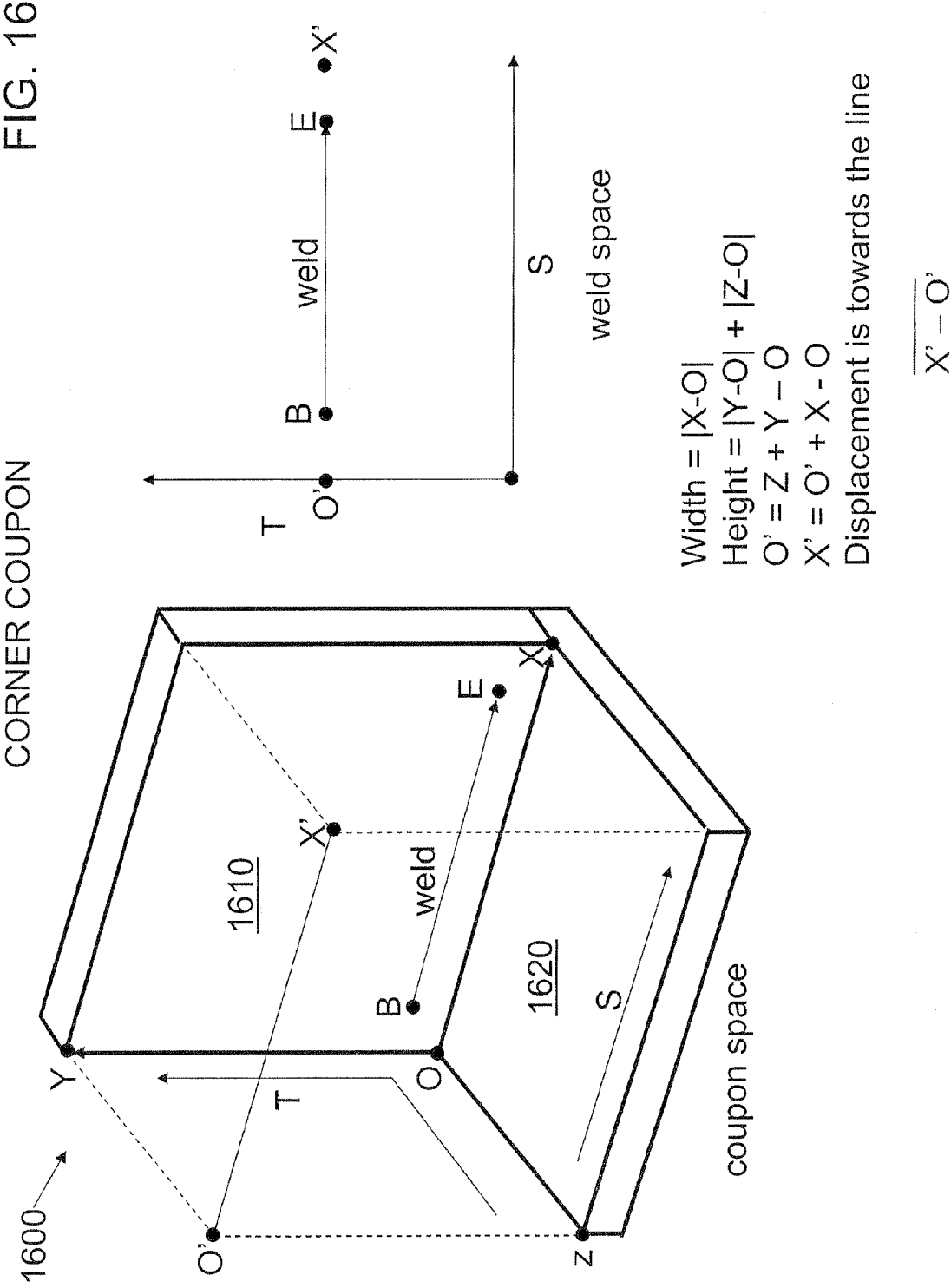
FIG. 16 illustrates an example embodiment of a coupon space and a weld space of a corner welding coupon simulated in the simulator.

FIG. 16 illustrates an example embodiment of a coupon space and a weld space of a corner welding coupon 1600 simulated in the simulator 10. The corner welding coupon 1600 has two surfaces 1610 and 1620 in 3D coupon space that are mapped to 2D weld space as shown in FIG. 16. Again, points O, X, Y, and Z define the local 3D coupon space. The texture coordinates of the wexel map are shown as S, T in both 3D coupon space and 2D weld space, in order to clarify the mapping. A user is to weld from point B to point E as shown in FIG. 16. A trajectory line from point B to point E is shown in both 3D coupon space and 2D weld space in FIG. 16. However, the direction of displacement is towards the line X'-O' as shown in the 3D coupon space, towards the opposite corner.

Figure 18:
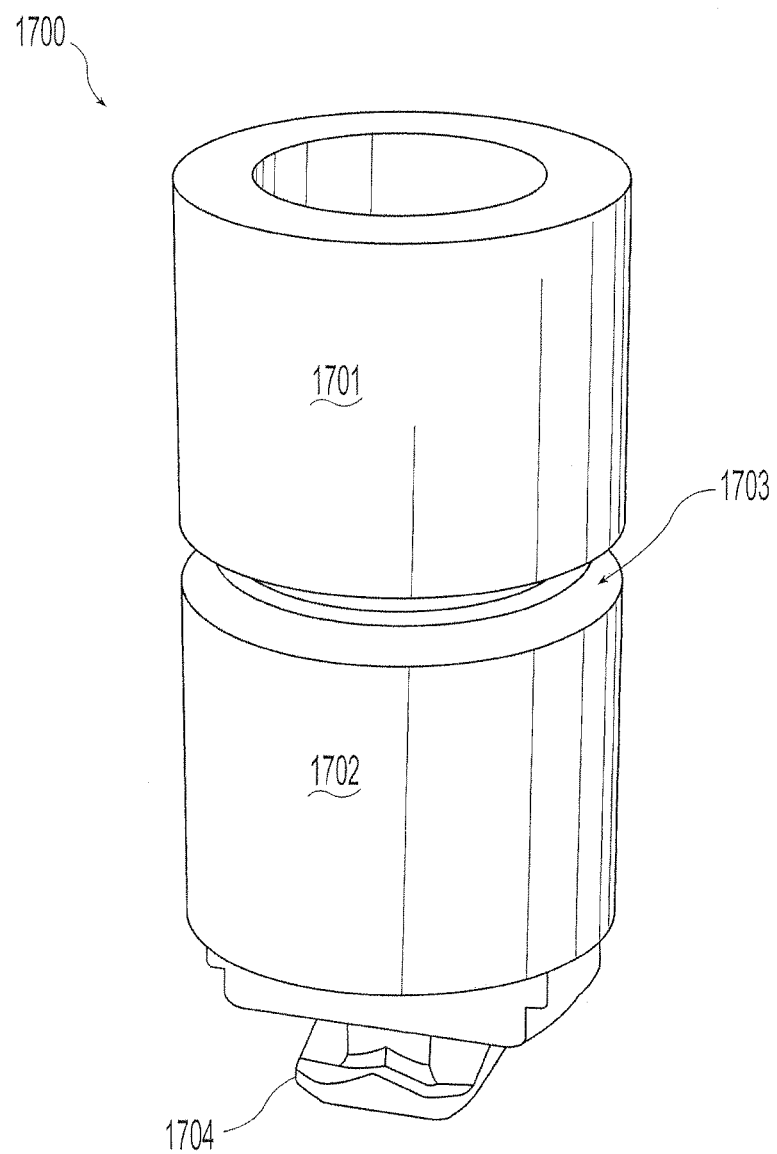
FIG. 18 illustrates an example embodiment of the pipe welding coupon.

FIG. 17 illustrates an example embodiment of a coupon space and a weld space of a pipe welding coupon 1700 simulated in the simulator 10. The pipe welding coupon 1700 has a curved surface 1710 in 3D coupon space that is mapped to 2D weld space. Points O, X, Y, and Z once again define the local 3D coupon space. The texture coordinates of the wexel map are shown as S, T in both 3D coupon space and 2D weld space, in order to clarify the mapping. An end user 12 is to weld from point B to point E along a curved trajectory as shown in FIG. 17. A trajectory curve and line from point B to point E is shown in 3D coupon space and 2D weld space, respectively. The direction of displacement is away from the line Y-O (i.e., away from the center of the pipe). FIG. 18 illustrates an example embodiment of the pipe welding coupon 1700 of FIG. 17. The pipe welding coupon 1700 is made of a non-ferric, non-conductive plastic and simulates two pipe pieces 1701 and 1702 coming together to form a root joint 1703. An attachment piece 1704 for attaching to the arm 173 of the stand 170 is also shown.

In a similar manner that a texture map may be mapped to a rectangular surface area of a geometry, a weldable wexel map may be mapped to a rectangular surface of a welding coupon. Each element of the weldable map is termed a wexel in the same sense that each element of a picture is termed a pixel (a contraction of picture element). A pixel contains channels of information that define a color (e.g., red, green, blue, etc.). A wexel contains channels of information (e.g., P, H, E, D) that define a weldable surface in virtual reality space.

In accordance with an embodiment of the present invention, the format of a wexel is summarized as channels PHED (Puddle, Heat, Extra, Displacement) which contains four floating point numbers. The Extra channel is treated as a set of bits which store logical information about the wexel such as, for example, whether or not there is any slag at the wexel location. The Puddle channel stores a displacement value for any liquefied metal at the wexel location. The Displacement channel stores a displacement value for the solidified metal at the wexel location. The Heat channel stores a value giving the magnitude of heat at the wexel location. In this way, the weldable part of the coupon can show displacement due to a welded bead, a shimmering surface "puddle" due to liquid metal, color due to heat, etc. All of these effects are achieved by the vertex and pixel shaders applied to the weldable surface.

In accordance with an embodiment of the present invention, a displacement map and a particle system are used where the particles can interact with each other and collide with the displacement map. The particles are virtual dynamic fluid particles and provide the liquid behavior of the weld puddle but are not rendered directly (i.e., are not visually seen directly). Instead, only the particle effects on the displacement map are visually seen. Heat input to a wexel affects the movement of nearby particles. There are two types of displacement involved in simulating a welding puddle which include Puddle and Displacement. Puddle is "temporary" and only lasts as long as there are particles and heat present. Displacement is "permanent". Puddle displacement is the liquid metal of the weld which changes rapidly (e.g., shimmers) and can be thought of as being "on top" of the Displacement. The particles overlay a portion of a virtual surface displacement map (i.e., a wexel map). The Displacement represents the permanent solid metal including both the initial base metal and the weld bead that has solidified.

In accordance with an embodiment of the present invention, the simulated welding process in virtual reality space works as follows: Particles stream from the emitter (emitter of the simulated mock welding tool 160) in a thin cone. The particles make first contact with the surface of the simulated welding coupon where the surface is defined by a wexel map. The particles interact with each other and the wexel map and build up in real-time. More heat is added the nearer a wexel is to the emitter. Heat is modeled in dependence on distance from the arc point and the amount of time that heat is input from the arc. Certain visuals (e.g., color, etc.) are driven by the heat. A weld puddle is drawn or rendered in virtual reality space for wexels having enough heat. Wherever it is hot enough, the wexel map liquefies, causing the Puddle displacement to "raise up" for those wexel locations. Puddle displacement is determined by sampling the "highest" particles at each wexel location. As the emitter moves on along the weld trajectory, the wexel locations left behind cool. Heat is removed from a wexel location at a particular rate. When a cooling threshold is reached, the wexel map solidifies. As such, the Puddle displacement is gradually converted to Displacement (i.e., a solidified bead). Displacement added is equivalent to Puddle removed such that the overall height does not change. Particle lifetimes are tweaked or adjusted to persist until solidification is complete. Certain particle properties that are modeled in the simulator 10 include attraction/repulsion, velocity (related to heat), dampening (related to heat dissipation), direction (related to gravity).

Figure 19A:
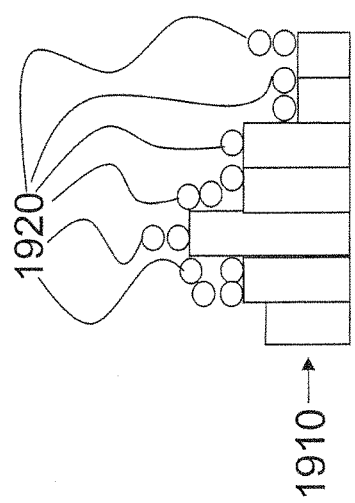
FIGS. 19a-19c illustrate an example embodiment of the concept of a dual-displacement puddle model of the simulator.
Figure 19B:
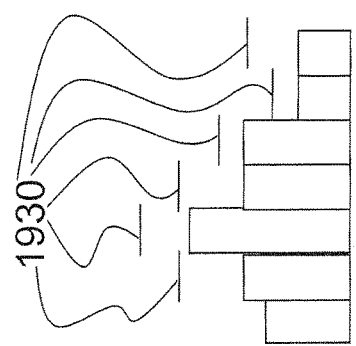
Figure 19C:
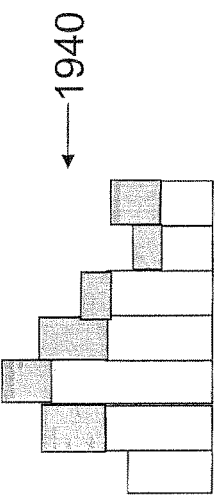

FIGS. 19*a*-19*c* illustrate an example embodiment of the concept of a dual-displacement (displacement and particles) puddle model of the simulator 10. Welding coupons are simulated in virtual reality space having at least one surface. The surfaces of the welding coupon are simulated in virtual reality space as a double displacement layer including a solid displacement layer and a puddle displacement layer. The puddle displacement layer is capable of modifying the solid displacement layer.

As described herein, "puddle" is defined by an area of the wexel map where the Puddle value has been raised up by the presence of particles. The sampling process is represented in FIGS. 19*a*-19*c*. A section of a wexel map is shown having seven adjacent wexels. The current Displacement values are represented by un-shaded rectangular bars 1910 of a given height (i.e., a given displacement for each wexel). In FIG. 19*a*, the particles 1920 are shown as round un-shaded dots colliding with the current Displacement levels and are piled up. In FIG. 19*b*, the "highest" particle heights 1930 are sampled at each wexel location. In FIG. 19*c*, the shaded rectangles 1940 show how much Puddle has been added on top of the Displacement as a result of the particles. The weld puddle height is not instantly set to the sampled values since Puddle is added at a particular liquification rate based on Heat. Although not shown in FIGS. 19a-19c, it is possible to visualize the solidification process as the Puddle (shaded rectangles) gradually shrink and the Displacement (unshaded rectangles) gradually grow from below to exactly take the place of the Puddle. In this manner, real-time molten metal fluidity characteristics are accurately simulated. As a user practices a particular welding process, the user is able to observe the molten metal fluidity characteristics and the heat dissipation characteristics of the weld puddle in real-time in virtual reality space and use this information to adjust or maintain his welding technique.

The number of wexels representing the surface of a welding coupon is fixed. Furthermore, the puddle particles that are generated by the simulation to model fluidity are temporary, as described herein. Therefore, once an initial puddle is generated in virtual reality space during a simulated welding process using the simulator 10, the number of wexels plus puddle particles tends to remain relatively constant. This is because the number of wexels that are being processed is fixed and the number of puddle particles that exist and are being processed during the welding process tend to remain relatively constant because puddle particles are being created and "destroyed" at a similar rate (i.e., the puddle particles are temporary). Therefore, the processing load of the logic processor-based subsystem 110 remains relatively constant during a simulated welding session.

In accordance with an alternate embodiment of the present invention, puddle particles may be generated within or below the surface of the welding coupon. In such an embodiment, displacement may be modeled as being positive or negative with respect to the original surface displacement of a virgin (i.e., un-welded) coupon. In this manner, puddle particles may not only build up on the surface of a welding coupon, but may also penetrate the welding coupon. However, the number of wexels is still fixed and the puddle particles being created and destroyed is still relatively constant.

In accordance with alternate embodiments of the present invention, instead of modeling particles, a wexel displacement map may be provided having more channels to model the fluidity of the puddle. Or, instead of modeling particles, a dense voxel map may be modeled. Or, instead of a wexel map, only particles may be modeled which are sampled and never go away. Such alternative embodiments may not provide a relatively constant processing load for the system, however.

Furthermore, in accordance with an embodiment of the present invention, blowthrough or a keyhole is simulated by taking material away. For example, if a user keeps an arc in the same location for too long, in the real world, the material would burn away causing a hole. Such real-world burn-through is simulated in the simulator 10 by wexel decimation techniques. If the amount of heat absorbed by a wexel is determined to be too high by the simulator 10, that wexel may be flagged or designated as being burned away and rendered as such (e.g., rendered as a hole). Subsequently, however, wexel reconstitution may occur for certain welding process (e.g., pipe welding) where material is added back after being initially burned away. In general, the simulator 10 simulates wexel decimation (taking material away) and wexel reconstitution (i.e., adding material back).

Furthermore, removing material in root-pass welding is properly simulated in the simulator 10. For example, in the real world, grinding of the root pass may be performed prior to subsequent welding passes. Similarly, simulator 10 may simulate a grinding pass that removes material from the virtual weld joint. It will be appreciated that the material removed is modeled as a negative displacement on the wexel map. That is to say that the grinding pass removes material that is modeled by the simulator 10 resulting in an altered bead contour. Simulation of the grinding pass may be automatic, which is to say that the simulator 10 removes a predetermined thickness of material, which may be respective to the surface of the root pass weld bead. In an alternate embodiment, an actual grinding tool, or grinder, may be simulated that turns on and off by activation of the mock welding tool 160 or another input device. It is noted that the grinding tool may be simulated to resemble a real world grinder. In this embodiment, the user maneuvers the grinding tool along the root pass to remove material responsive to the movement thereof. It will be understood that the user may be allowed to remove too much material. In a manner similar to that described above, holes or keyholes, or other defects (described above) may result if the user "grinds away" to much material. Still, hard limits or stops may be implemented, i.e. programmed, to prevent the user from removing to much material or indicate when too much material is being removed.

In addition to the non-visible "puddle" particles described herein, the simulator 10 also uses three other types of visible particles to represent Arc, Flame, and Spark effects, in accordance with an embodiment of the present invention. These types of particles do not interact with other particles of any type but interact only with the displacement map. While these particles do collide with the simulated weld surface, they do not interact with each other. Only Puddle particles interact with each other, in accordance with an embodiment of the present invention. The physics of the Spark particles is setup such that the Spark particles bounce around and are rendered as glowing dots in virtual reality space.

The physics of the Arc particles is setup such that the Arc particles hit the surface of the simulated coupon or weld bead and stay for a while. The Arc particles are rendered as larger dim bluish-white spots in virtual reality space. It takes many such spots superimposed to form any sort of visual image. The end result is a white glowing nimbus with blue edges.

The physics of the Flame particles is modeled to slowly raise upward. The Flame particles are rendered as medium sized dim red-yellow spots. It takes many such spots superimposed to form any sort of visual image. The end result is blobs of orange-red flames with red edges raising upward and fading out. Other types of non-puddle particles may be implemented in the simulator 10, in accordance with other embodiments of the present invention. For example, smoke particles may be modeled and simulated in a similar manner to flame particles.

The final steps in the simulated visualization are handled by the vertex and pixel shaders provided by the shaders 117 of the GPUs 115. The vertex and pixel shaders apply Puddle and Displacement, as well as surface colors and reflectivity altered due to heat, etc. The Extra (E) channel of the PHED wexel format, as discussed earlier herein, contains all of the extra information used per wexel. In accordance with an embodiment of the present invention, the extra information includes a non virgin bit (true=bead, false=virgin steel), a slag bit, an undercut value (amount of undercut at this wexel where zero equals no undercut), a porosity value (amount of porosity at this wexel where zero equals no porosity), and a bead wake value which encodes the time at which the bead solidifies. There are a set of image maps associated with different coupon visuals including virgin steel, slag, bead, and porosity. These image maps are used both for bump mapping and texture mapping. The amount of blending of these image maps is controlled by the various flags and values described herein.

A bead wake effect is achieved using a 1D image map and a per wexel bead wake value that encodes the time at which a given bit of bead is solidified. Once a hot puddle wexel location is no longer hot enough to be called "puddle", a time is saved at that location and is called "bead wake". The end result is that the shader code is able to use the 1D texture map to draw the "ripples" that give a bead its unique appearance which portrays the direction in which the bead was laid down. In accordance with an alternative embodiment of the present invention, the simulator 10 is capable of simulating, in virtual reality space, and displaying a weld bead having a real-time weld bead wake characteristic resulting from a real-time fluidity-to-solidification transition of the simulated weld puddle, as the simulated weld puddle is moved along a weld trajectory.

In accordance with an alternative embodiment of the present invention, the simulator 10 is capable of teaching a user how to troubleshoot a welding machine. For example, a troubleshooting mode of the system may train a user to make sure he sets up the system correctly (e.g., correct gas flow rate, correct power cord connected, etc.) In accordance with another alternate embodiment of the present invention, the simulator 10 is capable of recording and playing back a welding session (or at least a portion of a welding session, for example, N frames). A track ball may be provided to scroll through frames of video, allowing a user or instructor to critique a welding session. Playback may be provided at selectable speeds as well (e.g., full speed, half speed, quarter speed). In accordance with an embodiment of the present invention, a split-screen playback may be provided, allowing two welding sessions to be viewed side-by-side, for example, on the observer display device 150. For example, a "good" welding session may be viewed next to a "poor" welding session for comparison purposes.

Figure 20:
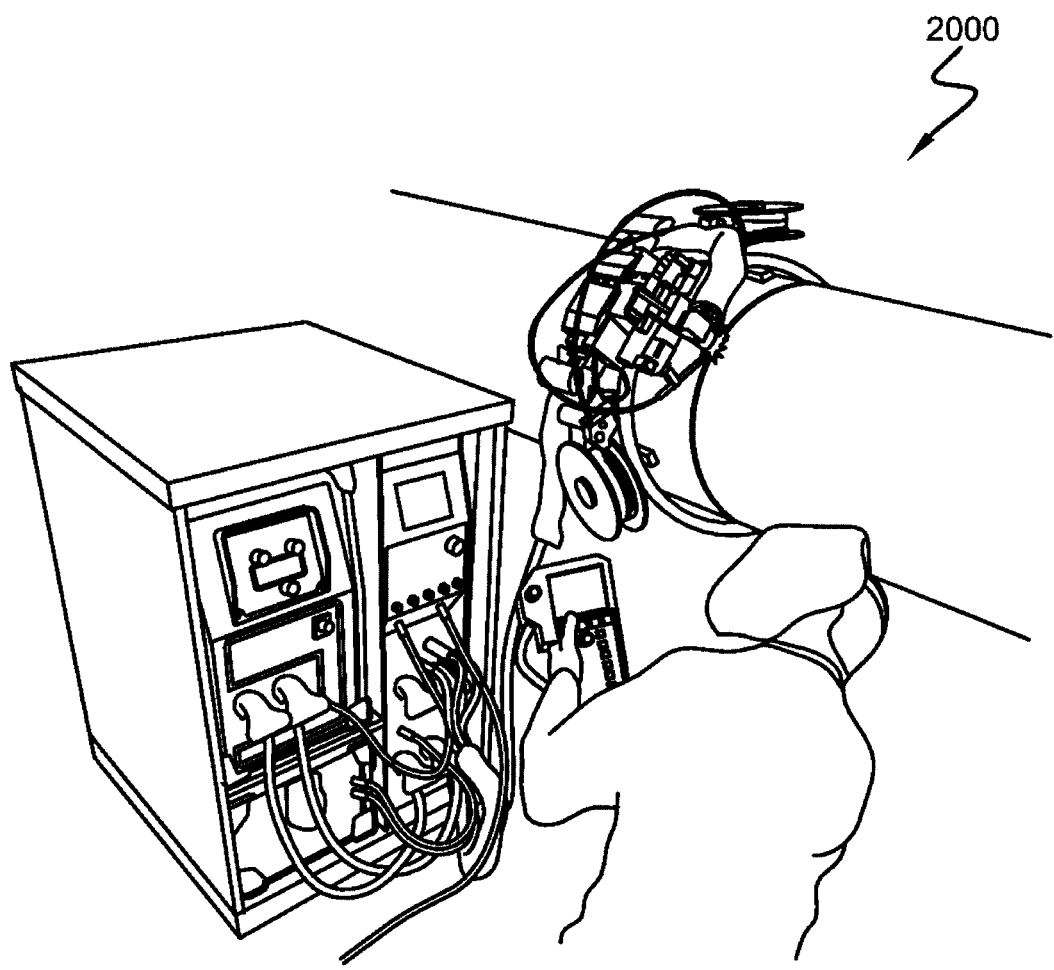
FIG. 20 illustrates an example embodiment of an orbital welding system as used in an orbital welding environment.
Figure 21:
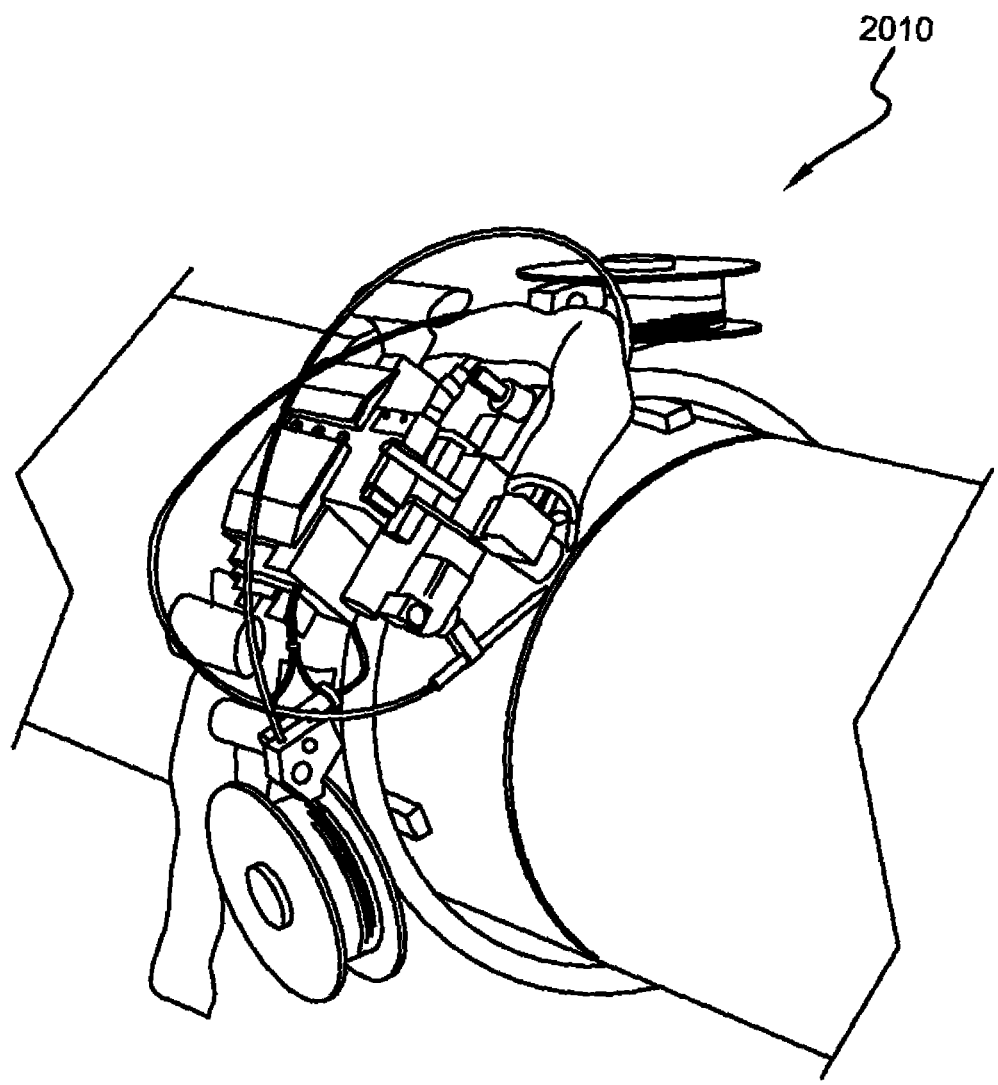
FIG. 21 illustrates a welding tractor for use with the orbital welding system of FIG. 20.
Figure 22:
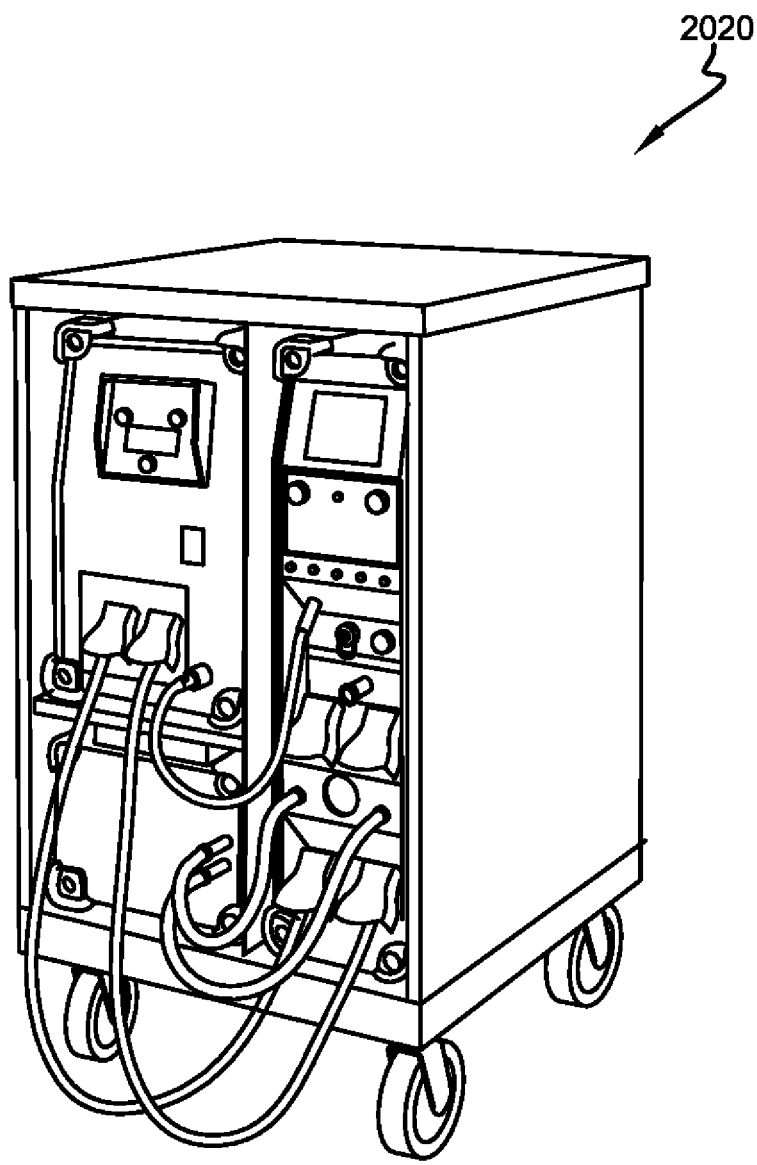
FIG. 22 illustrates a power source and controller of the orbital welding system of FIG. 20.
Figure 23:
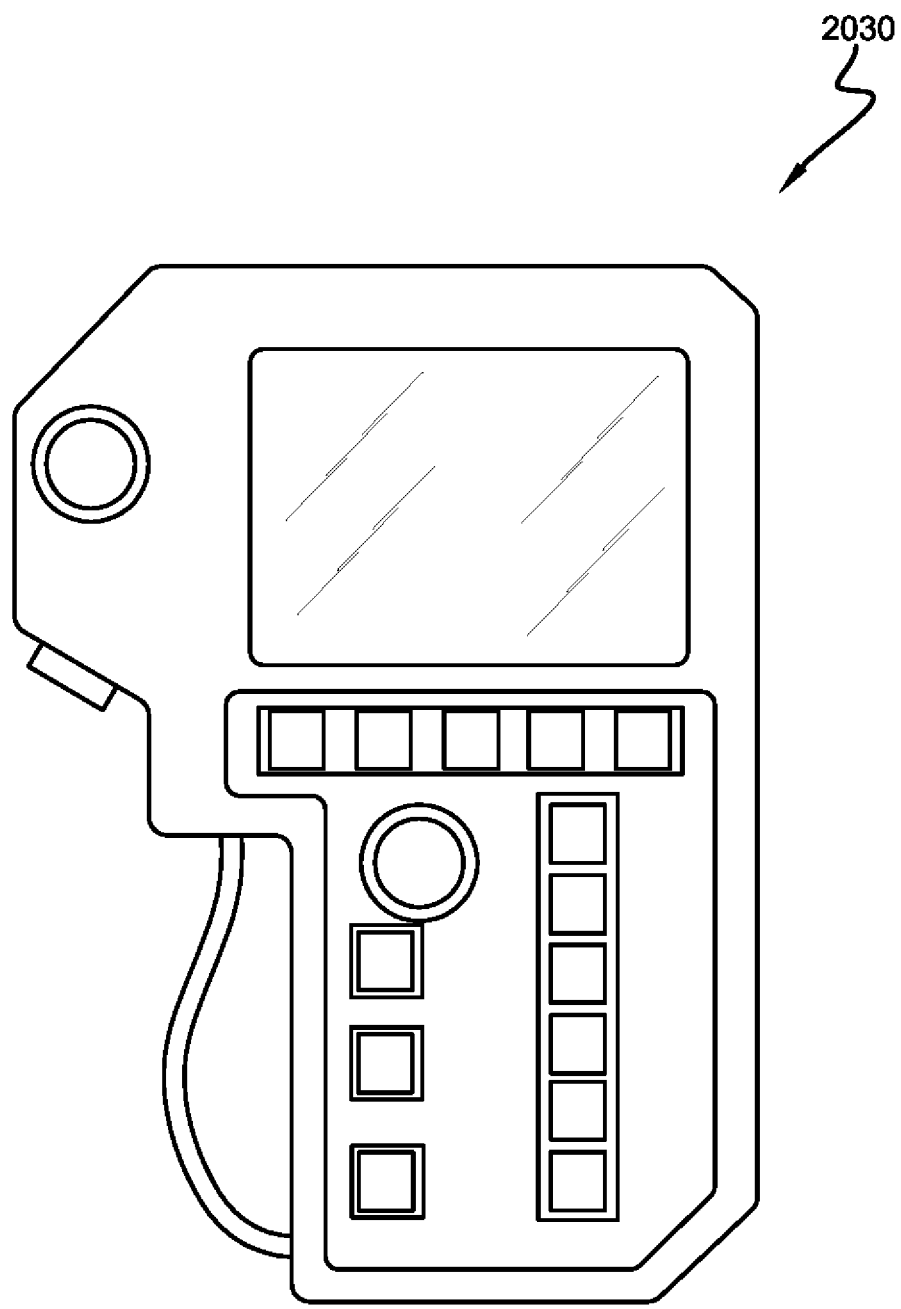
FIG. 23 illustrates a pendant for use with the orbital welding system of FIG. 20.

Automated welding is also an aspect of the present invention. One illustrative example of automated welding is orbital welding, which is often used for the joining of tubes or pipes of various types of materials. For example, a TIG (GTAW) welding torch may be used to orbit around the pipes to be welded together by an automated mechanical system. FIG. 20 illustrates an example embodiment of an orbital welding system as used in an orbital welding environment. An orbital welding system includes a welding tractor that travels around the pipes or tubes, a welding power source and controller, and a pendant providing operator control. FIG. 21 shows the welding tractor 2010 of the orbital welding system of FIG. 20, as operably connected to two pipes to be welded. FIG. 22 shows a power source and controller 2020 of the orbital welding system of FIG. 20, and FIG. 23 shows a pendant 2030 of the orbital welding system of FIG. 20.

While the above discussion has focused on the virtual reality simulation of processes, which include orbital welding, embodiments of the invention are not limited to that aspect and includes teaching and feedback aspects of the actual setup and performance characteristics associated with welds made in accordance with a user-defined setup. As discussed above, GTAW/GMAW welding requires training to ensure that the operator understands the controls which are available for the practice of this process. There is a misconception that automation associated with orbital welding systems eliminates the need for training, since the machine is doing the welding. Automated orbital welding requires training to ensure the operator understands welding, and all of the unique setup and implementation skills for controlling TIG beads. This includes error correction, larger diameter pipe welding, the utilization of remote cameras, and proper error assessment and correction. Training programs offer inconsistent or insufficient coverage of teaching a good weld situation, a bad weld situation and the mechanisms to perform, react to or correct each. Instructors for this type of niche solution are hard to find with sufficient background and/or industry knowledge and experience. Only through quality training taught by certified instructors can operators of orbital welding equipment gain the complex skills needed to meet the strict acceptance criteria in today's welding environment. Additionally, on large circumference projects with long weld joints, the difficulty of maintaining attention and focus represents a significant problem.

In the GTAW process, an electric arc is maintained between the non-consumable tungsten electrode and the workpiece. The electrode supports the heat of the arc and the metal of the workpiece melts and forms the weld puddle. The molten metal of the workpiece and the electrode must be protected against oxygen in the atmosphere, thereby typically employing an inert gas such as argon as the shielding gas. If the addition of a filler metal is used, the filler wire can be fed to the weld puddle, where it melts due to the energy delivered by the electric arc. In accordance with one embodiment of the invention, a virtual reality welding system is provided that incorporates technology related to viewing a GTAW/GMAW automated welding operation, using a pendant (actual or virtual) or remote control as it relates to automated welding, identifying welding discontinuities based upon chosen welding parameter combinations, and correcting operator selections and combinations of parameters through the use of user screens to understand the interaction of various parameters and their impact on weld quality with proper terminology and visual elements related to automated welding.

By implementing orbital GTAW training in a virtual environment, a number of issues may be addressed. For example, industry and experience in orbital welding is based on the knowledge of the development company and therefore is consistent and updated to the latest technology and standards available, which is easily done by software upgrade in a virtual environment. The instructor becomes a facilitator to the program and does not need to be an orbital GTAW expert. Additional training aids, such as path following cues or visual overlays, improve transfer of training in a virtual environment. Orbital GTAW equipment, that can become outdated, does not need to be purchased. The virtual reality system can be used in a one-on-one training environment or a classroom type of setting.

The use of a virtual framework allows multiple pendants to be simulated with one training device. In implementing orbital GTAW in virtual reality, a pendant can be made as a physical device or as a virtual pendant. With the physical device, the student is able to interact with the controls and get the "feel" for the control. With a virtual pendant, where the controls are available and interacted with on a touch screen, the user can easily choose a variety of pendants for control, whether they are customized or company dependant. A virtual pendant also allows for different types of controls or levels to be enabled for use by the student depending on learning levels or controls available based on their industry level (mirroring field work experience). Unlike traditional training, randomized faults (e.g. wire nesting) can be implemented that provide the user a more detailed and complete experience without damage to the equipment or time-consuming setup.

Part of the learning interaction is the understanding of proper welding parameters based on the joint, preparation, material type, etc. In accordance with an embodiment, in virtual reality, theory enabled screens can be enabled to prompt a user with knowledge as to the proper choice to make. Additional screens or tables can be enabled to prompt a user with knowledge of what to input, but can also be enabled when a wrong choice is selected to highlight what was chosen and why it was incorrect, with the proper selections identified. This type of intelligent agent can ensure that the student does not perform incorrectly and become frustrated by the end result, positive reinforcement and learning being the key. An embodiment of the invention will also allow for the system or instructor to quiz user's knowledge and adapt the training curriculum and testing to the individual user's blind spots. An embodiment of the present invention employs artificial intelligence (AI) and a learning management system (LMS) to help with instruction in needed areas, reinforce knowledge, and provide learning assistance.

Setup parameters may include, but are not limited to: inert gas (e.g., Argon, Helium); arc ignition; welding current (e.g., pulsed vs. unpulsed); downslope functionality to avoid cratering at the end of the weld; torch rotation travel speed; wire feed characteristics (e.g., pulsed waveforms); wire diameter selection; arc voltage; distance between electrode and workpiece; welding oscillation control; remote control; cooling characteristics of the generally integrated closed-loop water cooling circuit; and weld cycle programming (often with four axes), etc.

Inspection and review of the weld is another aspect to the learning process. The student can view the weld and identify what is correct or wrong and, based on these choices, receive a score to identify whether they were right and further receive input on what is right or wrong based on industry standards. This can be enhanced further to identify how to correct these situations. For instance, with the correct amperage and speed (identified), the weld may be a good weld based on a particular industry standard.

As described above, a physical teach pendant or a hand-held control device for input selection in virtual reality welding may be provided. Alternatively, a virtual teach pendant device for control input selection for virtual reality welding may be provided. Interactions with the handheld or virtual device that are student learning level or industry role dependant that can be enabled on the device. Restricting controls or interactions based on the user may be provided to enhance learning objectives or reinforce industry role interactions, in accordance with an embodiment.

Teaching interaction or reactions based on visual, audible, or physical changes may be provided to ensure the user knows the proper set-up or error recovery. Also, teaching interaction or reactions based on visual, audible, or physical changes may be provided to ensure the user knows the proper changes in controls needed based on environmental or weld specific changes being made. Virtual calculators or tables may be enabled that allow input and provide an output based on values entered. Intelligent agent enabled results based on incorrect set-up parameters or choices may be provided to reinforce correct industry standards. Furthermore, intelligent agent enabled input to identify what the proper controls input should have been may be provided, based on the current visual, audio or physical indicators. In accordance with an embodiment, the simulation of camera based systems may be provided along with the creation of path following and path determinative systems based upon a fuzzy logic controller based system. For example, multiple renderings may be provided by simulating two camera views such that the camera views may be moved during the simulation. In accordance with an embodiment, an alarm may sound when the desired path is deviated from, based on the fuzzy logic, for example. Visualization of a simulated TIG weld puddle may be provided via pixel sizes that are small enough to provided proper visualization of the TIG weld puddle. Simulation of the magnification of the simulated TIG weld puddle may also be provided, for better visualization by the user.

Multiple levels of experience for the user that adapt to the skill level, learning pace and learning style of the user (LMS compatible) may be provided. Artificial intelligence (AI) based fault induction may also be provided in order to test the user's ability to detect, correct and recover from problems. The simulation of unsafe conditions, machine setup, and materials defects may be provided. Also, a multi-language capable system may be provided, allowing for harmonization of training for a global marketplace, in accordance with an embodiment. An embodiment of the present invention may provide a virtual simulation environment allowing two or more users (multi-man) to create a virtual weld, such as in certain orbital welding scenarios.

Enhanced Simulated TIG Welding

One embodiment provides a simulator for facilitating virtual welding activity. The simulator includes a logic processor based subsystem operable to execute coded instructions for generating an interactive welding environment in virtual reality space that emulates welding activity on a virtual welding coupon, wherein the interactive welding environment simulates a virtual weld puddle on the virtual welding coupon, having dynamic real time molten metal fluidity and heat dissipation characteristics, responsive to performing the virtual welding activity in real time. The terms "logic processor based subsystem" and "programmable processor-based subsystem" may be used interchangeably herein. The term "virtual" as used herein may refer to elements that are simulated in a virtual reality environment by the computer instructions of the simulator. Some virtual elements may be displayed to a user via displaying means as described herein, for example.

The simulator further includes a foot pedal device in operative communication with the logic processor based subsystem and configured to affect at least one characteristic of the virtual weld puddle in real time, responsive to user control of the foot pedal device. The simulator also includes displaying means operatively connected to the logic processor based subsystem and configured to visually depict the interactive welding environment, including the virtual weld puddle on the virtual welding coupon, in real time. The foot pedal device may be in operative communication with the logic processor based subsystem by one of a wired means or a wireless means. The at least one characteristic of the virtual weld puddle may be one or more of a width of the virtual weld puddle and a height of the virtual weld puddle.

The foot pedal device may be a mock foot pedal device simulating a real-world foot pedal device, or the foot pedal device may be a real-world foot pedal device capable of being used with a real-world welding system as well as with the simulator. The logic processor based subsystem may be configured to simulate changing of a welding parameter such as one of a simulated welding output current level or a simulated wire feed speed in response to the user control of the foot pedal device, thereby affecting the at least one characteristic of the virtual weld puddle. The simulator may include a mock welding coupon representative of the virtual welding coupon in virtual reality space. The term "mock" as used herein may refer to elements that are simulated in the real-world, not in virtual reality space, to be representative of real-world elements. For example, a mock welding tool may be made of plastic and have one or more sensors and may be configured to approximate the look and feel of a real-world welding tool to a user as the user handles and manipulates the mock welding tool.

The simulator may also include a mock welding tool, representative of a virtual welding tool in virtual reality space, for performing virtual welding activity on the virtual welding coupon in real time as a user manipulates the mock welding tool with respect to the mock welding coupon. The simulator may include a spatial tracking subsystem operatively connected to the logic processor based subsystem. The simulator may further include one or more sensors configured to facilitate tracking movement of the mock welding tool in real time by communicating data about the temporally changing position of the mock welding tool to the spatial tracking subsystem. The mock welding tool and the corresponding virtual welding tool may be simulated as including one of a non-consumable tungsten electrode, a consumable stick electrode, or a consumable wire electrode, for example. The foot pedal device may be configured to provide haptic feedback to the user indicating that a present pedal position of the foot pedal device is outside of a determined range for proper welding.

Figure 24:
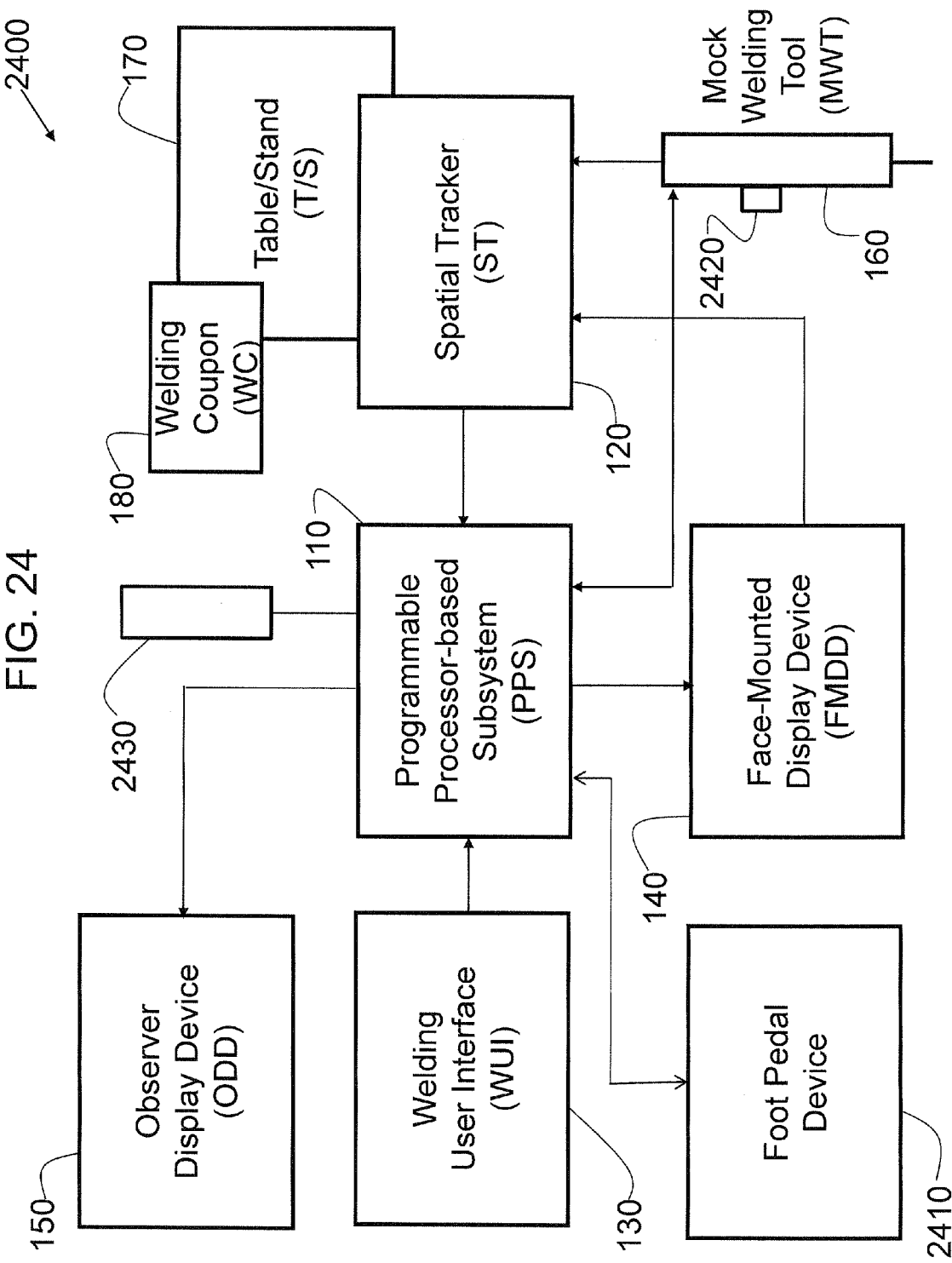
FIG. 24 illustrates a schematic block diagram of an exemplary representation of a second embodiment of a simulator.

FIG. 24 illustrates a schematic block diagram of an exemplary representation of a second embodiment of a simulator 2400. The simulator 2400 is similar to the simulator 100 of FIG. 4, except that the simulator 2400 includes a foot pedal device 2410 and includes a mock welding tool 160 having a selectable gas flow selector 2420. The foot pedal device 2410 is operatively connected to the PPS 110, either via wired means (e.g., an electronic cable) or wireless means (e.g., a Bluetooth™ connection). In accordance with an embodiment, the foot pedal device 2410 may be used by an operator (user) to adjust, for example, a simulated welding output current or a simulated wire feed speed. For example, during a simulated TIG welding session, the operator may press on the foot pedal device 2410 to increase the size of a virtual weld puddle by effectively telling the simulator to increase the effective welding output current level. Similarly, the operator may press on the foot pedal device 2410 to decrease the size of a virtual weld puddle by effectively telling the simulator to decrease the effective welding output current level. One or more of the length, width, and height of the virtual weld puddle may be affected in real time. In accordance with one embodiment, the foot pedal device may be adjusted in a continuous manner over a determined range by the operator. In accordance with another embodiment, the foot pedal device may be adjusted in a step-wise manner over a determined range.

Figure 25:
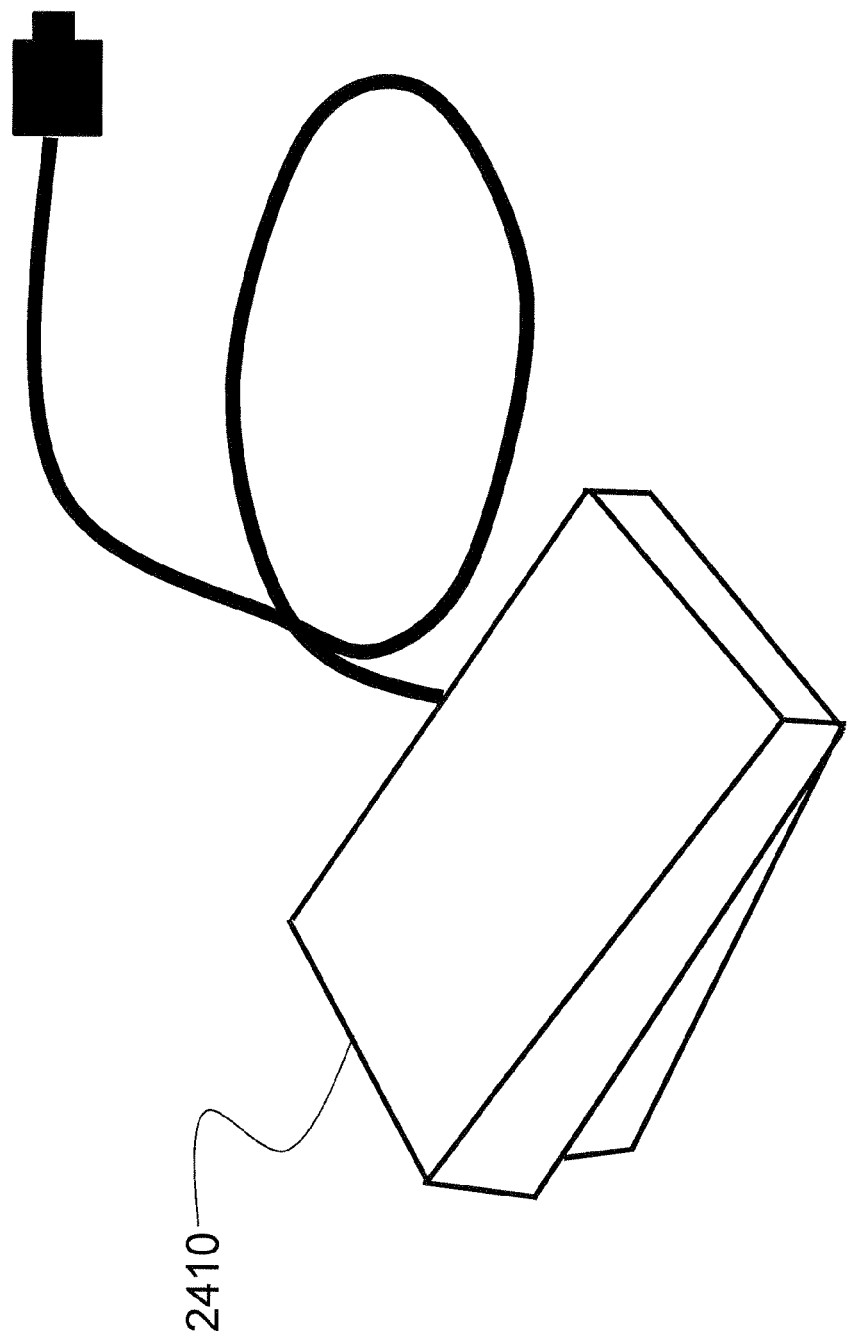
FIG. 25 illustrates an exemplary embodiment of a foot pedal device used in the simulator of FIG. 24.
Figure 26:
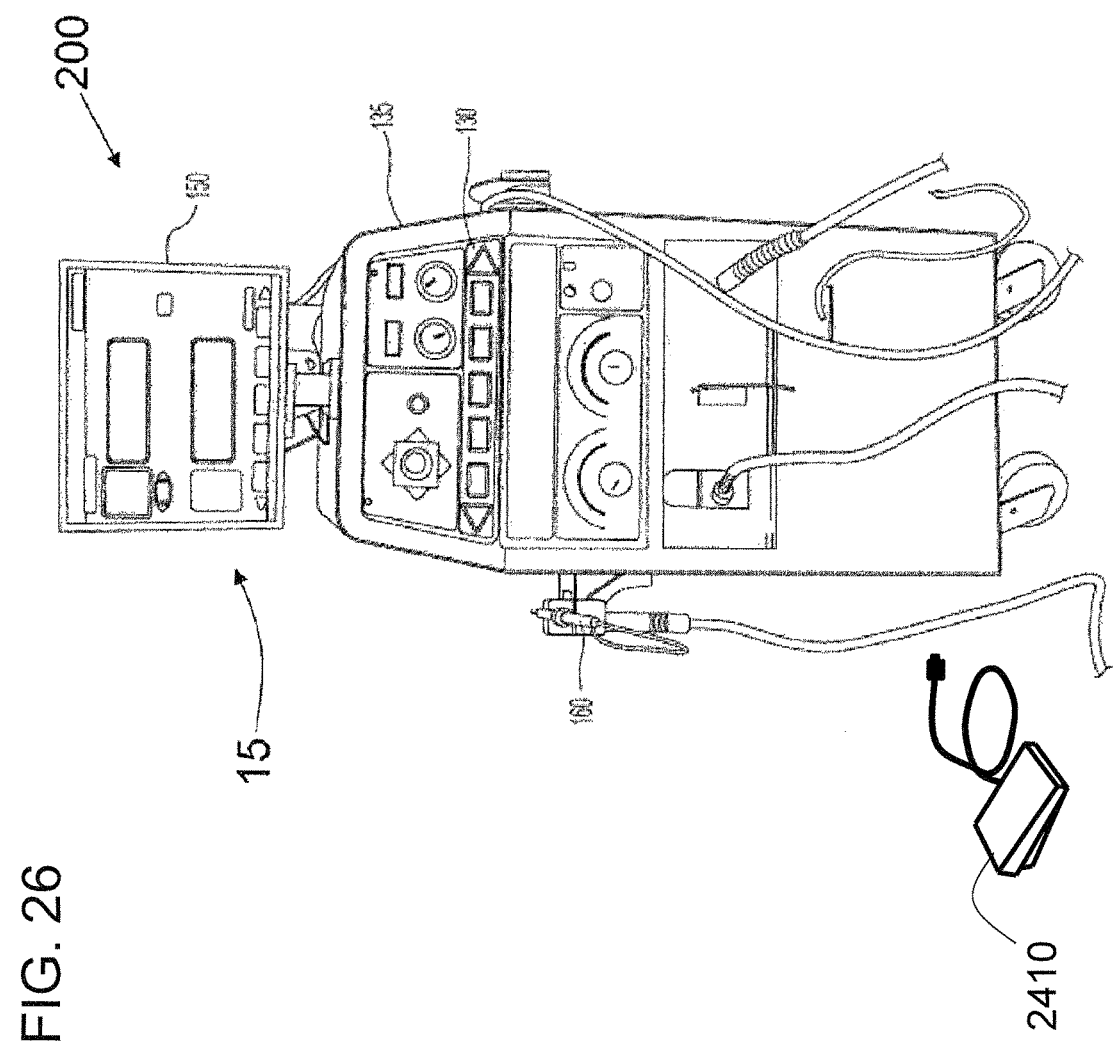
FIG. 26 illustrates an exemplary embodiment of the simulator of FIG. 24 showing the foot pedal device of FIG. 24.

FIG. 25 illustrates an exemplary embodiment of a foot pedal device 2410 used in the simulator 2400 of FIG. 24. FIG. 26 illustrates an exemplary embodiment of the simulator 2400 of FIG. 24 showing the foot pedal device 2410 of FIG. 25. The foot pedal device 2410 may be a mock foot pedal device, configured specifically for operation with the simulator to simulate a "real" foot pedal device. Alternatively, the foot pedal device 2410 may be a "real" foot pedal device configured for use with a "real" welding system. However, in accordance with an embodiment, the simulator 2400 may be configured to be compatible with the "real" foot pedal device. For example, a "real" foot pedal device may be a wireless device that wirelessly outputs data that is indicative of a pedal position of the foot pedal device. The logic processor based subsystem (PPS 110) may be configured to wirelessly receive the data output from the foot pedal device just as a real welding system, for which the foot pedal device was originally intended, is configured.

During the performance of a virtual welding activity by an operator of the simulator, the mock welding coupon 180 is represented as a virtual welding coupon in virtual reality space. The mock welding tool 160 is represented as a virtual welding tool in virtual reality space and is used for performing the virtual welding activity on the virtual welding coupon in real time as the operator manipulates the mock welding tool with respect to the mock welding coupon. In accordance with an embodiment, one or more sensors 122 are configured to facilitate tracking movement of the mock welding tool in real time by communicating data about the temporally changing position of the mock welding tool to the spatial tracking subsystem 120. The spatial tracker (ST) 120 may be part of the logic processor based subsystem 110 and performs the tracking functions, in accordance with an embodiment. The terms "spatial tracker" and "spatial tracking subsystem" may be used interchangeably herein. Alternatively, the spatial tracking subsystem 120 is operatively connected to the logic processor based subsystem 110, performs the tracking functions, and provides tracking information to the logic process based subsystem 110. The mock welding tool and the corresponding virtual welding tool may be simulated as including one of a non-consumable tungsten electrode, a consumable stick electrode, or a consumable wire electrode, for example.

In accordance with an embodiment, the foot pedal device 2410 is configured to provide haptic feedback to the operator, indicating that a present pedal position of the foot pedal device is outside of a determined range for proper welding. For example, the foot pedal device 2410 may vibrate (where the vibration is the haptic feedback) when the present pedal position of the foot pedal device is outside of a determined range for proper welding. Alternatively, the foot pedal device 2410 may vibrate (where the vibration is the haptic feedback) when the present pedal position of the foot pedal device is within a determined range for proper welding. Other feedback indicators may be provided as well. For example, a displayed message may be provided to the operator or some other visible (e.g., flashing light) or audible indicator (e.g., beeping sound) may be provided, indicating an in-range or out-of-range condition with respect to the present pedal position of the foot pedal device.

One embodiment provides a simulator for facilitating virtual welding activity. The simulator includes a mock welding coupon represented in virtual reality space by a virtual welding coupon, and a mock welding tool represented in virtual reality space by a virtual welding tool. The simulator further includes a logic processor based subsystem operable to execute coded instructions for generating an interactive welding environment in virtual reality space that emulates welding activity on the virtual welding coupon by the virtual welding tool, wherein the interactive welding environment simulates a virtual weld puddle on the virtual welding coupon, having dynamic real time molten metal fluidity and heat dissipation characteristics, responsive to performing the virtual welding activity in real time.

The simulator includes a spatial tracking subsystem operatively connected to the logic processor based subsystem. The simulator also includes one or more first sensors configured to facilitate tracking movement of at least a tip of the mock welding tool in real time by communicating data about the temporally changing position of the mock welding tool to the spatial tracking subsystem. The logic processor based subsystem is configured to accept tracking information from the spatial tracking subsystem and determine when the tip of the virtual welding tool, corresponding to the tip of the mock welding tool, intersects a surface of the virtual weld puddle in virtual reality space during the virtual welding activity, and wherein the logic processor based subsystem is further configured to generate an indication, to be provided to a user, that the virtual welding tool has become contaminated due to the intersecting.

The simulator may further include a mock filler wire or mock filler rod represented in virtual reality space by a virtual filler wire or a virtual filler rod. The terms "filler wire" and "filler rod" may be used interchangeably herein. The simulator may also include one or more second sensors configured to facilitate tracking movement of at least a tip of the mock filler wire in real time by communicating data about the temporally changing position of the mock filler wire to the logic spatial tracking subsystem. The logic processor based subsystem may be configured to accept tracking information from the spatial tracking subsystem and determine when the tip of the virtual filler wire, corresponding to the tip of the mock filler wire, touches the virtual welding tool in virtual reality space during the virtual welding activity. The logic process based subsystem may further be configured to generate an indication, to be provided to a user, that the virtual welding tool has become contaminated due to the touching.

The logic processor based subsystem may be further configured to determine when the tip of the virtual filler wire penetrates the virtual weld puddle, and modify at least a height of the virtual weld puddle due to the penetration. The simulator may also include a foot pedal device operatively connected to the logic processor based subsystem and configured to change at least one characteristic of the virtual weld puddle in real time, responsive to user control of the foot pedal device. The at least one characteristic of the virtual weld puddle may be one or more of a width of the virtual weld puddle and a height of the virtual weld puddle.

The simulator may further include displaying means operatively connected to the logic process based subsystem for visually depicting the interactive welding environment, wherein the displaying means depicts the virtual weld puddle on the virtual welding coupon in real time. The logic processor based subsystem may be configured to convert the virtual weld puddle to a virtual weld bead during the virtual welding activity, wherein the indication that the virtual welding tool has become contaminated due to the intersecting corresponds to depicting the virtual weld bead on the displaying means as having one or more defects.

The mock welding tool and the corresponding virtual welding tool may be simulated as including a non-consumable tungsten electrode. A stick out position of the mock welding tool may be adjustable by a user. The simulator may also include a user selectable gas flow selector mounted on the mock welding tool and configured to communicate to the logic processor based subsystem that a simulated gas flow out of the virtual welding tool is off when in a first position, and that the simulated gas flow is on when in a second position. The simulator may further include a plurality of mock gas flow cups each configured to be attached to and detached from the mock welding tool, wherein each mock gas flow cup of the plurality of mock gas flow cups is configured to simulate a unique directing of gas flow out of the mock welding tool.

The logic processor based subsystem may be configured to simulate the establishment of an arc between the tip of the virtual welding tool and the virtual welding coupon when a user touches the tip of the mock welding tool to the mock welding coupon and lifts the tip of the mock welding tool off of the mock welding coupon in a determined manner. The logic processor based subsystem may be configured to simulate the establishment of an arc between the tip of the virtual welding tool and the virtual welding coupon when a user drags the tip of the mock welding tool across a surface of the mock welding coupon in a determined manner. The logic processor based subsystem may be configured to simulate the establishment of an arc between the tip of the virtual welding tool and the virtual welding coupon when a user moves the tip of the mock welding tool toward the mock welding coupon in a determined manner, without touching the mock welding coupon with the tip of the mock welding tool.

In the real world, when a non-consumable tungsten electrode becomes contaminated, the user has to cease welding and either replace the contaminated electrode or clean and re-prepare the contaminated electrode. This takes time and results in an inefficient welding session. Therefore, when training a user to perform a GTAW welding process using the simulator herein, the user is made aware when he has contaminated the electrode. A user may contaminate an electrode by lowering the tip or end of the electrode into the weld puddle, by touching the filler wire to the electrode, or by pushing up the weld puddle with the filler wire, causing the weld puddle to rise up and touch the tip or end of the electrode. Teaching a user not to contaminate the electrode is an important aspect of GTAW welding.

Figure 27:
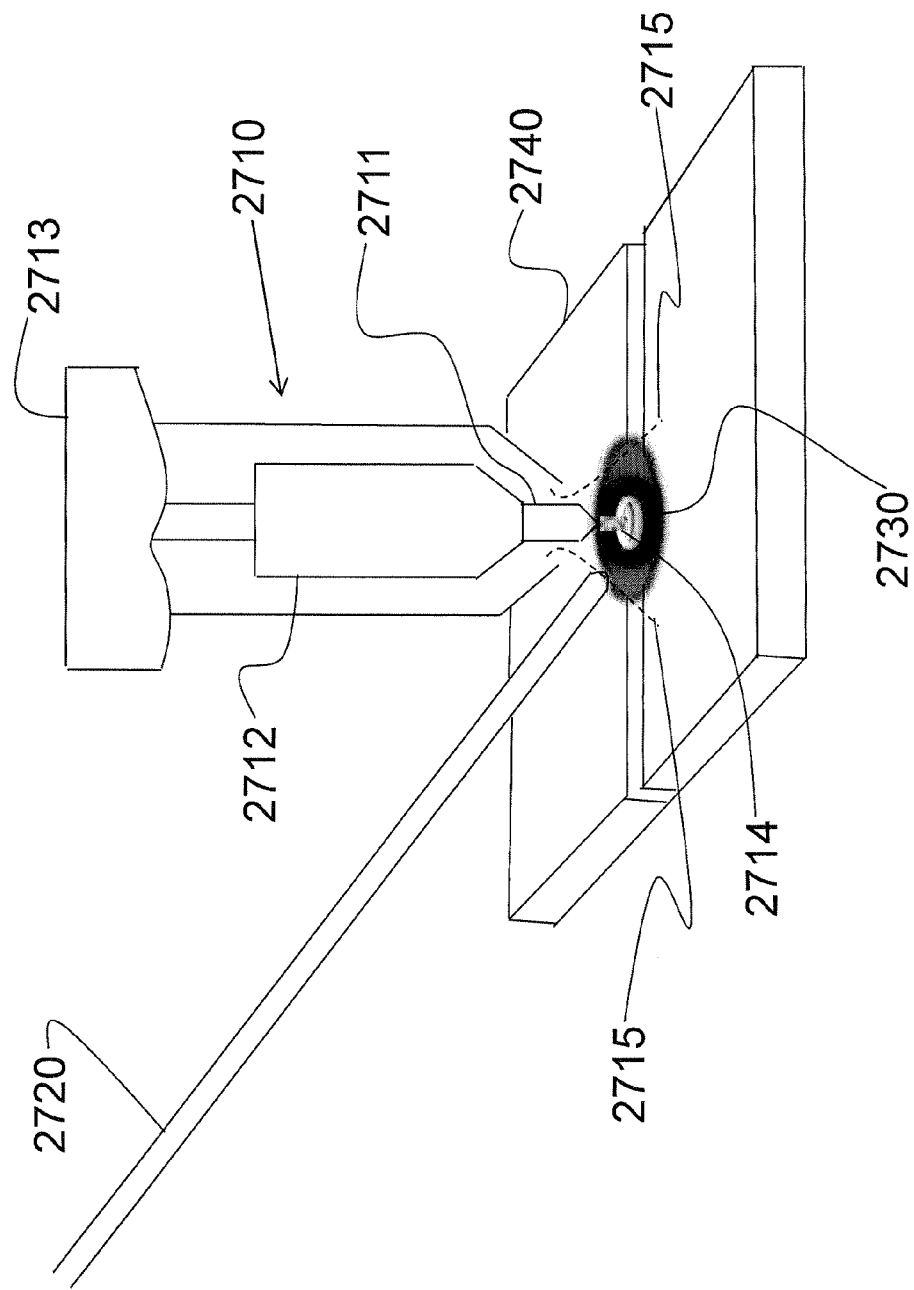
FIG. 27 illustrates an exemplary embodiment of a virtual welding activity in virtual reality space.

FIG. 27 illustrates an exemplary embodiment of a virtual welding activity in virtual reality space. Such a virtual welding activity may be displayed on the display device 150, for example. The welding activity shown in FIG. 27 is a simulated GTAW welding activity. A virtual welding tool 2710 and a virtual filler wire 2720 are shown creating a virtual weld puddle 2730 on a virtual welding coupon 2740 during a simulated GTAW welding process. The virtual welding tool 2710 simulates a non-consumable tungsten electrode 2711, a contact tube 2712, and a GTAW head 2713 in virtual reality space. The welding activity shown in FIG. 27 also illustrates a virtual electrical arc 2714 and a virtual shielding gas 2715 in virtual reality space.

Figure 28:
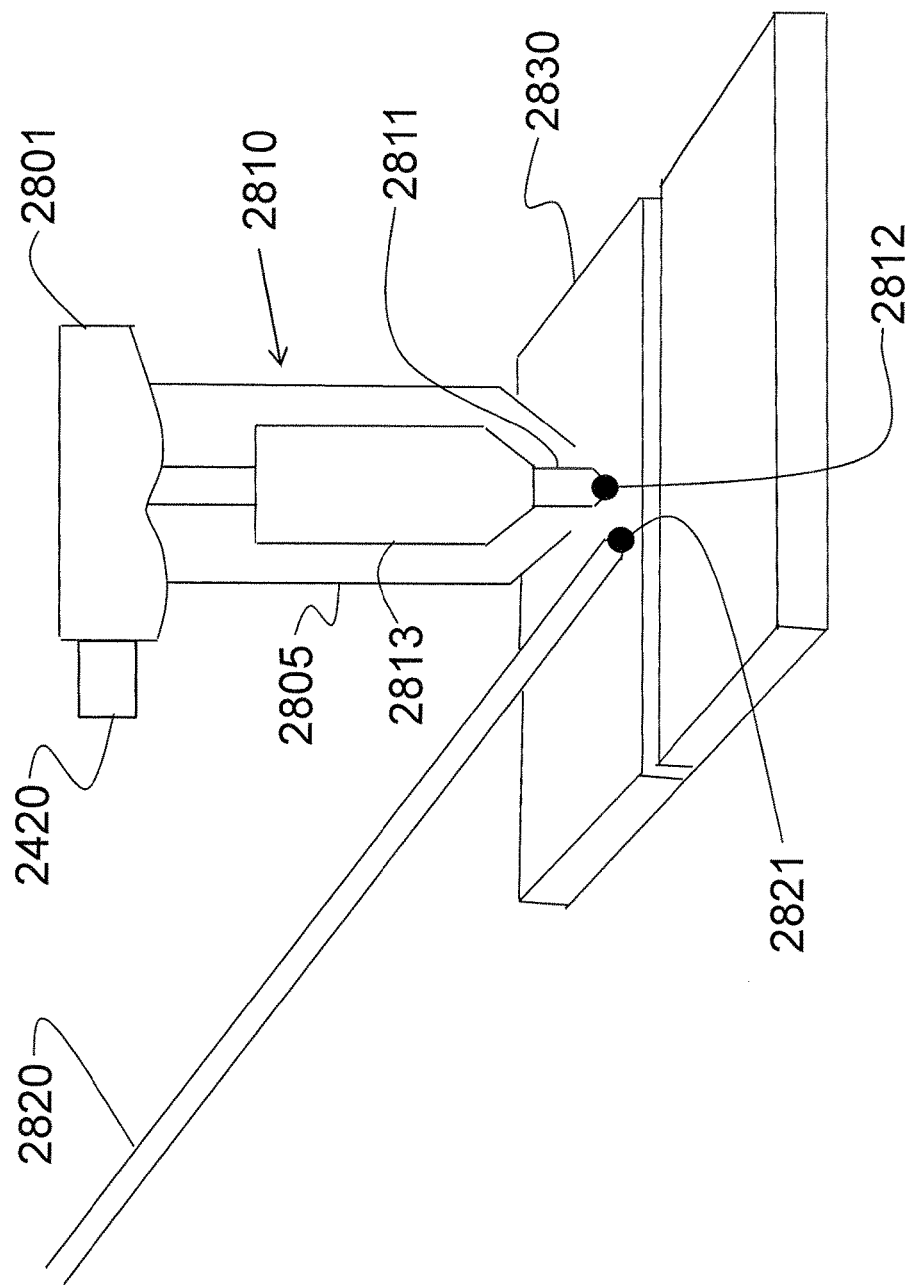
FIG. 28 illustrates an exemplary embodiment of a simulated welding activity, representative of the virtual welding activity of FIG. 27, using a mock welding tool and a mock filler wire having sensors.

FIG. 28 illustrates an exemplary embodiment of a simulated welding activity, representative of the virtual welding activity of FIG. 27, using a mock welding tool 2810 and a mock filler wire 2820 that may be manipulated by a user during the simulated welding activity with respect to a mock welding coupon 2830. The mock welding tool 2810, the mock filler wire 2820, and the mock welding coupon 2830 are respectively represented in virtual reality space by the virtual welding tool 2710, the virtual filler wire 2720, and the virtual welding coupon 2740. The representation of the welding activity in virtual reality space as shown in FIG. 27 is responsive to the users actions with respect to the mock welding tool 2810, the mock filler wire 2820, and the mock welding coupon 2830.

The mock welding tool 2810 includes a mock non-consumable tungsten electrode 2811. In accordance with an embodiment, the tip of the mock non-consumable tungsten electrode 2811 has one or more sensors 2812 to facilitate tracking of the position of the tip of the mock electrode 2811 by the spatial tracking subsystem 120. Similarly, the tip of the mock filler wire 2820 has one or more sensors 2821 to facilitate tracking of the position of the tip of the mock filler wire 2820 by the spatial tracking subsystem 120. In accordance with an embodiment, the sensors 2812 and 2821 may be similar to the sensors 122 and may have multiple induction coils aligned in crossing spatial directions when the spatial tracking subsystem 120 is a magnetic tracking subsystem as described herein, allowing the respective tips of the mock electrode 2811 and the mock filler wire 2820 to be tracked in three-dimensional space as a user moves the mock welding tool 2810 and the mock filler wire 2820 during a simulated welding activity. Other types of sensors may be used in other embodiments using other methods of tracking (e.g., infrared-based tracking, camera-based tracking, accelerometer-based tracking).

Again, the mock welding tool 2810 is represented in virtual reality space as the virtual welding tool 2710 and the mock welding coupon 2830 is represented in virtual reality space as the virtual welding coupon 2740. The logic based processor subsystem 110 is operable to execute coded instructions to generate the interactive welding environment in virtual reality space which emulates welding activity on the virtual welding coupon 2740 by the virtual welding tool 2710. Use of the mock filler wire 2820 is optional and, therefore, the mock filler wire 2820 may or may not be used during a simulated welding activity.

The interactive welding environment simulates the virtual weld puddle 2730 on the virtual welding coupon 2740 in virtual reality space. The virtual weld puddle 2730 is simulated to have dynamic, real time molten metal fluidity and heat dissipation characteristics, responsive to the user performing the simulated welding activity in real time. When simulating the virtual weld puddle, the effects of the virtual arc 2714, the virtual shielding gas 2715, and the virtual filler wire 2720 are all taken into consideration. In GTAW (TIG) welding, it is important that the non-consumable tungsten electrode not touch the weld puddle or the filler wire. Otherwise, the non-consumable tungsten electrode can become contaminated which can adversely affect the resultant weld bead. For example, a contaminated electrode can cause the resultant weld bead to contain various types of defects which are well known in the art.

In accordance with an embodiment, the logic processor based subsystem 110 accepts tracking information from the spatial tracking subsystem 120 and determines when the tip of the virtual electrode 2711 of the virtual welding tool 2710, corresponding to the tip of the mock electrode 2811 of the mock welding tool 2810, intersects a surface of the virtual weld puddle 2730 in virtual reality space during the virtual welding activity, thus virtually contaminating the electrode. The electrode may intersect the surface of the weld puddle due to the user lowering the tip or end of the electrode into the weld puddle, or by pushing up the weld puddle with the filler wire, causing the weld puddle to rise up and touch the tip or end of the electrode. In accordance with an embodiment, the logic processor based subsystem 110 determines when the tip of the virtual filler wire 2720 penetrates the virtual weld puddle 2730 and modifies, for example, a height of the virtual weld puddle 2730 due to the penetration. Also, in accordance with an embodiment, the foot pedal device 2410 may be used, as previously described herein, to affect the virtual weld puddle 2730 in real time. For example, the height or the width of the virtual weld puddle may be changed by operation of the foot pedal device. Improper operation of the foot pedal may also result in contamination of the electrode. Similarly, the logic processor based subsystem 110 accepts tracking information from the spatial tracking subsystem 120 and determines when the tip of the virtual filler wire 2720, corresponding to the tip of the mock filler wire 2820, virtually touches the virtual electrode 2711 in virtual reality space during the virtual welding activity, thus virtually contaminating the electrode.

In accordance with an embodiment, the logic processor based subsystem 110 takes into account the contamination of the electrode and how the contaminated electrode affects the weld puddle and, therefore, the resultant weld bead. Also, the logic processor based subsystem 110 may be configured to generate an indication, to be provided to the user, that the electrode of the welding tool has become contaminated, in a virtual sense. The indication may be in the form of a visible indicator (e.g., a flashing light) and/or an audible indicator (e.g., a beeping sound). Alternatively, or in addition, a displayed message may be provided to the operator indicating that the electrode has become contaminated. In accordance with an embodiment, the user may not be able to continue with the simulated welding activity until the user indicates to the simulator that the tungsten electrode has been cleaned or replaced. This may be accomplished by an input sequence entered into the user interface of the welding simulator by the user, for example. Inputting the user input sequence may be just inconvenient enough to motivate the user to avoid contaminating the electrode.

In accordance with an embodiment, a stick-out position of the mock non-consumable tungsten electrode 2811 is adjustable. Therefore, a user may adjust the amount of stick-out of the mock electrode 2811 on the mock welding tool 2810, for example, to help prevent virtual contamination of the corresponding virtual electrode 2711 by the user. Adjustment of the stick-out position may be accomplished in any of various ways including, for example, an adjustable connection to the fixed mock contact tube 2813. Such adjustment may be made by screwing the mock electrode 2811 a desired distance into or out of the mock contact tube 2813, for example. Other methods of adjustment are possible as well, in accordance with various other embodiments.

During a simulated welding activity, the virtual welding tool 2710 provides a simulated shielding gas 2715 out of the end of the virtual welding tool 2710 to simulate, for example, the shielding gas provided in a GTAW welding process. Referring to FIG. 24, the mock welding tool 160 (or 2810 in FIG. 28) may include a selectable mock gas flow selector 2420 mounted on the mock welding tool. The mock gas flow selector 2420 is configured to communicate to the logic processor based subsystem 110 (via wired or wireless means) that a simulated gas flow out of the virtual welding tool is "off" when in a first position, and that the simulated gas flow is "on" when in a second position. The mock gas flow selector 2420 may be a rotatable knob or a switch, for example, in accordance with various embodiments. For a GTAW welding process, it is important that the user turn the gas flow "on" to provide the shielding gas during the welding process. Failure to turn the gas flow "on" in the simulation may result in the weld bead being simulated as having one or more types of defects.

In accordance with an embodiment, the simulator may provide a plurality of mock gas flow cups each configured to be attached to and detached from the mock welding tool. Each mock gas flow cup may be configured to simulate a unique directing of gas flow out of the mock welding tool. An example of a detachable mock gas flow cup 2805 is shown in FIG. 28. In accordance with an embodiment, the mock gas flow cup 2805 snaps into a mock GTAW head 2801 of the mock welding tool 2810. Other means of attaching a mock gas flow cup to a mock welding tool are possible as well, in accordance with various other embodiments. The shape of the output end of the mock gas flow cup 2805 near the tip of the mock electrode 2811 mimics the shape of a real gas flow cup which determines the direction of real gas flow out of a welding tool. Each mock gas flow cup of the plurality of mock gas flow cups may have a differently shaped output end, representative of different real gas flow cups providing different directional gas flows. In the simulated welding environment, a user may select a mock gas flow cup to attach to the mock welding tool.

In accordance with an embodiment, when a mock gas flow cup 2805 is attached to the mock welding tool 2810 by the user, the user may enter, into the simulator via the user interface 130, an identifier of the mock gas flow cup. As such, the logic processor based subsystem 110 takes into account the particular attached mock gas flow cup and simulates directional gas flow out of the virtual welding tool 2810 in virtual reality space based on the identified mock gas flow cup. As a result, the simulation of the virtual weld puddle and the resulting virtual weld bead may be affected by the attached mock gas flow cup.

In accordance with another embodiment, when a mock gas flow cup is attached to the mock welding tool, identifying data may be automatically provided to the logic processor based subsystem 110 by wired or wireless means. For example, the mock gas flow cup may be encoded (e.g., via bar coding or radio frequency identification) with an identifying code that can be read by the simulator. In such an embodiment, a scanning or reading device 2430 (e.g., a bar code scanning device or a radio frequency identification reading device) may be operatively connected to the logic processor based subsystem 110 and configured to scan or read the identifying code on the attached mock gas flow cup. Other means of automatically communicating an identifying code of a mock gas flow cup to the logic processor based subsystem 110 are possible as well, in accordance with other embodiments.

In accordance with an embodiment, the logic processor based subsystem 110 is configured to simulate the establishment of an arc 2714 between the tip of the virtual electrode 2711 of the virtual welding tool 2710 and the virtual welding coupon 2740 at the start of a simulated welding process when a user touches the tip of the mock electrode 2811 of the mock welding tool 2810 to the mock welding coupon 2830 and lifts the tip off of the mock welding coupon 2830 in a determined manner. Such an embodiment simulates a "lift start" for a GTAW welding process, for example. The position of the tip of the mock electrode is tracked by the simulator with respect to the mock welding coupon, using the tracking techniques described herein, in order to accomplish the "lift start" establishment of the simulated arc. Alternatively, the tip of the mock welding electrode may be fitted with a pressure sensor (e.g., a piezoelectric sensor) such that, when the tip of the mock welding electrode touches the mock coupon, the pressure sensor generates an electrical signal which may be provided to the logic processor based subsystem, for example, to indicate the touching. In accordance with another alternative embodiment, the tip of the mock welding electrode and the mock welding coupon may be configured to complete an electrically conductive (or at least partially-conductive) path, indicating to the simulator that the tip has touched the coupon.

In accordance with an embodiment, the logic processor based subsystem 110 is configured to simulate the establishment of an arc 2714 between the tip of the virtual electrode 2711 of the virtual welding tool 2710 and the virtual welding coupon 2740 at the start of a simulated welding process when a user drags the tip of the mock welding electrode across a surface of the mock welding coupon in a determined manner. Such an embodiment simulates a "scratch start" for a GTAW welding process, for example. Again, the position of the tip of the mock electrode is tracked by the simulator with respect to the mock welding coupon, using the tracking techniques described herein, in order to accomplish the "scratch start" establishment of the simulated arc. Alternatively, the tip of the mock welding electrode may be fitted with a pressure sensor (e.g., a piezoelectric sensor) such that, when the tip of the mock welding electrode is dragged across the mock coupon, the pressure sensor generates an electrical signal which may be provided to the logic processor based subsystem, for example, to indicate the dragging. In accordance with another alternative embodiment, the tip of the mock welding electrode and the mock welding coupon may be configured to complete an electrically conductive (or at least partially-conductive) path, indicating to the simulator that the tip is touching and is being dragged across the coupon.

In accordance with an embodiment, the logic processor based subsystem 110 is configured to simulate the establishment of an arc 2714 between the tip of the virtual electrode 2711 of the virtual welding tool 2710 and the virtual welding coupon 2740 at the start of a simulated welding process when a user moves the tip of the mock welding tool toward the mock welding coupon in a determined manner, without touching the mock welding coupon with the tip of the mock welding tool. Such an embodiment may simulate a "high-frequency start" for a GTAW welding process, for example. The simulator simulates using a high-frequency output as the mock welding tool approaches the mock welding coupon at the start of a simulated welding process. The virtual arc 2714 is established once the tip of the electrode of the mock welding tool reaches a determined distance from the surface of the mock welding coupon. In accordance with an embodiment, the foot pedal device 2410 may be used by a user to go into and out of the high-frequency mode of operation.

In accordance with an embodiment, the displaying means 150 may be configured as a touch-screen device that can be used as a welding user interface. The touch-screen device may allow a user to select a user interface that models the user interface of a real-world welding machine. A user may be able to select from a plurality of user interfaces representative of a plurality of real-world welding machines. As a result, a user may be able to use the displayed user interface on the touch-screen device to set up a simulated welding activity for a selected welding machine type. In this manner, a user can become familiar with the user interface of various types of real-world welding machines using the simulator. Furthermore, once a type of welding machine is selected, the simulator may be automatically adapted to simulate that particular type of welding machine, for example, in terms of how the welding power source operates and the types of welding waveforms that are available.

In accordance with an embodiment, the simulator allows a user to select a type of tungsten electrode to use during a simulated welding activity. The selectable types of tungsten electrode may include, for example, Pure Tungsten, 2% Ceriated Tungsten, 1.5% Lanthanated Tungsten, and 2% Thoriated Tungsten. Other types of tungsten electrodes may be selectable as well, in accordance with various other embodiments. If a user selects an incorrect type of tungsten electrode for a particular simulated welding activity, the simulator may indicate to the user that such an incorrect selection has been made. In this manner the simulator can teach the user which types of tungsten electrodes are appropriate for which types of welding activity. Furthermore, based on the type of tungsten electrode selected, the simulation of the welding activity may be modified to account for the type of tungsten electrode. For example, since it is known that the type of tungsten electrode can affect the appearance of the arc, the simulator may adapt the appearance of the arc based on the type of tungsten electrode selected.

In accordance with an embodiment, the simulator may be configured to allow a user to view and inspect a root bead on the inside of a virtual pipe after performing a simulated pipe welding activity. Even after having created a good root bead using the simulator, successive heat passes can degrade the root bead if not performed properly. In accordance with an embodiment, the simulator is configured to modify a virtual root bead weld based on a successive heat pass weld by employing the weld puddle and weld bead simulation methods described herein. The simulator can display the inside of a simulated welded pipe as if the user were looking inside the pipe with a flash light, for example, after performing a pipe welding activity. Alternatively, the simulator can effectively invert the simulated pipe to display the inside of the simulated pipe as if appearing on the outside, and vice versa.

In summary, disclosed is a real-time virtual reality welding system including a programmable processor-based subsystem (a.k.a., a logic processor based subsystem), a spatial tracker operatively connected to the programmable processor-based subsystem, at least one mock welding tool capable of being spatially tracked by the spatial tracker, and at least one display device operatively connected to the programmable processor-based subsystem. The logic processor based subsystem may be operable to generate an interactive welding environment in virtual reality space that emulates welding activity by simulating a virtual weld puddle having dynamic, real time molten metal fluidity and heat dissipation characteristics, responsive to performing a simulated welding activity in real time. The system is further capable of displaying the simulated weld puddle on the display device in real-time. The system may include a foot pedal device in operative communication with the logic processor based subsystem and configured to affect a characteristic of the virtual weld puddle in real time, responsive to user control of the foot pedal device. The system may be configured to track the movements of a mock welding tool and a mock filler wire and determine interaction between the virtual weld puddle, a corresponding virtual welding tool, and a corresponding filler wire in virtual reality space that would result in the welding tool becoming contaminated.

The invention has been described herein with reference to the disclosed embodiments. Obviously, modifications and alterations will occur to others upon a reading and understanding of this specification. It is intended to include all such modifications and alterations insofar as they come within the scope of the appended claims or the equivalence thereof.

What is claimed is:

1. A system for facilitating simulated welding activity, comprising:
    a mock welding coupon;
    a mock gas tungsten arc welding (GTAW) tool;
    a logic processor based subsystem operable to execute coded instructions for generating an interactive welding environment that emulates GTAW activity on a simulated welding coupon, which is based on the mock welding coupon, by the mock GTAW tool, wherein the interactive welding environment simulates a weld puddle on the simulated welding coupon responsive to performing the simulated welding activity in real time;
    a spatial tracking subsystem operatively connected to the logic processor based subsystem and one or more first sensors configured to facilitate tracking movement of at least a tip of the mock GTAW tool in real time by communicating data about a temporally changing position of the mock GTAW tool to the spatial tracking subsystem,
    wherein the logic processor based subsystem accepts tracking information from the spatial tracking subsystem and determines when the tip of the mock GTAW tool simulatively intersects a surface of the simulated weld puddle during the simulated welding activity, and wherein the logic processor based subsystem is further configured to generate an indication, to be provided to a user, that the mock GTAW tool has simulatively become contaminated due to the intersecting.

2. The system of claim 1, further comprising;
    a mock filler wire; and
    one or more second sensors configured to facilitate tracking movement of at least a tip of the mock filler wire in real time by communicating data about a temporally changing position of the mock filler wire to the spatial tracking subsystem,
    wherein the logic processor based subsystem accepts tracking information from the spatial tracking subsystem and determines when the tip of the mock filler wire touches the mock GTAW tool during the simulated welding activity, and wherein the logic processor based subsystem is further configured to generate an indication, to be provided to a user, that the mock GTAW tool has simulatively become contaminated due to the touching.

3. The system of claim 2, wherein the logic processor based subsystem:
    determines when the tip of the mock filler wire simulatively penetrates the simulated weld puddle; and
    modifies at least a height of the simulated weld puddle due to the penetration.

4. The system of claim 1, further comprising a display device operatively connected to the logic processor based subsystem for visually depicting the interactive welding environment, wherein the display device depicts the simulated weld puddle on the simulated welding coupon in real time.

5. The system of claim 4, wherein the logic processor based subsystem converts the simulated weld puddle to a simulated weld bead during the simulated welding activity, wherein the indication that the mock GTAW tool has simulatively become contaminated due to the intersecting corresponds to depicting the simulated weld bead on the display device as having one or more defects.

6. The system of claim 1, wherein the mock GTAW tool simulates a non-consumable tungsten electrode.

7. The system of claim 1, wherein a stick-out position of the mock GTAW tool is adjustable.

8. The system of claim 1, further comprising a user selectable gas flow selector mounted on the mock GTAW tool and configured to communicate to the logic processor based subsystem that a simulated gas flow, as represented in the interactive welding environment, out of the mock GTAW tool is off when in a first position, and that the simulated gas flow is on when in a second position.

9. The system of claim 1, further comprising a plurality of mock gas flow cups each configured to be attached to and detached from the mock GTAW tool, wherein each mock gas flow cup of the plurality of mock gas flow cups is configured to simulate a unique directing of gas flow out of the mock GTAW tool.

10. The system of claim 1, wherein the logic processor based subsystem simulates an establishment of an arc between the tip of the mock GTAW tool and the mock welding coupon when a user touches the tip of the mock GTAW tool to the mock welding coupon and lifts the tip of the mock GTAW tool off of the mock welding coupon.

11. The system of claim 1, wherein the logic processor based subsystem simulates an establishment of an arc between the tip of the mock GTAW tool and the mock welding coupon when a user drags the tip of the mock GTAW tool across a surface of the mock welding coupon.

12. The system of claim 1, wherein the logic processor based subsystem simulates an establishment of an arc between the tip of the mock GTAW tool and the mock welding coupon when a user moves the tip of the mock GTAW tool toward the mock welding coupon, without touching the mock welding coupon with the tip of the mock GTAW tool.

13. A method for facilitating simulated welding activity, comprising:
generating an interactive welding environment that emulates GTAW activity on a simulated welding coupon, which is based on a mock welding coupon, by a mock gas tungsten arc welding (GTAW) tool, wherein the interactive welding environment simulates a weld puddle on the simulated welding coupon responsive to performing the simulated welding activity in real time;
tracking movement of at least a tip of the mock GTAW tool in real time using one or more first sensors mounted on a helmet and communicating data about a temporally changing position of the mock GTAW tool;
accepting tracking information related to the temporally changing position of the mock GTAW tool and determining when the tip of the mock GTAW tool simulatively intersects a surface of the simulated weld puddle during the simulated welding activity; and
generating an indication, to be provided to a user, that the mock GTAW tool has simulatively become contaminated due to the intersecting.

14. The method of claim 13, further comprising:
tracking movement of at least a tip of a mock filler wire in real time using one or more second sensors and communicating data about a temporally changing position of the mock filler wire;
accepting tracking information related to the temporally changing position of the mock filler wire and determining when the tip of the mock filler wire touches the mock GTAW tool during the simulated welding activity; and
generating an indication, to be provided to a user, that the mock GTAW tool has simulatively become contaminated due to the touching.

15. The method of claim 14, further comprising:
determining when the tip of the mock filler wire simulatively penetrates the simulated weld puddle; and
modifying at least a height of the simulated weld puddle due to the penetration.

16. The method of claim 13, further comprising:
visually depicting, on a display device, the interactive welding environment, including depicting the simulated weld puddle on the simulated welding coupon in real time.

17. The method of claim 16, further comprising:
converting the simulated weld puddle to a simulated weld bead during the simulated welding activity, wherein the indication that the mock GTAW tool has simulatively become contaminated due to the intersecting corresponds to depicting the simulated weld bead on the display device as having one or more defects.

18. The method of claim 13, wherein the mock GTAW tool simulates a non-consumable tungsten electrode.

19. The method of claim 13, wherein a stick-out position of the mock GTAW tool is adjustable.

20. The method of claim 13, wherein the mock GTAW tool includes a user selectable gas flow selector mounted thereon, and
the method further comprises communicating that a simulated gas flow, as represented in the interactive welding environment, out of the mock GTAW tool is off when in a first position, and that the simulated gas flow is on when in a second position.

21. The method of claim 13, wherein the mock GTAW tool includes a plurality of mock gas flow cups each configured to be attached to and detached from the mock GTAW tool, and
wherein each mock gas flow cup of the plurality of mock gas flow cups is configured to simulate a unique directing of gas flow out of the mock GTAW tool.

22. The method of claim 13, further comprising:
generating a simulated arc between the tip of the mock GTAW tool and the mock welding coupon when a user touches the tip of the mock GTAW tool to the mock welding coupon and lifts the tip of the mock GTAW tool off of the mock welding coupon.

23. The method of claim 13, further comprising:
generating a simulated arc between the tip of the mock GTAW tool and the mock welding coupon when a user drags the tip of the mock GTAW tool across a surface of the mock welding coupon.

24. The method of claim 13, further comprising:
generating a simulated arc between the tip of the mock GTAW tool and the mock welding coupon when a user moves the tip of the mock GTAW tool toward the mock welding coupon, without touching the mock welding coupon with the tip of the mock GTAW tool.

* * * * *